(12) United States Patent
Takahashi et al.

(10) Patent No.: US 6,709,775 B1
(45) Date of Patent: Mar. 23, 2004

(54) MAGNETIC RECORDING MEDIUM AND PRODUCTION METHOD THEREOF AND MAGNETIC RECORDING DEVICE

(75) Inventors: Migaku Takahashi, 20-2, Hitokita 2-Chome, Taihaku-Ku, Sendai-shi, Miyagi-Ken (JP); Satoru Yoshimura, Miyagi-Ken (JP); David Djayaprawira, Miyagi-Ken (JP); Hiroki Shoji, Miyagi-Ken (JP)

(73) Assignee: Migaku Takahashi, Sendai (JP)

( * ) Notice: Subject to any disclaimer, the term of this patent is extended or adjusted under 35 U.S.C. 154(b) by 0 days.

(21) Appl. No.: 09/979,851

(22) PCT Filed: May 29, 2000

(86) PCT No.: PCT/JP00/03436
§ 371 (c)(1),
(2), (4) Date: Nov. 28, 2001

(87) PCT Pub. No.: WO00/74042
PCT Pub. Date: Dec. 7, 2000

(30) Foreign Application Priority Data

May 28, 1999  (JP) ............................................. 11-150424
Nov. 24, 1999 (JP) ............................................. 11-333529

(51) Int. Cl.⁷ .............................. G11B 5/66; G11B 5/70; B05B 5/12; C23C 14/00; C23C 14/34
(52) U.S. Cl. ................................ 428/694 TS; 428/611; 428/667; 428/900; 427/128; 427/129; 427/131; 427/307; 204/192.2

(58) Field of Search ........................... 428/694 TS, 900, 428/667, 611; 204/192.2; 427/128, 129, 131, 307

(56) References Cited

U.S. PATENT DOCUMENTS 5,846,648 A     12/1998  Chen et al. .................. 428/332
6,096,445 A  *  8/2000   Terakado et al. ........ 428/694 T

FOREIGN PATENT DOCUMENTS

| JP | 10-105948 | 4/1998 |
| JP | 10-302242 | 11/1998 |
| JP | 11-73620 | 3/1999 |
| JP | 2000-20936 | 1/2000 |
| JP | 2000-99934 | 4/2000 |

* cited by examiner

Primary Examiner—Holly Rickman
(74) Attorney, Agent, or Firm—Young & Thompson

(57) ABSTRACT

A magnetic recording medium capable of suppressing the effects of thermal agitation and simultaneously reducing the average grain diameter and the standard deviation of magnetic crystal grains constituting a ferromagnetic metal film, without changing the film thickness of a metal under-layer or the film thickness of a ferromagnetic metal layer forming a recording layer, as well as a production method thereof, and a magnetic recording device. The magnetic recording medium includes a ferromagnetic metal layer of a cobalt based alloy formed on a base material with a metal under-layer having chromium as a major constituent disposed there between, wherein a seed layer having at least tungsten is provided between the base material and the metal under-layer, and the seed layer is an islands type film.

20 Claims, 24 Drawing Sheets

MAGNETIC RECORDING MEDIUM AND PRODUCTION METHOD THEREOF AND MAGNETIC RECORDING DEVICE

TECHNICAL FIELD

The present invention relates to a magnetic recording medium, a production method thereof, and a magnetic recording device. More specifically, the present invention relates to a magnetic recording medium comprising a ferromagnetic metal layer of magnetic crystal grains which are not susceptible to the effects of thermal agitation, as well as a production method thereof, and a magnetic recording device. The magnetic recording medium of the present invention can be ideally applied to hard disks, floppy disks, and magnetic tapes and the like.

BACKGROUND ART

In recent years, magnetic recording media have been widely used as high density, large capacity recording media in magnetic recording devices such as hard disks, although improvements are now required in recording and playback characteristics in order to progress to even higher recording densities.

FIG. 13 is a schematic cross-sectional view showing a magnetic recording medium 50 used in a conventional magnetic recording device. Furthermore, FIGS. 14A–D are diagrams showing go each of the steps in a production method for a conventional magnetic recording medium, and a cross-sectional view of the sample at each of those steps. A base material 51 of a non-magnetic material can utilize, for example, a non-magnetic layer 53 comprising nickel-phosphorus (Ni—P) provided on the surface of a base 52 comprising an aluminum (Al) based alloy. An underlayer 54 comprising a non-magnetic metallic film such as chromium (Cr) for example, a recording layer 55 comprising a magnetic film, and a protective layer 56 are then layered sequentially on top of the base material 51.

In a medium comprising a Co based magnetic layer 55 laminated on top of a Cr underlayer 54, the following facts are well known.

(1) The thinner the Cr layer 54 becomes, the smaller the grain diameter of the crystal grains 54a which make up the Cr layer 54 will be, and the thicker the Cr layer 54 becomes, the larger the grain diameter of the crystal grains 54a will become.

(2) The grain diameter of the crystal grains 55a which make up the Co based magnetic layer 55 laminated on top of the Cr underlayer 54 will be of approximately the same size as the grain diameter of the crystal grains 54a of the Cr layer 54 [FIG. 14(d)].

In contrast, in order to improve the recording and playback characteristics of a magnetic recording medium 50 of the construction described above, the present inventor and others have already reported [M. Takahashi, A. Kikuchi and S. Kawakita: IEEE Trans. on Magn., 33, 2938 (1997)] that a reduction in the interaction between grains of the magnetic crystal grains 55a which make up the magnetic film which functions as the recording layer 55, and a reduction in the film thickness of the magnetic film, are essential. In particular, in order to achieve a reduction in noise level for the medium, the above reference introduces a fabrication method effective for miniaturizing the crystal grains 55a of the magnetic film, by reducing the film thickness of the magnetic film of the recording layer 55.

However, there are limits to the micro-structure control and volume reduction in the crystal grains 55a which are possible by reduction in the thickness of the magnetic film comprising the recording layer 55. The reason being that as the thickness of the magnetic film comprising the recording layer 55 is reduced, there is an accompanying miniaturization of the crystal grains 55a which make up the magnetic film, and a problem arises in that the magnetic characteristics, such as the magnetization (residual magnetization) recorded on the magnetic film, can vary significantly over time, in other words the magnetic film becomes more susceptible to thermal agitation.

The present inventor has keenly pursued the development of a method for reducing the grain diameter of the crystal grains 55a of a magnetic film by reducing the film thickness of the underlayer 54, in other words, a method of reducing the volume of the crystal grains 55a of the magnetic film. Specifically, by developing a method of preparing a medium comprising a Cr underlayer and a Co based magnetic layer under ultra clean process conditions, the inventor has succeeded in developing a medium capable of achieving a coercive force exceeding 2000 [Oe] even with an ultra-thin Cr layer with a thickness of 2.5 nm as the underlayer 54 (International Patent Application No. PCT/JP97/01092).

The ultra clean process disclosed in the aforementioned application is a process comprising principally an increase in the ultimate vacuum of the film formation chamber from the $10^{-7}$ Torr level of a typical conventional sputtering device, to the $10^{-9}$ Torr level, as well as a reduction in the concentration of impurities such as water in the ultra pure Ar gas introduced into the film formation chamber by a further two digits beyond the levels found in normal ultra pure Ar gas, down to the 1 ppb level.

According to the aforementioned method, the average grain diameter of the crystal grains 55a making up the magnetic film decreased, although there was a tendency for the variation (standard deviation) in size to increase. This effect reflects localized variations in the interactions between grains within the magnetic film, and as the shift to higher recording densities proceeds, and recording magnetization becomes smaller and smaller, the above effect can no longer be ignored.

Furthermore, the effects achieved by reducing the film thickness of the underlayer using the aforementioned medium production method are approaching a limit, and the tendency for the interaction between grains of the magnetic film to increase with reductions in the film thickness of the underlayer has also been confirmed for specific magnetic films [J. Nakai, A. Kikuchi, K. Nakatani, M. Hirasaka, T. Shimatsu and M. Takahashi: J. Magn. Magn. Mater., 155, 234 (1996)].

Accordingly, there has been considerable demand for the development of a magnetic recording medium which enables a reduction in the grain diameter of the magnetic crystal grains 55a using a method other than reducing the film thickness of the underlayer 54 or the recording layer 55, and also enables the suppression of variation in the grain diameter of the magnetic crystal grains 55a, as well as a production method for such a medium, and a magnetic recording device.

One object of the present invention is to provide a magnetic recording medium capable of suppressing the effects of thermal agitation by simultaneously reducing the average grain diameter and the standard deviation of the magnetic crystal grains of a ferromagnetic metal layer, without changing the film thickness of a metal underlayer or the film thickness of the ferromagnetic metal layer which forms the recording layer.

Furthermore another object of the present invention is to provide a method of producing a magnetic recording medium capable of suppressing the effects of thermal agitation by simultaneously reducing the average grain diameter and the standard deviation of the magnetic crystal grains of a ferromagnetic metal layer without changing the film thickness of a metal underlayer or the film thickness of the ferromagnetic metal layer which forms the recording layer.

In addition, yet another object of the present invention is to provide a magnetic recording device comprising a magnetic recording medium capable of suppressing the effects of thermal agitation by simultaneously reducing the average grain diameter and the standard deviation of the magnetic crystal grains of a ferromagnetic metal layer without changing the film thickness of a metal underlayer or the film thickness of the ferromagnetic metal layer which forms the recording layer.

DISCLOSURE OF THE INVENTION

A magnetic recording medium according to the present invention is a magnetic recording medium comprising a ferromagnetic metal layer of a cobalt based alloy formed on a base material with a metal underlayer comprising chromium as a major constituent disposed there between, wherein a seed layer comprising at least tungsten is provided between the base material and the metal underlayer, and this seed layer is an islands type film.

Furthermore, in a magnetic recording medium of the above construction, the seed layer may also comprise chromium, in addition to tungsten.

Moreover, in a magnetic recording medium of the above construction, the aforementioned base material may comprise a non-magnetic base and a coating film, wherein the coating film can effectively utilize an alloy comprising mainly nickel and an element which is capable of co-precipitated with nickel and which has a strong affinity for oxygen.

The aforementioned element which is capable of co-precipitated with nickel and which has a strong affinity for oxygen can be either one, or two or more elements selected from the group consisting of phosphorus, cobalt, tungsten, iron, vanadium, chromium, manganese, copper, zinc, molybdenum, palladium, tin, rhenium, aluminum, zirconium, boron, titanium, hafnium, niobium and tantalum.

A production method for a magnetic recording medium according to the present invention is a production method for a magnetic recording medium comprising a seed layer comprising at least tungsten, a metal underlayer comprising chromium as a major constituent, and a ferromagnetic metal layer of a cobalt based alloy formed sequentially on top of a base material; comprising at least a preliminary processing step for positioning the base material inside a film formation chamber, evacuating the inside of the film formation chamber down to a predetermined degree of vacuum and then heating the base material to a predetermined temperature; an intermediate processing step in which a process D for dry etching the base material, and a process S for depositing a seed layer comprising at least tungsten in an islands type pattern onto the base material, are performed at least once under a pressure environment greater than the aforementioned predetermined degree of vacuum; and a post processing step for sequentially depositing the aforementioned metal underlayer and the aforementioned ferromagnetic metal layer on top of the seed layer.

Furthermore, in a production method for a magnetic recording medium of the above construction, the aforementioned intermediate processing step may also comprise, in addition to the aforementioned process D and the aforementioned process S, a process O which is performed at least once, in which the aforementioned base material is exposed to a predetermined oxygen atmosphere under a pressure environment greater than the aforementioned predetermined degree of vacuum.

A magnetic recording device according to the present invention comprises a magnetic recording medium of the above construction, a drive section for driving the aforementioned magnetic recording medium, a magnetic head, and a movement device for moving the magnetic head relative to the magnetic recording medium.

Figure 1:
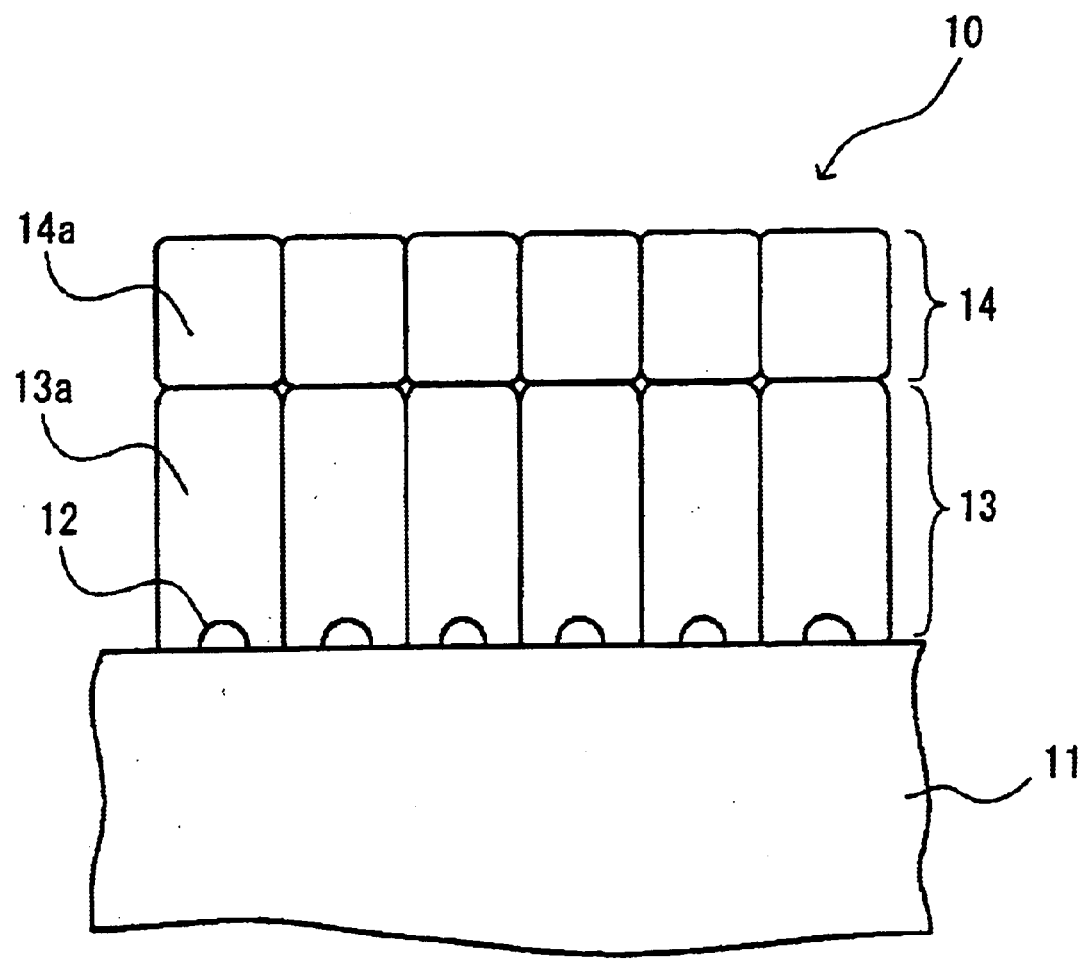
FIG. 1 is a schematic cross-sectional view of a magnetic recording medium according to the present invention.

BRIEF DESCRIPTION OF THE REFERENCE SYMBOLS 10 magnetic recording medium
11 base material
11a base
11b coating layer comprising a NiP film
11c coating layer comprising a Co co-precipitated NiP film
12 islands type seed layer
13 metal underlayer
13a crystal grains of metal underlayer
14 ferromagnetic metal layer
14a crystal grains of ferromagnetic metal layer
15 residual adsorbed gas on a coating layer 11b
16 layer formed by providing islands type seedlayer on a base material with adsorbed gas
17 adsorbed gas adhered during process O
layer formed by adhering adsorbed gas to a base material with islands type seedlayer
19 residual adsorbed gas on a coating layer 11c
20 adsorbed gas adhered during process O
30 magnetic recording device
31 casing
32 spacer
33 spindle
34 motor
35 bearing
36 rotation axis
37 swing arm
38 load arm
39 magnetic head
50 magnetic recording medium
51 base material
52 base
53 non-magnetic layer
54 underlayer
54a crystal grains of underlayer
55 recording layer
55A crystal grains of recording layer
56 protective layer

MODE FOR CARRYING OUT THE INVENTION

Figure 2:
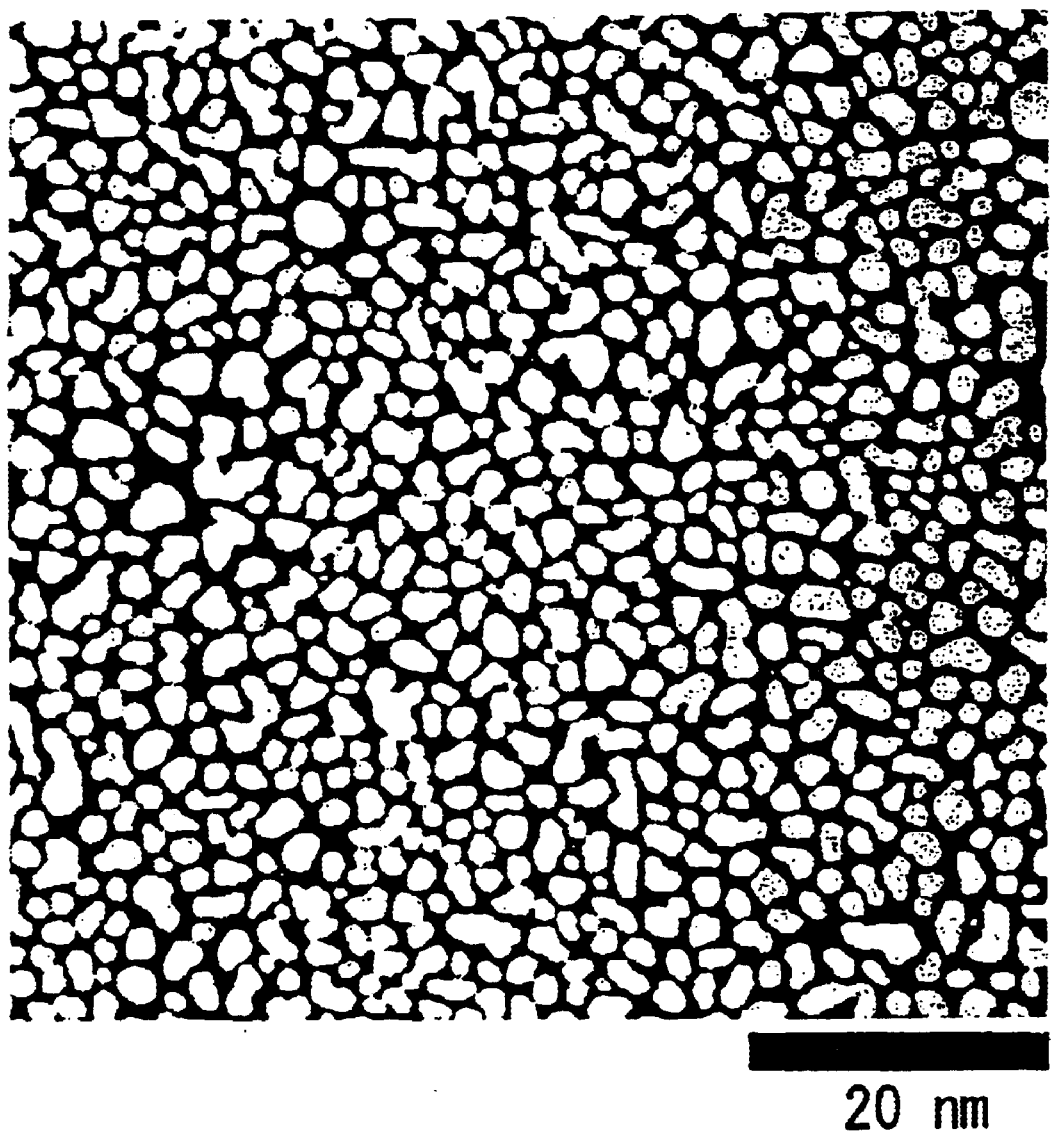
FIG. 2 is a scanning electron microscope (SEM) photograph showing the form of a W seed layer of a magnetic recording medium according to the present invention.

As follows is a description of the layer configuration of a magnetic recording medium according to the present invention, with reference to a schematic cross-sectional view of a magnetic recording medium according to the present invention (FIG. 1) and a scanning electron microscope (SEM) photograph showing the form of a seed layer formed on top of a base material (FIG. 2).

In a magnetic recording medium 10 of the present invention, a seed layer 12 of islands of W is first provided on top of a base material 11, as shown in the SEM photograph of FIG. 2. The seed layer 12, without inhibiting the crystal orientation of a Cr based metal underlayer 13 used for controlling the crystal orientation of a Co based ferromagnetic metal layer 14, functions as a nucleus for the initial growth of the metal underlayer 13 formed on the seed layer, and also causes a reduction in size of the crystal grains of the metal underlayer 13. By then laminating the ferromagnetic metal layer 14 on top of this small grain diameter metal underlayer 13, a medium according to the present invention, in comparison with a conventional medium with no seed layer, enables a reduction in the average grain diameter d of the magnetic crystal grains which make up the ferromagnetic metal layer 14, as well as reduce the standard deviation a of the magnetic crystal grains, without altering the film thickness of the metal underlayer 13 or the film thickness of the ferromagnetic metal layer 14 which functions as the recording layer. Furthermore, the grain diameter distribution C.V. grain, calculated by dividing the standard deviation of the magnetic crystal grains by the average grain diameter, is also reduced. In particular, the number of crystal grains of large crystal grain diameter can be reduced.

In other words, a magnetic recording medium 10 with a seed layer 12 according to the present invention not only offers smaller crystal grains in the ferromagnetic metal layer 14 which functions as the recording layer, but also produces a more uniform crystal grain diameter. Consequently, according to the present invention, even in those cases where the move to higher recording densities produces a miniaturization in the recording magnetization written onto the recording layer, the effects of thermal agitation on the recording magnetization are small, and a magnetic recording medium can be provided for which highly stable recording magnetization can be formed.

In addition, according to the construction described above, in those cases where the aforementioned seed layer 12 comprises chromium (Cr) in addition to tungsten (W), the average grain diameter of the magnetic crystal grains which make up the ferromagnetic metal layer 14, and the associated standard deviation, can be reduced even further, and the grain diameter distribution also narrows. Consequently, a magnetic recording medium can be obtained which is even less likely to be affected by thermal agitation, and which offers a higher level of stability when the recording magnetization is miniaturized.

Furthermore, in those cases where the base material 11 comprises a non-magnetic base 11a and a coating film 11b, and the coating film 11b utilizes an alloy comprising mainly nickel and an element which is capable of co-precipitated with nickel and which has a strong affinity for oxygen, then because oxygen will be readily adsorbed to the surface of the coating film 11b in those areas where the aforementioned element exists, oxygen is able to be adhered intermittently to the surface of the coating film 11b in a physically adsorbed state. By forming a seed layer 12 on top of a base material 11 with this type of surface, growth along a direction parallel to the surface of the base material 11 can be limited, resulting in the formation of minute island shapes, and so a seed layer 12 in which the size of these islands is controlled can be formed relatively easily.

The aforementioned element which is capable of co-precipitated with nickel (Ni) and which has a strong affinity for oxygen should preferably be either one, or two or more elements selected from the group consisting of phosphorus (P), cobalt (Co), tungsten (W), iron (Fe), vanadium (V), chromium (Cr), manganese (Mn), copper (Cu), zinc (Zn), molybdenum (Mo), palladium (Pd), tin (Sn), rhenium (Re), aluminum (Al), zirconium (Zr), boron (B), titanium (Ti), hafnium (Hf), niobium (Nb) and tantalum (Ta). Of these elements, Co is the most preferred as it readily co-precipitated with Ni, and also has a strong affinity for oxygen.

The coating film 11b which forms the surface of the aforementioned base material 11 should preferably not undergo magnetization at high temperatures, should display conductivity and be easily tooled mechanically, and yet also offer a suitable degree of surface hardness. Consequently, examples of materials which satisfy these conditions include films such as (Ni—P) films, (Ni—Ta) films or (Ni—Ti) films, which have conventionally been prepared by commonly used plating techniques, which also incorporate a suitable amount of an element such as Co or the like, and such films are particularly favorable as the coating film 11b of the present invention.

In a production method for a magnetic recording medium 10 according to the present invention, first, as a preliminary processing step, the base material 11 is positioned inside a film formation chamber, the inside of the film formation chamber is evacuated down to a predetermined degree of vacuum, and the base material is heated to a predetermined temperature in order to reduce the amount of gas adhered to the surface of the base material 11. Subsequently, as an intermediate processing step, a process D for dry etching the base material 11 and a process S for depositing a seed layer comprising at least W in an islands type pattern onto the base material 11, are performed at least once under a pressure environment greater than the aforementioned predetermined degree of vacuum. In the process D, which makes up one part of the intermediate processing step, the amount of adsorbed gas remaining on the base material 11 is reduced by a suitable amount, producing a surface state for the base material 11 with even less residual adsorbed gas than that found following the preliminary processing step, while in the process S, a seed layer comprising W is formed on top of the base material, under the influence of the remaining adsorbed gas on the base material 11, and consequently the amount of adsorbed gas from the base material 11 which is incorporated within the seed layer 12, and the form of the islands of the seed layer 12 which varies in accordance with the degree of residual adsorbed gas, can be finely controlled. Then, by sequentially depositing a metal underlayer 13 and a ferromagnetic metal layer 14 on top of the W seed layer 12 in the subsequent post processing step, the crystal grains which make up each of the layers can be reduced in size without changing the film thickness of the metal underlayer 13 or the ferromagnetic metal layer 14.

In other words, in the intermediate processing step which is the feature of the present invention, by altering the etching conditions and the number of repetitions for the process D, or altering the sequence in which the process D and the process S are carried out, the amount of residual adsorbed gas on the surface of the base material 11, which acts so as to suppress the horizontal growth of the W crystals which make up the seed layer 12, can be altered freely and with subtlety. As a result, growth along a direction parallel to the surface of the base material 11 can be limited, resulting in the formation of minute island shapes, and a W seed layer 12 in which the size of these islands is controlled can be produced.

A metal underlayer 13 formed on top of a W seed layer 12 of the construction described above will form with a small grain diameter which reflects the island type W seed layer 12, and good crystal orientation can be retained, and consequently the ferromagnetic metal layer 14 deposited on top of this metal underlayer 13 can also be produced with a minute, good crystal orientation.

For example, the case where the aforementioned intermediate processing step is carried out in a sequence comprising the aforementioned process D and then the aforementioned process S (the resulting product medium is called a DS medium), is a method for eliminating the effects of residual adsorbed gas on the base material 11. In other words, the process D removes almost all the residual adsorbed gas on the base material 11, and subsequently, in the process S, an islands type W seed layer 12 is formed, under predetermined production conditions, on the clean base material surface which is almost free of adsorbed gas. Then, in the subsequent post processing step, the metal underlayer 13 and the ferromagnetic metal layer 14 are deposited sequentially on top of the W seed layer 12. Because the amount of adsorbed gas from the base material 11 which is incorporated into the formed W seed layer 12 can be suppressed to a minimum, infiltration of the adsorbed gas incorporated within the W seed layer 12 into the metal underlayer 13 deposited on top of the W seed layer 12 can be prevented. Consequently, in a DS medium, the metal underlayer 13 has a small grain diameter reflecting the islands type W seed layer 12, and a good crystal orientation can be retained, and so the ferromagnetic metal layer 14 deposited on top of this metal underlayer 13 can also be produced with a fine, good crystal orientation.

In contrast, the case where the aforementioned intermediate processing step is carried out in a sequence comprising the aforementioned process S and then the aforementioned process D (the resulting product medium is called a SD medium), is a method for effectively utilizing residual adsorbed gas on the base material 11. In other words, in the process S, an islands type W seed layer 12 is formed under predetermined production conditions, with the adsorbed gas still present on the base material 11. In such a case, the adsorbed gas remaining on the surface of the base material 11 suppresses the horizontal growth of the W crystals which make up the W seed layer 12. As a result, an ultra fine islands type W seed layer 12 is obtained, in which growth in directions parallel to the surface of the base material 11 has been prevented. Subsequently, in the process D, dry etching is carried out on the surface of the seed layer 12. This dry etching removes almost all the residual adsorbed gas on the base material. Then, in the subsequent post processing step, the metal underlayer 13 and the ferromagnetic metal layer 14 are deposited sequentially on top of the W seed layer 12. Consequently, in a SD medium, because the ultra fine islands of W will function as nuclei in the growth of the metal underlayer 13, the resulting grain diameter of the metal underlayer 13 will be small, and moreover because there is no effect from residual adsorbed gas on the base material, a good crystal orientation can be retained. Accordingly, the ferromagnetic metal layer 14 deposited on top of this metal underlayer 13 can also be produced with a fine, good crystal orientation.

In the production methods described above, namely production methods in which the intermediate processing step comprises the process S and the process D, both methods offer the same action and effect in terms of the fact that both enable the grain diameter of the magnetic crystals which make up the ferromagnetic metal layer 14 to be miniaturized, without any alteration in the film thickness of the metal underlayer 13 and the ferromagnetic metal layer 14. Furthermore in both methods, this effect can be even further improved by adding a suitable quantity of Cr to the W.

As follows is a description of the case where the intermediate processing step, in addition to the aforementioned process D and the aforementioned process S, also comprises a process O, which is conducted at least once, in which the aforementioned base material is exposed to a predetermined oxygen atmosphere, under a pressure environment greater than the aforementioned predetermined degree of vacuum.

Media prepared by adding the aforementioned process O to the intermediate processing step can be divided into those media produced by performing each process once, and those media produced by performing one or more of the processes an additional plurality of times.

First, in terms of the case where each process is carried out once, the following 3 cases exist.
(a) The case where the aforementioned intermediate processing step is performed in the sequence process D→process S→process O (and the produced medium is named a DSO medium). In other words, the case where the process O is added to the end of the intermediate processing step used for a DS medium.
(b) The case where the aforementioned intermediate processing step is performed in the sequence process S→process D→process O (and the produced medium is named a SDO medium). In other words, the case where the process O is added to the end of the intermediate processing step used for a SD medium.
(c) The case where the aforementioned intermediate processing step is performed in the sequence process D→process O→process S (and the produced medium is named a DOS medium).

According to an intermediate processing step comprising the process O, as shown in the cases (a) to (c) above, a desired amount of oxygen can be adhered by physical adsorption to the surface of the base material 11 as it exists immediately prior to the process O (the state of the surface will be different for each of the cases (a) to (c) described above), before the production proceeds to the subsequent process. This subsequent process refers to the process for forming the metal underlayer 13, which comprises part of the post processing step, in the case of a DSO medium or a SDO medium, or alternatively refers to the process for forming the seed layer 12, which comprises part of the intermediate processing step, in the case of a DOS medium.

The adhesion of oxygen to the surface of the base material 11 by this process O has an effect on the film formation in the subsequent process mentioned above. In the case of a DSO medium or a SDO medium, the adhered oxygen acts so as to miniaturize the crystal grains of the Cr film which makes up the metal underlayer, whereas in the case of a DOS medium, the adhered oxygen acts so as to miniaturize the island shapes of the seed layer 12, as well as making the size distribution more uniform.

As a result, in the case of a DSO medium or a SDO medium, the grain diameter of the magnetic crystal grains of the ferromagnetic metal layer 14 will reduce, reflecting the reduced size of the crystal grains of the Cr film, and the distribution of the grain diameter will also narrow. In contrast, in the case of a DOS medium, the grain diameter of the crystal grains of the Cr film of the metal underlayer 13 formed on top of the seed layer 12 will reduce, reflecting the reduced size and the uniform distribution of the crystal grains of the islands type seed layer 12, and the distribution of the grain diameter will narrow even further. By forming the ferromagnetic metal layer 14 on top of a metal underlayer 13 which has been altered in this manner, the grain diameter of the magnetic crystal grains of the ferromagnetic metal layer 14 will reduce, and the distribution of the grain diameter will also narrow. At the same time, a medium is obtained in which the variation in residual magnetization over time $\Delta M$ is even smaller.

Summarizing the above results in terms of the degree of miniaturization and the uniformity of the magnetic crystal grains, yields the following findings.
(1) A DSO medium is superior to a DS medium
(2) A SDO medium is superior to a SD medium
(3) A SDO medium is better than a DSO medium, and a DOS medium is even better than a SDO medium.

In other words, from the findings (1) and (2) above, it is clear that in comparison with a medium produced using an intermediate processing step without the process O (a DS medium or a SD medium), a medium produced using an intermediate processing step to which the process O has been added, has a smaller average grain diameter, and a smaller standard deviation for the magnetic crystal grains which make up the ferromagnetic metal layer 14, and as a result is able to offer an improvement in the variation over time $\Delta M$ of the residual magnetization of the medium. Furthermore, from the aforementioned finding (3) it is clear that of those media produced with the process O added to the intermediate processing step, the DOS medium is the most superior.

As follows is a description of two specific examples of the aforementioned media produced by performing one or more of the processes an additional plurality of times.
(d) The case where the aforementioned intermediate processing step is performed in the sequence process D→process O→process S→process D (and the produced medium is named a DOSD medium). In other words, the case where a second process D is added to the end of the intermediate processing step used for a DOS medium.

(e) The case where the aforementioned intermediate processing step is performed in the sequence process D→process O→process S→process D→process O (and the produced medium is named a DOSDO medium). In other words, the case where a second process O is added to the end of the intermediate processing step used for a DOSD medium.

In the case (d) above, by adding a second process D (dry etching), residual surface deposits generated during the formation process for the islands type seed layer 12 can be removed. Subsequently, the metal underlayer 13 and the ferromagnetic metal layer 14 can be deposited sequentially onto the base material 11, which has the islands type seed layer 12 formed thereon, and which has been thoroughly cleaned. By carrying out these processes, the magnetic crystals of the ferromagnetic metal layer 14 can be miniaturized even further, the variation in the grain diameter (the grain diameter distribution) is reduced, and the variation over time ΔM of the residual magnetization of the medium also improves.

In the case (e) above, by adding a second process O (oxygen exposure) after the second process D (dry etching), a surface state can be prepared in which, by controlling the degree of adhesion, a suitable amount of oxygen can be adsorbed onto the base material 11 with an islands type seed layer 12 which has been cleaned by the second process D. Then, with the surface of the base material 11 in this state, a metal underlayer 13 and a ferromagnetic metal layer 14 are deposited sequentially onto the base material 11. As a result, the oxygen adhered to the surface of the base material 11 which also incorporates the islands type seed layer 12, further suppresses any growth in the size of the crystal grains of the metal underlayer 13 deposited on top of the base material 11, and any growth in the size of the crystal grains of the ferromagnetic metal layer 14 deposited on top of the metal underlayer 13 is also suppressed even further, and so the magnetic crystals can be reduced in size, the variation in the grain diameter (the grain diameter distribution) is also suppressed even further, and the variation over time ΔM of the residual magnetization of the medium also improves even further.

Summarizing the above results in terms of the degree of miniaturization and the uniformity of the magnetic crystal grains, yields the following findings.

(4) A DOSD medium is better than a DOS medium
(5) A DOSDO medium is even better than a DOSD medium In other words, from the findings (4) and (5) above, it is clear that by performing any of the processes, namely process D, process S or process O, an additional plurality of times, the average grain diameter and the standard deviation for the magnetic crystal grains which make up the ferromagnetic metal layer 14 of the medium can be reduced even further, and as a result, the variation over time ΔM of the residual magnetization of the medium can also be improved.

The effects described above can all be controlled by varying the conditions of only the intermediate processing step, without altering the film thickness of the metal underlayer 13 or the film thickness of the ferromagnetic metal layer 14 which functions as the recording layer, and consequently offer the advantage that in order to form a medium with a set of desired magnetic characteristics, the film thickness of the metal underlayer 13 and the film thickness of the ferromagnetic metal layer 14 can be designed and altered with total freedom.

According to a production method for a magnetic recording medium of the present invention, a variety of media with different magnetic characteristics can be easily produced by reducing the size of the grain diameter of the magnetic crystal grains which make up the ferromagnetic metal layer 14, while suitably altering the film thickness of the metal underlayer 13 and the ferromagnetic metal layer 14 independently, and so the present invention can contribute to the construction of a production line which offers a marked improvement in the degree of freedom of the medium design.

Furthermore, in a production method according to the present invention, even if the ultimate vacuum (the so-called back pressure) of the film formation chamber does not reach the $10^{-9}$ Torr level required for the ultra clean process, then at a film formation chamber ultimate vacuum at the $10^{-7}$ Torr level, as used in conventional mass production equipment, the magnetic crystal grains of the ferromagnetic metal layer 14 can still be miniaturized. Accordingly, by converting conventional mass production equipment, it becomes possible to provide a mass production system capable of manufacturing low cost media which comply with the next generation high recording densities.

Furthermore, in those cases where the base material 11 described above comprises a non-magnetic base 11a and a coating film 11b, and the coating film 11b utilizes an alloy comprising mainly nickel and an element which is capable of co-precipitated with nickel and which has a strong affinity for oxygen, then the actions and effects of the process O described above improve even further, which is strongly reflected in the form of the islands type seed layer formed in the next process, and in the form of the crystal grains of the metal underlayer, and as a final result, leads to a further miniaturization of the magnetic crystal grains of the ferromagnetic metal layer. In other words, a production method according to the present invention is a method which will function effectively even for a medium with a base material comprising a non-magnetic base 11a and a coating film 11b, where the coating film 11b utilizes an alloy comprising mainly nickel and an element which is capable of co-precipitated with nickel and which has a strong affinity for oxygen.

In addition, because a magnetic recording medium according to the present invention comprises a ferromagnetic metal layer 14 of minute crystal grains with superior magnetic characteristics as described above, the ferromagnetic metal layer 14 offers thermal stability which is superior to that of conventional media, and can suppress thermal agitation. Consequently, even if the magnetic recording medium is exposed to the effects of heat generated by internal structural components of the magnetic recording device such as an internal motor or the like, and for example is used under conditions where the temperature exceeds 100° C., the magnetic characteristics of the ferromagnetic metal layer 14 of a medium of according to the present invention will not deteriorate. Consequently, by using a medium according to the present invention, a magnetic recording device can be provided which offers superior long term stability.

As follows is a description of sample embodiments of the present invention.

(Base Material)

Examples of a base material 11 according to the present invention include materials comprising a non-magnetic base 11a of aluminum or titanium or an alloy thereof, or silicon, glass, carbon, ceramic, plastic, resin, or a complex thereof, on to which is surface coated a non-metallic coating film 11b of a different material using sputtering, vapor deposition, or plating techniques. The non-magnetic coating film 11b provided on the surface of the base material 11 should preferably not undergo magnetization at high temperatures, should display conductivity and be easily tooled mechanically, and yet also offer a suitable degree of surface hardness. Examples of preferred non-magnetic coating films 11b which satisfy these conditions include (Ni—P) films, (Ni—Ta) films or (Ni—Ti) films which have been prepared by sputtering or plating techniques.

Furthermore, in the present invention, a base material 11 comprising a non-magnetic base 11a and a coating film 11c, where the coating film 11c utilizes an alloy comprising mainly Ni and an element which is capable of co-precipitated with Ni and which has a strong affinity for oxygen, can be used. A base material 11 of this construction offers the advantage that, because oxygen will be readily adsorbed to the surface of the coating film 11c in those areas where the aforementioned element exists, oxygen is able to be adhered intermittently to the surface of the coating film in a physically adsorbed state.

The aforementioned element which is capable of co-precipitated with Ni and which has a strong affinity for oxygen should preferably be either one, or two or more elements selected from the group consisting of P, Co, W, Fe, V, Cr, Mn, Cu, Zn, Mo, Pd, Sn, Re, Al, Zr, B, Ti, Hf, Nb and Ta, and of these elements, Co is the most preferred as it readily co-precipitated with Ni, and also has a strong affinity for oxygen.

For example, in the case where the aforementioned element which is capable of co-precipitated with Ni and which has a strong affinity for oxygen utilizes P and Co, then a suitable production method involves preparing a non-magnetic base 11a of aluminum or the like, and following degreasing, etching and zincate treatment of this base 11a, using a plating solution comprising a commercially available plating solution (such as the product Meltex Ni-422 or the like) to which cobalt sulfate has been added to perform NiCoP plating onto the non-magnetic base 11a, thereby forming a (Ni—P) coating film 11c comprising a predetermined amount of Co, and subsequently producing a base material 11 with the desired coating film by subjecting the film to a predetermined heating process.

In terms of the shape of the base material 11, in the case of applications to disk production, a donut shaped circular base material is used. The base materials provided with magnetic layers and the like described below, namely the magnetic recording media 10, are rotated about a central axis during magnetic recording or playback, with a rotational speed of 3600 rpm, for example. During this rotation, the magnetic head flies across the top of the magnetic recording medium 10 at a height of approximately 0.1 $\mu$m. Accordingly, base materials 11 for which the surface flatness, the parallel nature of the upper and lower surfaces, the circumferential waviness, and the surface roughness are suitably controlled are desirable.

Furthermore, when the base material 11 rotates or stops, then the surfaces of the magnetic recording medium 10 and the magnetic head contact and slide (this is known as contact start stop or CSS). As a countermeasure, a fine concentric texture may also be provided on the surface of the base material.

However, from the viewpoint of achieving a further lowering of the magnetic head flying height, and maximizing the effects which the islands type seed layer described below has on those layers formed thereon, a base material 11 without the above type of texture, and which has a surface roughness Ra of no more than 1 nm is most suited to the present invention.

(Seed Layer)

A seed layer 12 according to the present invention is provided on top of the aforementioned base material 11, and a metal underlayer 13 and a ferromagnetic metal layer 14 described below are then laminated on top of the seed layer 12. The seed layer 12 must comprise at least tungsten (W), and is not a two dimensional flat film, but is rather an islands type film with locally scattered spots or islands. This islands type W seed layer 12 functions as nuclei for promoting crystal growth in the initial growth stage of the crystal grains of the metal underlayer 13 deposited on top of the seed layer 12. As a result of this action, the metal underlayer 13 forms with a small grain diameter reflecting the islands type W seed layer 12, and is able to retain a good crystal orientation. In addition, the ferromagnetic metal layer 14 deposited on top of the metal underlayer 13 can also be produced with a minute, good crystal orientation.

In the examples described below, the islands type seed layer 12 is prepared by sputtering techniques using either a W target or a WCr alloy target. During this formation, by controlling mainly the temperature to which the base material 11 is heated and then held, and the gas pressure during film formation, a seed layer with the desired islands form is formed on the base material. The main production conditions for forming the islands type seed layer 12 include the temperature of the base material, the gas pressure during film formation, the power density applied to the target, the distance between the target and the base material, and the bias applied to the base material during film formation. For example, base material temperatures from 170 to 300 [° C.] are preferable, and gas pressures from 1 to 40 [mTorr] are desirable. Furthermore in terms of power density, in the case where a circular target with a diameter of 152 [mm] is used, a power level between 25 [W] and 1.5 [kW] from a direct current power source should be selected and applied. At this time, a suitable distance between the target and the base material is from 20 to 60 [mm], and a suitable bias would be from 0 to −300 [V].

Accordingly, by changing only the production conditions for the islands type W seed layer 12, and controlling the size of the islands of W and the degree of separation between islands, the grain diameter of the crystal grains 13a of the metal underlayer 13 and the grain diameter of the crystal grains 14a of the ferromagnetic metal layer 14 formed on top of the seed layer 12 can be controlled freely, without any dependence on the film thickness of either the metal underlayer 13 or the ferromagnetic metal layer 14.

In other words, the average grain diameter d of the magnetic crystal grains which make up the ferromagnetic metal layer 14, and the standard deviation $\sigma$ of the magnetic crystal grains can be suppressed without altering the film thickness of the metal underlayer 13 or the film thickness of the ferromagnetic metal layer 14, and furthermore, the grain diameter distribution C.V. grain, calculated by dividing the standard deviation of the magnetic crystal grains by the average grain diameter, can also be reduced. In particular, the number of crystal grains of large crystal grain diameter is reduced.

Furthermore, adding chromium (Cr) to the aforementioned W seed layer 12 improves the actions and effects described above even further.

The size of the islands of the seed layer 12 and the degree of separation between islands can be controlled with an even greater degree of sensitivity by incorporating the deposits such as oxygen remaining on the base material 11 immediately prior to the formation of the seed layer 12, or discrete oxygen deposits actively adhered to the base material 11 by the oxygen exposure process (process O) described below immediately prior to the formation of the seed layer 12.

Moreover in a similar manner, the deposits such as oxygen remaining on the base material 11 immediately prior to the formation of the seed layer 12, or discrete oxygen deposits actively adhered to the base material 11 by the oxygen exposure process (process O) immediately prior to the formation of the seed layer 12 also effect the subsequent post processing step comprising film growth of the metal underlayer 13 and the ferromagnetic metal layer 14, and promote a reduction in size and diameter of the crystals, as well as a narrowing of the grain diameter distribution.

(Metal Underlayer)

Examples of a metal underlayer 13 according to the present invention include metals which incorporate chromium as a main constituent, such as Cr or alloys thereof. In the case of alloys, combinations with, for example, V, Nb, or Ta and the like have been proposed. Cr is particularly preferred because of the segregation action it causes relative to the ferromagnetic metal layer described below. Furthermore, suitable film formation methods for the metal underlayer 13 include sputtering and vapor deposition.

The role of this metal underlayer 13 is to promote the crystal growth of the Co based ferromagnetic metal layer 14 formed on top of the metal underlayer 13 so that the easy axis of the ferromagnetic metal layer 14 adopts a direction within the plane of the base material, in other words, so that the coercive force within the plane of the base material increases.

In those cases where the Cr metal underlayer 13 is produced by sputtering techniques, then the film formation factors which control the resulting crystallinity include the surface shape of the base material 11, the surface state, the surface temperature, the gas pressure during film formation, the bias applied to the base material 11, and the thickness of the film being formed.

The coercive force of the ferromagnetic metal layer 14 described below increases as the Cr film thickness of the metal underlayer 13 increases, although there is also a tendency for an accompanying increase in the surface roughness of the medium. However, in order to improve the recording density, the flying height of the magnetic head from the medium surface needs to be reduced. Furthermore, the grain diameter of the crystals of the Cr layer which makes up the metal underlayer 13 is smaller for thinner film thickness values, and it is known that the grain diameter of the crystals of the ferromagnetic metal layer 14 which is subsequently laminated on top of the metal underlayer 13 will also be reduced.

Accordingly, it is desirable that the metal underlayer 13 utilizes a material and a production method which enables the ferromagnetic metal layer 14 to retain a large coercive force even if the metal substrate film is thin.

A magnetic recording medium 10 according to the present invention is produced by the following production method, namely a production method comprising an intermediate processing step incorporating a process D (dry etching), a process S (seed layer formation) and a process O (oxygen exposure). In other words, a metal underlayer 13 according to the present invention is formed after the aforementioned intermediate processing step, on top of a base material 11 with a surface which has been altered to a predetermined state by the intermediate processing step. As a result, the metal underlayer 13 is affected by the islands type seed layer 12 and the oxygen adhered discretely to the surface of the base material 11, and the crystal grains of the Cr layer which makes up the metal underlayer 13 are reduced in size markedly. This size reduction is facilitated even further by using a base material 11 such as that described above, comprising a coating film 11b of an alloy comprising mainly Ni and an element which is capable of co-precipitated with Ni and which has a strong affinity for oxygen, and a non-magnetic base 11a.

In those cases where a glass plate is used as the base material 11, a (Ni—Al) film may also be provided beneath the metal underlayer 13.

(Ferromagnetic Metal Layer)

Cobalt (Co) based alloys can be suitably used as the ferromagnetic metal layer 14 of the present invention, and of such alloys, materials in which Cr segregation occurs between the crystal grains of the ferromagnetic metal layer 14 are particularly desirable. In other words, ferromagnetic metal materials which incorporate at least Co and Cr are preferred. Specific examples include CoNiCr, CoCrTa, CoCrPt, CoNiPt, CoNiCrTa and CoCrPtTa. For example, CoNiCr is suitable as it is both cheap and unlikely to be affected by the film formation atmosphere, CoCrTa is suitable as it offers low medium noise, and CoPt systems are suitable for achieving a coercive force of 1800 Oe or greater, which can be difficult to achieve with CoNiCr or CoCrTa.

The ferromagnetic metal layer 14 functions as a recording layer, and so it is necessary that the magnetic characteristics of magnetization (residual magnetization) or the like recorded onto the ferromagnetic metal layer 14 does not vary greatly over time. In particular, along with the move to higher recording densities, and the miniaturization of recording magnetization, the number of magnetic crystal grains contained within the area occupied by a single recording magnetization is rapidly decreasing. In such a case, there is an increasing tendency for a magnetization of reverse direction to cause a diamagnetic field, and for this diamagnetic field to then produce a further degree of instability in the recording magnetization.

Accordingly, for the ferromagnetic metal layer 14, materials and production methods are preferred in which the grain diameter of the magnetic crystal grains is reduced in order to ensure the stable retention of a minute recording magnetization, and in which the variation in the grain diameter can also be suppressed.

The ferromagnetic metal layer 14 which makes up part of a magnetic recording medium 10 according to the present invention is formed by epitaxial growth on top of the metal underlayer 13 in which the grain diameter of the crystals has been miniaturized by provision of the aforementioned intermediate processing step. Consequently, the crystal grains of the ferromagnetic metal layer 14, which functions as a magnetic recording film, are strongly influenced by the reduced grain diameter of the crystal grains of the metal underlayer 13, which leads to a tendency for the grain diameter of the recording film to also be reduced. As described above in reference to the metal underlayer 13, this tendency is strengthened even further by using a base material 11 such as that described above, comprising a coating film 11b of an alloy comprising mainly Ni and an element which is capable of co-precipitated with Ni and which has a strong affinity for oxygen, and a non-magnetic base 11a. As a result, whereas ferromagnetic metal layers formed by conventional production methods are constructed of crystal grains with an average grain diameter exceeding 10 nm, ferromagnetic metal layers prepared by a production method according to the present invention display an average grain diameter which can be more than 30% smaller, and the standard deviation which represents the variation in the grain diameter can also be halved. The rate of change of the residual magnetization ΔM, which acts as an indicator of the change over time in a magnetization recorded on a medium, can also be improved by up to 30% or more.

Consequently, a magnetic recording medium 10 according to the present invention provided with a ferromagnetic metal layer 14 made up of crystal grains of reduced size will display superior long term stability.

Furthermore, one type of ternary ferromagnetic alloy magnetic film represented by the general formula $Co_xCr_yGe_z$, where x, y, and z which show the composition of the film satisfy the conditions of $78 \leq x \leq 87$, $2.5 \leq y \leq 14.5$, $3.5 \leq z \leq 15$, and x+y+z=100 (x, y, and z represent composition ratios in terms of atomic %), can also be used as the aforementioned ferromagnetic metal layer 14. This ternary ferromagnetic alloy magnetic film was proposed by the present inventor in Japanese Patent Application, Unpublished No. Hei 11-135038 (submitted on May 14, 1999), and possesses superior magnetic characteristics not seen in conventional materials.

(Higher Recording Densities in Magnetic Recording Media)

A magnetic recording medium 10 according to the present invention represents a medium in which recording magnetization is formed parallel with the film surface of the ferromagnetic metal layer 14 described above (namely an in-plane magnetic recording medium). With such a medium, in order to improve the recording density, it is necessary to achieve further miniaturization of the recording magnetization. This miniaturization is achieved by reducing the playback signal output from the magnetic head in order to reduce the amount of leakage flux from each recording magnetization. Accordingly, it is desirable to further reduce the medium noise, thought to be an effect of neighboring recording magnetization.

(Coercive Force of the Ferromagnetic Metal Layer: Hc, Anisotropic Magnetic Field: $Hk^{grain}$, Normalized Coercive Force: $Hc/Hk^{grain}$, Crystalline Magnetic Anisotropy: $Ku^{grain}$)

The "coercive force of the ferromagnetic metal layer: Hc" in the present invention refers to the coercivity of the medium determined from a magnetization curve measured using a variable sample magnetometer (called a VSM). The "anisotropic magnetic field of the crystal grains: $Hk^{grain}$" is the applied magnetic field which completely eliminates rotational hysteresis loss, as measured by a high sensitivity torque magnetometer. Here, in the case of a magnetic recording medium in which a ferromagnetic metal layer is formed on the surface of a base material with a metal underlayer disposed there between, the coercive force and the anisotropic magnetic field refer to values measured within the plane of the thin film. Furthermore, the $Hk^{grain}$ value, according to Stoner-Wohlfarth theory, takes a value of 0.5 in the case where the crystal grains are completely magnetically isolated, and this value is the upper limit for the normalized coercive force.

In J.-G. Zhu and H. N. Bertram: Journal of Applied Physics, Vol. 63, 1988, pp. 3248, it is reported that a high value for the normalized coercive force of a ferromagnetic metal layer is the result of a reduction in the magnetic interaction between the individual crystals which make up the ferromagnetic metal layer, enabling a high coercive force to be realized.

The "normalized coercive force of the ferromagnetic metal layer: $Hc/Hk^{grain}$" in the present invention is the value obtained by dividing the coercive force Hc by the anisotropic magnetic field of the crystal grains $Hk^{grain}$, and the fact that this value represents the degree of improvement in the magnetic isolation of the crystal grains is reported in "Magnetization Reversal Mechanism Evaluated by Rotational Hysteresis Loss Analysis for the Thin Film Media", Migaku Takahashi, T. Shimatsu, M. Suekane, M. Miyamura, K. Yamaguchi and H. Yamasaki: IEEE Transactions on Magnetics, Vol. 28, 1992, pp. 3285.

The "crystalline magnetic anisotropy $Ku^{grain}$" in the present invention is ½ of the product of Ms and $Hk^{grain}$, and the larger the value of $Ku^{grain}$ the more thermal agitation is suppressed, and as such this value acts as an indicator for judging thermally stable media.

(Film Fabrication Method)

Sputtering techniques can be suitably used as the film fabrication method in the present invention. Examples of sputtering devices for magnetic recording media include carrier type devices in which the base material 11 is moved across in front of the target while a thin film is formed, and stationary type devices in which the base material 11 is fixed in front of the target and a thin film then formed. The former is advantageous for low cost media production because it is very applicable to mass production, whereas the latter enables the production of media with superior recording and playback characteristics because the incident angle of the sputtering grains onto the base material 11 is stable. The production of a magnetic recording medium 10 according to the present invention is not limited to either a carrier type device or a stationary type device.

(Production Method for a Magnetic Recording Medium)

A production method for a magnetic recording medium according to the present invention is a production method for sequentially forming a seed layer incorporating at least tungsten, a metal underlayer comprising chromium as the main constituent, and a ferromagnetic metal layer comprising a cobalt based alloy on top of a base material, and comprises at least a preliminary processing step for positioning the base material inside a film formation chamber, evacuating the inside of the film formation chamber down to a predetermined degree of vacuum and then heating the base material to a predetermined temperature, an intermediate processing step in which a process D for dry etching the base material and a process S for depositing a seed layer comprising at least tungsten in an islands type pattern onto the base material, are performed at least once, under a pressure environment greater than the aforementioned predetermined degree of vacuum, and a post processing step for sequentially depositing the aforementioned metal underlayer and the aforementioned ferromagnetic metal layer on top of the seed layer.

Furthermore, the configuration in which the intermediate processing step, in addition to the aforementioned process D and the aforementioned process S, also comprises a process O which is performed at least once, in which the aforementioned base material is exposed to a predetermined oxygen atmosphere under a pressure environment greater than the aforementioned predetermined degree of vacuum, is also a production method according to the present invention.

As follows is a description of aforementioned preliminary processing step, intermediate processing step, and post processing step.

(Preliminary Processing Step)

A preliminary processing step according to the present invention is a step for positioning a base material inside a film formation chamber, evacuating the inside of the film formation chamber down to a predetermined degree of vacuum, and then heating the base material to a predetermined temperature.

In other words, by evacuating the inside of the film formation chamber and converting the atmosphere surrounding the base material to a state of high vacuum, gas components and the like adhered to the surface of the base material can be removed. By then raising the temperature, this gas component removal effect can be heightened, and the temperature of the base material can be raised to a temperature appropriate for the processing conditions of the subsequent intermediate processing step.

Here, the predetermined degree of vacuum may be the $10^{-7}$ Torr level ultimate vacuum utilized in conventional production apparatus. Even at this level of ultimate vacuum the actions and effects of the subsequent intermediate processing step can still be realized. However, from the viewpoint of reducing the amount of deposits remaining on the surface of the base material following the preliminary processing, and reducing the influence of residual gas on the subsequent processes, it is preferable that the ultimate vacuum of the film formation chamber is reduced to the $10^{-9}$ Torr level or lower, as reported in a prior patent application of the inventor.

However, although the preliminary processing step described above is able to markedly reduce the absolute quantity of deposits such as oxygen remaining on the base material 11, if viewed locally, the residual deposits are likely to be unevenly distributed, and it is thought that making this distribution more uniform would be difficult.

Controlling the residual deposits on the base material 11 following the preliminary processing step to make the distribution more uniform is achieved through the process D and the process O of the intermediate processing step described below.

(Intermediate Processing Step)

An intermediate processing step according to the present invention is a step in which a process D for dry etching a base material which has completed the aforementioned preliminary processing step and a process S for depositing a seed layer comprising at least tungsten in an islands type pattern onto the base material, are performed at least once, under a pressure environment greater than the degree of vacuum in the aforementioned preliminary processing step.

Furthermore, the intermediate processing step may also comprise, in addition to the aforementioned process D and the aforementioned process S, a process O which is performed at least once, in which the aforementioned base material is exposed to a predetermined oxygen atmosphere under a pressure environment greater than the predetermined degree of vacuum in the aforementioned preliminary processing step.

The dry etching processing of the aforementioned process D, in the examples described below, used a high frequency sputtering technique using high purity Ar gas. This technique involves the application of an alternating voltage to the base material 11, and when the base material is at a negative potential, positively ionized Ar gas is collided onto the base material surface, causing the physical removal of those deposits still remaining on the surface of the base material 11 after the aforementioned heating process. Dry etching processing is not limited to the method described above, and other etching techniques based on the same principles, for example, etching which uses a mixture of a reactive gas such as hydrogen with Ar gas instead of the Ar gas described above, or etching methods which utilize either direct current sputtering or direct current sputtering which is carried out while a bias is applied to the base material, instead of the aforementioned high frequency sputtering, can also be used.

In terms of a method for the deposition of the islands type seed layer 12 in the aforementioned process S, in the examples described below a method was used wherein a W or a Cr containing W target was used, an alternating voltage was applied to the target and sputtering carried out in an atmosphere of high purity Ar gas, with deposition being performed so that the sputtered particles form island type shapes on the base material 11. By controlling mainly the temperature of the base material, the gas pressure, and the speed of film formation, a seed layer 12 of the desired form was able to be produced.

In terms of a method for exposing the base material surface to oxygen in the aforementioned process O, in the examples described below a method was used wherein following movement of the base material 11 into a processing chamber at a predetermined level of reduced pressure, a suitable quantity of oxygen gas was introduced into the processing chamber, and the gas inflow and the gas exhaust speed and the like were then suitably controlled to adjust the pressure to a desired level so that the inside of the processing chamber following introduction of the oxygen gas was subject to a pressure environment greater than the predetermined degree of vacuum from the previous process. By exposing a base material 11 with a predetermined surface form to this controlled oxygen atmosphere, a suitable quantity of oxygen is able to be adhered to the surface of the base material 11, with a discrete and uniform distribution.

Oxygen gas was used in the examples, but other gases for which similar effects could be expected, such as a mixture of oxygen gas and an inert gas, could also be used. Needless to say, in the case where the base material temperature during the oxygen exposure is changed, then provided the gas inflow and the like are altered and the pressure inside the processing chamber suitably adjusted, the same effects can be achieved.

Suitable combinations for the aforementioned intermediate processing step include the following combinations. The listed content A:B following the numbers in parentheses represent respectively A=the name of the medium, and B=the sequence of processes within the intermediate processing step used.

(1) DS medium: process D→process S
(2) SD medium: process S→process D
(3) DSO medium: process D→process S→process O
(4) SDO medium: process S→process D→process O
(5) DOS medium: process D→process O→process S
(6) DOSD medium: process D→process O→process S→process D
(7) DOSDO medium: process D→process O→process S→process D→process O As is described in more detail in the examples below, the intermediate processing steps with the larger numbers in parentheses above, in comparison with the smaller numbers, enable the formation of ferromagnetic metal layers 14 with even smaller crystal grains.

However, an intermediate processing step according to the present invention is not limited to the 7 steps described above, and other combinations of the process D, the process S and the process O are also possible, provided the individual effects of the three processes according to the present invention are freely combined to produce a resulting miniaturization in the crystal grains which make up the ferromagnetic metal layer 14.

(Post Processing Step)

A post processing step according to the present invention is a step for sequentially depositing a metal underlayer and a aforementioned ferromagnetic metal layer on top of the seed layer formed in the aforementioned intermediate processing step.

In terms of the methods of forming the metal underlayer and the ferromagnetic metal layer during this process, in the examples described below a method was used wherein a Cr target was used in the formation of the metal underlayer and a CoCrTa alloy target used in the formation of the ferromagnetic metal layer, and a direct voltage was applied to the target under an atmosphere of introduced high purity Ar gas and sputtering then performed, thereby sequentially depositing, on the base material 11, a metal underlayer comprising a Cr film and a ferromagnetic metal layer comprising a CoCrTa film.

In the examples described below, an example is shown in which a Cr target is used in the formation of the metal underlayer, and a CoCrTa alloy target is used in the formation of the ferromagnetic metal layer, but in order to achieve the actions and effects of the present invention, a material comprising Cr as a major constituent could also be used for the metal underlayer target, and a material comprising a Co based alloy could also be used for the ferromagnetic metal layer target.

In a layered medium used in the present invention, namely in a magnetic recording medium in which a ferromagnetic metal layer 14 comprising a Co based alloy is formed on top of a base material 11, with a metal underlayer 13 comprising Cr as a major constituent disposed therebetween, it is widely known that because the Cr film of the metal underlayer 13 is (200) oriented and the ferromagnetic metal layer 14 is grown thereon by epitaxial growth with (110) orientation, the crystalline orientation of the metal underlayer 13 ensures a good crystalline orientation of the ferromagnetic metal layer 14. Consequently, in the film formation chamber in which the post processing step according to the present invention is carried out, a back pressure (namely, the ultimate vacuum prior to the introduction of the Ar gas used in film formation) which enables good epitaxial growth is required. In the examples described below this back pressure was set at the $10^{-7}$ Torr level, although of course a back pressure at the $10^{-9}$ Torr level or lower which enables further increases in the coercive force even with the same materials, as disclosed in International Patent Application No. PCT/JP97/01092 by the present inventor, is also applicable to a production method according to the present invention.

(Dry Etching Processing)

Examples of suitable methods for the dry etching processing according to the present invention include a technique in which an alternating voltage from a high frequency [for example, RF (radio frequency 13.56 MHz)] power source is applied to a base material 11 placed in a gas pressurized space containing a gas capable of electrical discharge, a so-called high frequency sputtering technique. The feature of this method is that it can also be applied in cases where the base material 11 is not conductive. Dry etching processing is carried out for the purpose of either removing deposits of gas components present on the surface of the base material 11, or improving the adhesion of a thin film to the base material 11. However, the effects on the film properties of a thin film formed on top of the surface of a base material 11 following dry etching are largely unclear.

In the examples described below, the dry etching processing was performed using a method wherein RF power was applied to a base material 11 placed in an Ar atmosphere. During this process, the Ar gas pressure should preferably be from 1 to 40 [mTorr], and in the case of 200 [W] RF power, for example, the processing time period may be selected from a range between 1 and 120 [seconds].

(Process Gas)

An example of a suitable process gas according to the present invention is the Ar gas used in the production of semiconductors (with an impurity concentration of no more than 5 ppm), and this gas can be used during the film formation of the seed layer, the metal underlayer, and the ferromagnetic metal layer, as well as during the process for dry etching the surface of the base material.

(Application of Negative Bias to the Base Material)

"Application of a negative bias to the base material" in the present invention refers to the application of a direct current bias voltage to the base material 11 during the formation of the Cr underlayer 13 and the magnetic film 14 of a magnetic recording medium 10. It is known that by applying a suitable bias voltage, the coercive force of the medium increases. It is already known that the effect of the bias application described above is greater if the application is performed during the formation of both layers rather than during the formation of just one of the two films.

However, the above bias application can often also act on objects near the base material, namely on base material support members or base material holders. As a result, gas and dust are generated in the space surrounding the base material, and there is a possibility of this gas or dust being incorporated within the thin film being produced, and producing instability in the various film characteristics.

Furthermore, application of a bias to the base material 11 also suffers from the following problems.

(1) The technique cannot be applied to non-magnetic base materials such as glass.
(2) The saturation magnetic flux density (Ms) of the formed magnetic film is lowered.
(3) Complicated mechanisms need to be provided within the film formation chamber.
(4) The degree of bias applied to the base material can easily change, and as a result, variations are likely in the magnetic characteristics.

Accordingly, a production method which enables the target film characteristics to be obtained without using the aforementioned bias application is desirable.

In a production method for a magnetic recording medium 10 according to the present invention, even without applying a negative bias to the base material 11, the grain diameter of the crystal grains which make up the ferromagnetic metal layer 14 can be reduced, and the variation in the grain diameter can also be suppressed, and so the present invention offers the advantage that the above problems do not arise.

(Ultimate Vacuum of the Film Formation Chamber used for forming the Metal Underlayer and the Ferromagnetic Metal Layer)

Conventionally, the "ultimate vacuum of the film formation chamber used for forming the metal underlayer 13 and the ferromagnetic metal layer 14" is positioned as one of the film formation factors which affect the value of the coercive force, depending on the material of the ferromagnetic metal layer 14. Particularly in a ferromagnetic metal layer 14 which uses a Co based material which also incorporates Ta, it is thought that this effect is large in those cases where the aforementioned ultimate vacuum is low (for example, at the $10^{-6}$ to $10^{-7}$ Torr level). However, in a medium with a seed layer 12 according to the present invention, even if a magnetic film 14 is formed in a film formation chamber with an ultimate vacuum at the $10^{-7}$ level, there is almost no reduction in the coercive force, and stable magnetic characteristics can still be produced.

(Surface Temperature of the Base Material during Formation of the Metal Underlayer and the Ferromagnetic Metal Layer)

The "surface temperature of the base material 11 during formation of the metal underlayer 13 and the ferromagnetic metal layer 14" in the present invention is one of the film formation factors which affect the value of the coercive force, regardless of the material used in the ferromagnetic metal layer 14. Provided the temperature is within a range which does not damage the base material 11, then film formation at higher surface temperatures is able to realize higher levels of coercive force. Damage to the base material 11 refers to external changes such as warping, blistering or splitting, as well as internal changes such as generation of magnetization, or increases in gas emission volumes.

The seed layer 12 provided on the base material 11 according to the present invention contributes to maintaining the surface temperature of the base material 11 at a predetermined temperature during the formation of the metal underlayer 13 and the ferromagnetic metal layer 14. Typically, for a base material with a low thermal conductivity such as glass, it is difficult to raise, or maintain the temperature of the base material, but by providing a seed layer 12 of the present invention on top of the base material 11, the surface of the base material can be maintained at the desired temperature, and so the above problem is resolved, and it becomes possible to form a medium with stable magnetic characteristics.

(Surface Roughness of the Base Material, Ra)

An example of the surface roughness of a base material 11 of the present invention is the center line average height Ra measured in a radial direction across the surface of a disk shaped base material. An example of a suitable measuring apparatus is a Talystep manufactured by Rank Taylor Hobson Ltd.

When the base material 11 shifts from a stationary state and rotation is started, or in the reverse case, then the surfaces of the magnetic recording medium 10 and the magnetic head contact and slide (this is known as contact start stop or CSS). At this time, in order to suppress adsorption onto the magnetic head as well as any increase in the coefficient of friction, it is preferable that Ra is large. In contrast, in the case where the base material has reached the maximum number of revolutions, then there is a need to ensure the gap between the magnetic recording medium 10 and the magnetic head, namely the flying height of the magnetic head, is maintained and so smaller values of Ra are desirable.

Consequently, the surface roughness of the base material 11, and the maximum and minimum values of Ra, can be suitably determined using the above reasoning and the required specifications for the magnetic recording medium 10. For example, in the case of a magnetic head flying height of 2 μinch, Ra=6 nm to 8 nm.

However, in order to further increase recording density, it is necessary to further reduce the flying height (the distance by which the magnetic head is separated from the surface of the magnetic recording medium 10 during recording and playback operations) of the magnetic head. In order to respond to this requirement, it is important to further improve the flatness of the surface of the magnetic recording medium 10. For this reason, the surface roughness of the base material should preferably be as low as possible.

Accordingly, a production method is needed which enables the various target film characteristics to be achieved, even in those cases where the surface roughness of the base material is small.

In response to this requirement, a seed layer 12 according to the present invention functions effectively even when provided on an ultra smooth base material 11 with a surface roughness Ra of 7 Å(=0.7 nm), and a medium of the present invention in which a metal underlayer 13 and a ferromagnetic metal layer 14 are layered on top of such a base material 11 is able to retain a surface roughness which is approximately the same as that of the base material surface.

(Texture Processing)

Examples of texture processing that can be performed on a magnetic recording medium 10 include, for example, methods which utilize mechanical grinding, methods utilizing chemical etching, and methods which rely on the provision of a physically irregular film. Particularly in the case of an aluminum alloy base material, which represents the most widely used base material 11 for magnetic recording media, mechanical grinding methods are employed. For example, a method exists wherein concentric circular fine scratches are formed on a (Ni—P) film provided on the surface of an aluminum alloy base material by using a tape in which abrasive grains for use in grinding have been adhered to the surface, and then pressing this tape onto the rotating base material. In this method, the abrasive grains for use in grinding may also be removed from the tape and used.

In contrast, in the present invention, the type of texture processing described above is not carried out, and a medium with an ultra smooth surface [a surface roughness Ra of 7 Å(=0.7 nm)] is used, and so media which are easily capable of coping with the lowering of the magnetic head flying height required for further increasing recording density can be produced with good stability.

(Magnetic Recording Device)

Figure 24:
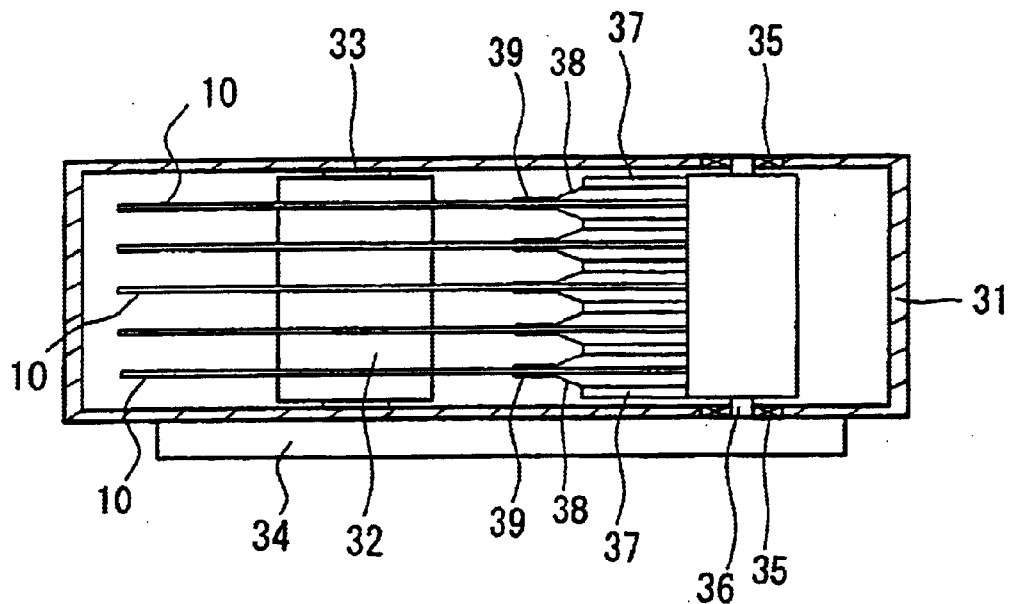
FIG. 24 is a sectional side view showing an example of a magnetic recording device according to the present invention.
Figure 25:
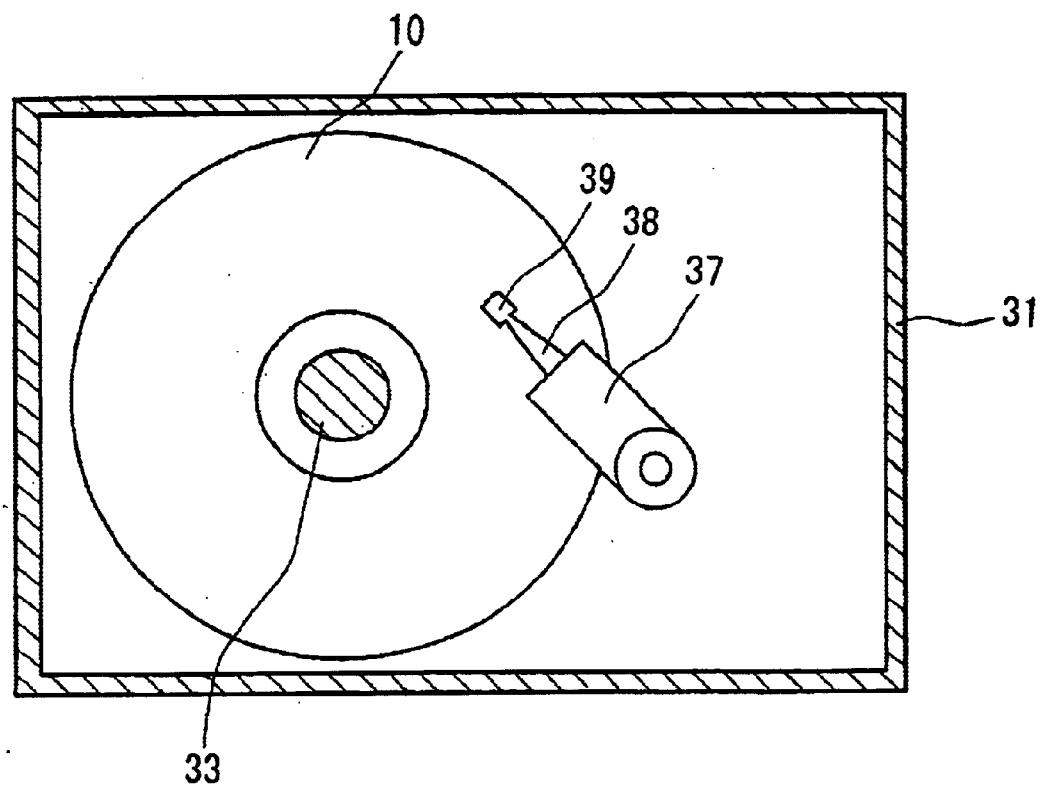
FIG. 25 is a sectional plan view of the magnetic recording device shown in FIG. 24.

FIG. 24 is a sectional side view showing one example of a magnetic recording device according to the present invention. FIG. 25 is a sectional plan view of the magnetic recording device shown in FIG. 24. These figures show an example of a computer HDD (hard disk drive) device (magnetic recording device) incorporating a magnetic recording medium 10 according to the present invention described above.

As shown in FIG. 24, in a magnetic recording device 30, a plurality (5 in the case of the example shown in FIG. 24) of magnetic recording media 10 and alternating spacers 32 are passed through a spindle 33 inside a casing 31 representing the main body. Furthermore, a bearing for the spindle 33 is provided on the casing 31, and a motor (drive section) 34 for rotating the spindle is provided outside the casing 31, so that the magnetic recording media 10 can be freely rotated about the spindle 33.

Inside the aforementioned casing 31 and alongside the aforementioned magnetic recording media 10 is provided a rotational axis 36 which is supported in an arrangement parallel with the aforementioned spindle 33 by a bearing 35, and a plurality of swing arms 37 are attached to the rotational axis 36 so as to extend out towards the magnetic recording media 10. Moreover as can be seen in FIG. 25, a magnetic head 39 is attached to the tip of each swing arm 37 via a triangular plate shaped load arm 38.

Each magnetic head 39 comprises a thin film magnetic head, a MIG type magnetic head or a dual magnetic head element which integrates a MIG type magnetic head and a dedicated read only magnetoresistance effect type magnetic element, together with a slider, and this slider is elastically supported by a gimbal member provided at the tip of the load arm 38. The magnetic head 39 is configured so as to be capable of movement, in combination with the swing arm 37, to any position on the magnetic recording medium 10.

In a magnetic recording device 30 of the above construction, by rotating the magnetic recording media 10 and moving the swing arm 37 so as to move the magnetic head 39 to any position above the magnetic recording medium 10, and then applying a magnetic field generated at the magnetic head 39 to the ferromagnetic metal layer (magnetic recording layer) 14 of the magnetic recording medium 10, the desired magnetic information can be written to the magnetic recording medium 10 as a magnetic pattern. Furthermore, by moving the swing arm 37 and moving the magnetic head 39 to any position above the magnetic recording medium 10, and then using the magnetic head 39 to detect the leakage magnetic field from the ferromagnetic metal layer (magnetic recording layer) 14 of the magnetic recording medium 10, readout of the magnetic information can be carried out.

When the writing and reading of magnetic information is performed in this manner, if the ferromagnetic metal layer (magnetic recording layer) 14 comprises the smaller minute crystal grains described above and offers superior magnetic characteristics, then because thermal agitation of the magnetic film which makes up the ferromagnetic metal layer 14 can be suppressed, even if the inside of the magnetic recording device 30 is heated by the motor 34, and for example rises to a high temperature exceeding 100° C., but continues to be used, then any deterioration in the magnetic characteristics of the magnetic film of the ferromagnetic metal layer 14 can be suppressed. Furthermore, even if the device is used for extended periods, and is heated for prolonged periods, deterioration or fluctuation in the magnetic recording and playback characteristics of the ferromagnetic metal layer 14 is largely prevented from occurring, and so a magnetic recording device 30 with superior recording and playback characteristics can be provided.

The magnetic recording device 30 described above based on FIG. 24 and FIG. 25 shows one example of a magnetic recording device, and the number of magnetic recording medium discs provided in the magnetic recording device may be any number from one upwards, and similarly the number of magnetic heads 39 provided in the device may also be any number from one upwards. In addition, the shape of the swing arms 37 and the drive system used are not limited to those shown in the figures, and needless to say, other drive systems such as a linear drive system or the like are also possible.

EXAMPLES

As follows is a more detailed description of the present invention based on a series of examples, although the present invention is not limited to the examples presented.

Example 1

DS Medium

In this example, a description is given of a method in which following the deposition of an islands type seed layer comprising at least tungsten onto a base material which has undergone dry etching processing, a metal underlayer and a ferromagnetic metal layer are deposited sequentially on top of the seed layer, in other words, a method in which the intermediate processing step according to the present invention consists of a process D (a process for performing dry etching processing on the base material) and a process S (a process for depositing an islands type seed layer comprising at least tungsten onto the base material), with these processes carried out in a sequence in which the process D is followed by the process S (which corresponds with claim 6: hereafter this method is referred to as the first magnetic recording medium production method). In this method, in order to confirm the effect of providing an islands type seed layer comprising at least tungsten (W) on top of the base material, in the description below a medium was prepared with a seed layer made up of only W.

The sputtering apparatus used in the production of the medium in this example was a magnetron sputtering apparatus manufactured by Anelva Ltd. (model ILC3013: load lock system with a stationary facing mode), in which the internal walls of all vacuum chambers [loading/removal chamber (which also functions as the etching chamber), film formation chamber 1, film formation chamber 2, and film formation chamber 3] have undergone composite electrolytic polishing. Table 1 shows the film formation conditions for preparation of the magnetic recording medium of this example.

TABLE 1

| Item | Settings |
| --- | --- |
| Material for the base material | Al—Mg alloy [with (Ni—P) plating of film thickness 10 μm attached] |
| Diameter and shape of base material | 89 nm, disc shaped |
| Surface form of base material | untextured, Ra: 7 Å or less |
| [Conditions for common processes] | |
| Ultimate vacuum | $10^{-7}$ Torr level or lower (all chambers the same) |
| Process gas | Ar (Impurity concentration: no more than 5 ppm) |
| [Dry etching conditions] | |
| Etching time | 5 [seconds] |
| Ar gas pressure | 2 [mTorr] |
| RF power applied to base material | 200 [W] |
| Maintained temperature of base material surface | 200 [° C.] |
| [Seed layer formation conditions] | |
| Target material | W (purity: 3N) |
| Ar gas pressure | 5 [mTorr] |
| Film formation speed | 2.0 [Å/second] |
| Film thickness | 1 nm (calculated from the film formation speed) |
| [Metal underlayer formation conditions] | |
| Target material | Cr (purity: 3N) |
| Ar gas pressure | 5 [mTorr] |
| Film formation speed | 12.5 [Å/second] |
| Film thickness | 10 nm (calculated from the film formation speed) |
| [Ferromagnetic metal layer formation conditions] | |
| Target material | $Co_{78}Cr_{17}Ta_5$ [atomic %] (purity: 3N) |
| Ar gas pressure | 5 [mTorr] |
| Film formation speed | 15.0 [Å/second] |
| Film thickness | 10 nm (calculated from the film formation speed) |

As follows is a description of the production method for the magnetic recording medium of this example, in the order of the production procedure. The numbers in parentheses below represent that procedure.

FIGS. 15A–E are diagrams showing each of the steps in the preparation of a magnetic recording medium using the first production method according to this example, together with a schematic cross-sectional view of the sample at each of those steps.

(A2) Before forming the film described below, the aforementioned base material 11 was cleaned using mechanical and chemical procedures, and was dried using hot air drying or the like.

(A3) Having been dried, the base material 11 was set on a base material holder made of aluminum positioned inside the loading chamber of a sputtering device. Using a suitable vacuum evacuation device, the inside of the loading chamber was evacuated down to an ultimate vacuum at the $10^{-7}$ Torr level. Subsequently, the base material underwent heating with an infrared lamp at 200° C. for a period of 5 minutes (the preliminary processing step).

(A4) Ar gas with an impurity concentration of no more than 5 ppm was introduced into the loading chamber (which also functions as the etching chamber), and once the gas pressure had reached 10 mTorr, a predetermined voltage from an RF power source was applied to the base material 11, and the base material surface was subjected to dry etching (the process D of the intermediate processing step). The conditions for the dry etching process included a gas pressure of 2 mTorr, an applied power of 200 W, and a processing time of 5 seconds.

(A5) The aforementioned base material holder was then moved from the etching chamber into the film formation chamber 1 for formation of the seed layer. Even following this movement, the base material 11 was still heated by an infrared lamp to maintain the temperature at 200° C. The film formation chamber 1 had previously been evacuated down to an ultimate vacuum at the $10^{-7}$ Torr level, and following completion of the movement of the base material holder, a door valve between the etching chamber and the film formation chamber 1 was closed. W (purity: 3N) was used as the target for the seed layer formation.

(A6) Following the introduction of Ar gas into the film formation chamber 1, and the raising of the gas pressure inside the film formation chamber 1 to 5 mTorr, a predetermined voltage from a direct current power source was applied to the W target, generating a plasma. As a result, the W target underwent sputtering, and a seed layer 12 of islands of W with a film thickness calculated from the film formation speed of 1 nm was formed on the surface of the base material 11, which was positioned parallel to, and facing the target (the process S of the intermediate processing step).

(A7) The aforementioned base material holder was then moved from the film formation chamber 1 to the film formation chamber 2 for formation of the metal underlayer. Even following this movement, the base material 11 was still heated by an infrared lamp to maintain the temperature at 200° C. The film formation chamber 2 had previously been evacuated down to an ultimate vacuum at the $10^{-7}$ Torr level, and following completion of the movement of the base material holder, a door valve between the film formation chamber 1 and the film formation chamber 2 was closed. Cr (purity: 3N) was used as the target for the metal underlayer formation.

(A8) Following the introduction of Ar gas into the film formation chamber 2, and the raising of the gas pressure inside the film formation chamber 2 to 5 mTorr, a predetermined voltage from a direct current power source was applied to the Cr target, generating a plasma. As a result, the Cr target underwent sputtering, and a metal underlayer 13 comprising a Cr layer with a film thickness of 10 nm was formed on the surface of the base material 11, which was positioned parallel to, and facing the target (the metal underlayer formation from the post processing step).

(A9) Following formation of the Cr layer, the aforementioned base material holder was moved from the film formation chamber 2 to the film formation chamber 3 for formation of the ferromagnetic metal layer. Even following this movement, the base material 11 was still heated by an infrared lamp to maintain the temperature at 200° C. The film formation chamber 3 had previously been evacuated down to an ultimate vacuum at the $10^{-7}$ Torr level, and following completion of the movement of the base material holder, a door valve between the film formation chamber 2 and the film formation chamber 3 was closed. An alloy target comprising 78 at % Co, 17 at % Cr and 5 at % Ta (purity: 3N) was used as the target for the ferromagnetic metal layer formation.

(A10) Following the introduction of Ar gas into the film formation chamber 3, and the raising of the gas pressure inside the film formation chamber 3 to 5 mTorr, a predetermined voltage from a direct current power source was applied to the CoCrTa target, generating a plasma. As a result, the CoCrTa target underwent sputtering, and a ferromagnetic metal layer 14 comprising a CoCrTa layer with a film thickness of 10 nm was formed on the surface of the Cr layer provided on the base material 11, which was positioned parallel to, and facing the target (the ferromagnetic metal layer formation from the post processing step).

(A11) Following formation of the CoCrTa layer, the aforementioned base material holder was moved from the film formation chamber 3 into the removal chamber. Subsequently, $N_2$ gas was introduced into the removal chamber, and following the raising of the pressure to atmospheric pressure, the base material was removed.

The aforementioned processes (A1) to (A11) completed the preparation of a magnetic recording medium with a layer structure of Al/NiP/W/Cr/CoCrTa [hereafter referred to as sample α(W)]. In other words, the medium prepared in this example is a medium with a seed layer constructed solely of W.

Example 2

In this example, with the exception of using a $W_{28}Cr_{72}$ alloy (purity: 3N) as the target for the seed layer formation, instead of the W target of the example 1, a medium was prepared in the same manner as the example 1, to produce a magnetic recording medium with a layer structure of Al/NiP/WCr/Cr/CoCrTa [hereafter referred to as sample α(WCr)]. In other words, the medium prepared in this example is a medium with a seed layer constructed of a WCr alloy. Here, the numbers recorded after each of the elements refers to the atomic percentage (at %) of that particular element.

Comparative Example 1

In this comparative example, with the exception of not providing the seed layer from the example 1, a medium was prepared in the same manner as the example 1, to produce a conventional magnetic recording medium with a layer structure of Al/NiP/Cr/CoCrTa [hereafter referred to as sample α(NA)].

Comparative Example 2

In this comparative example, with the exception of providing a flat two dimensional W seed layer instead of the islands type W seed layer of the example 1, a medium was prepared in the same manner as the example 1, to produce a magnetic recording medium with a layer structure of Al/NiP/W/Cr/CoCrTa [hereafter referred to as sample α(Wf)]. The film thickness of the W seed layer was 5 nm.

Comparative Example 3

In this comparative example, with the exception of using Cr (purity: 3N) as the target for the seed layer formation, instead of the W target of the example 1, a medium was prepared in the same manner as the example 1, to produce a magnetic recording medium with a layer structure of Al/NiP/Cr/Cr/CoCrTa [hereafter referred to as sample α(Cr)].

FIG. 2 is a photograph taken with a scanning electron microscope (SEM) from above a seed layer 12, showing the form of the W seed layer 12 following formation of the W seed layer 12 on the base material 11 under the medium production conditions of the example 1. From this photograph it became clear that the W seed layer 12 was not a two dimensional flat film, but was rather an islands type film comprising locally scattered spots or islands.

Figure 3:
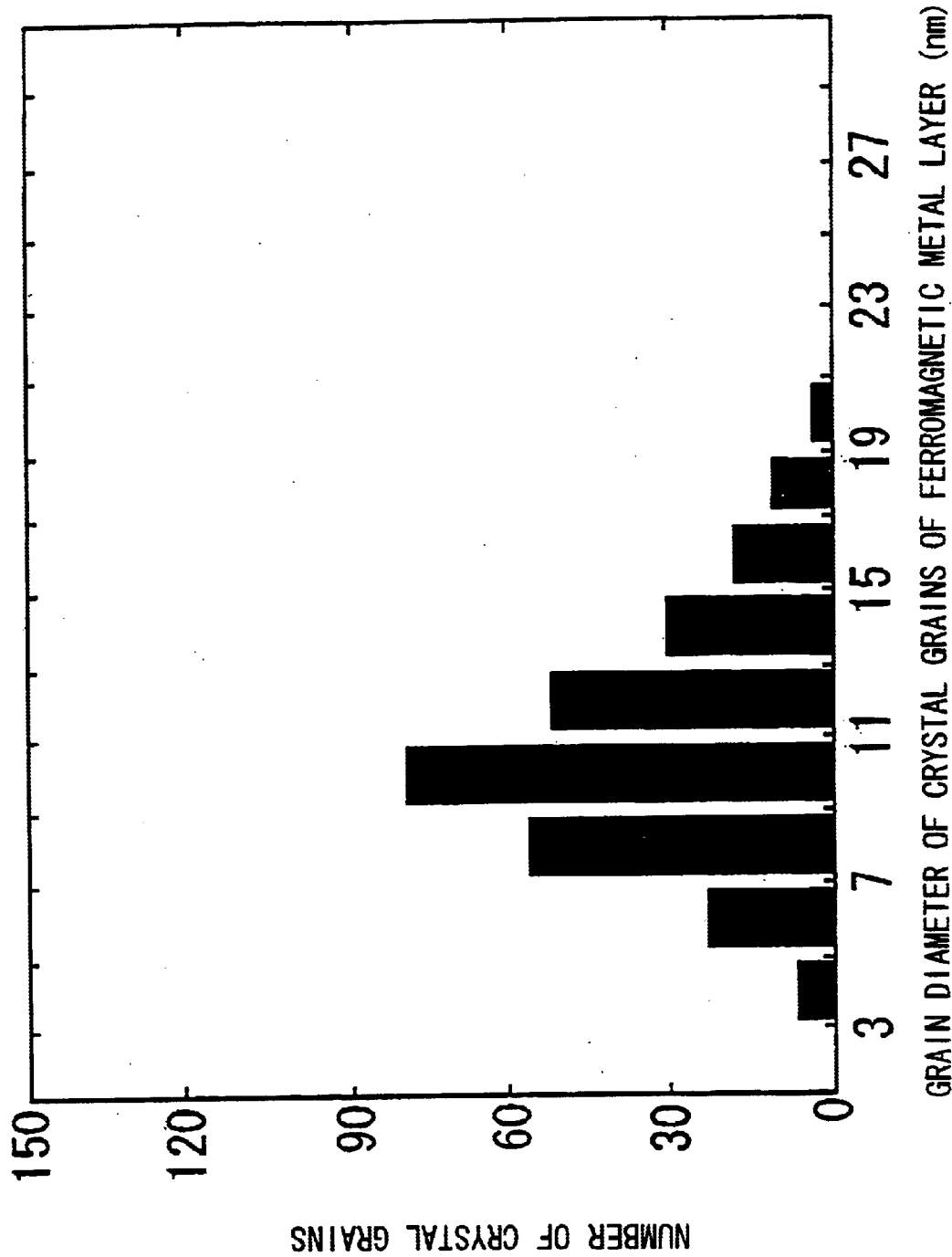
FIG. 3 is a graph showing a frequency distribution for the grain diameter of magnetic crystal grains in a ferromagnetic metal layer of a medium with an islands type W seed layer according to an example 1.
Figure 4:
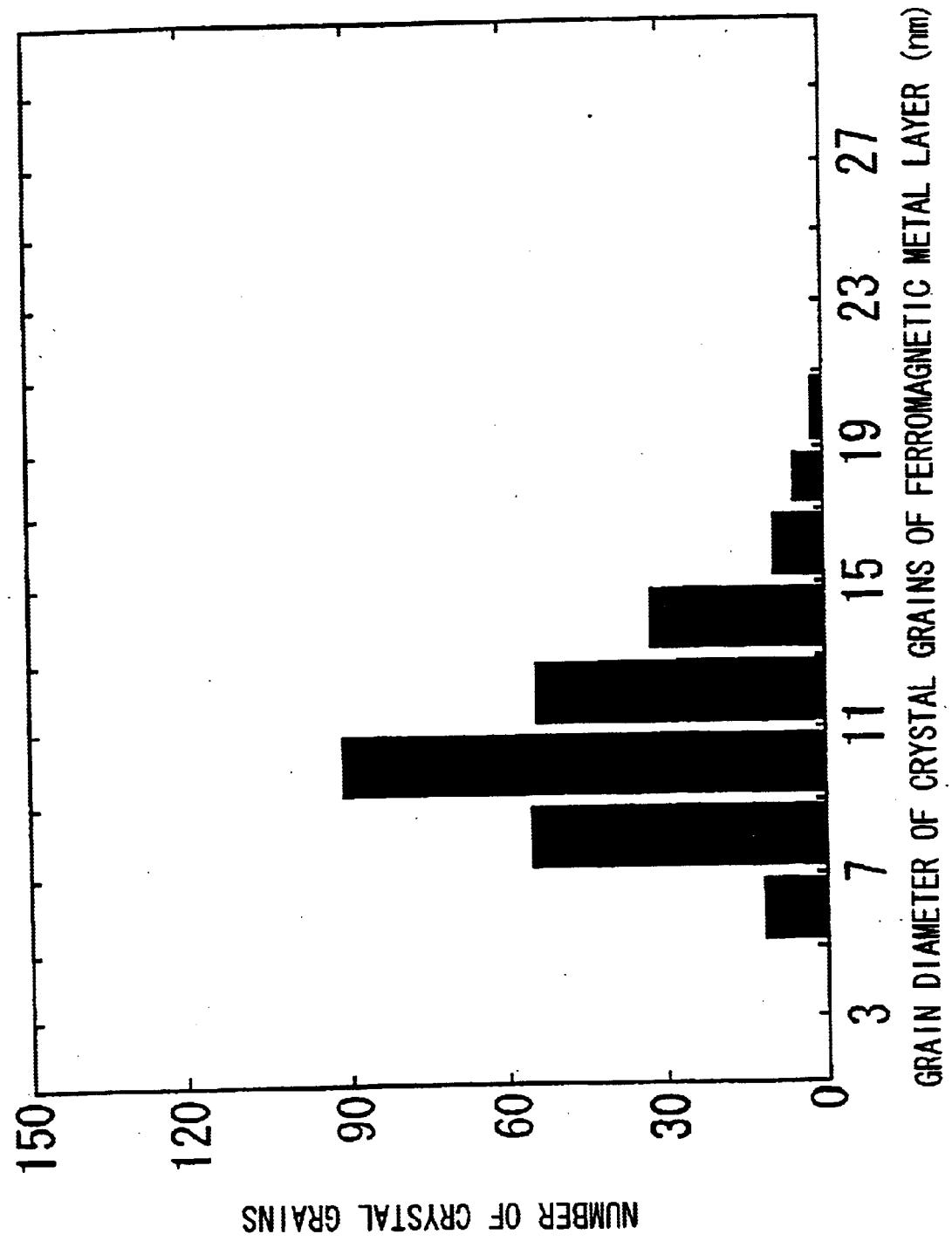
FIG. 4 is a graph showing a frequency distribution for the grain diameter of magnetic crystal grains in a ferromagnetic metal layer of a medium with an islands type WCr seed layer according to an example 2.
Figure 5:
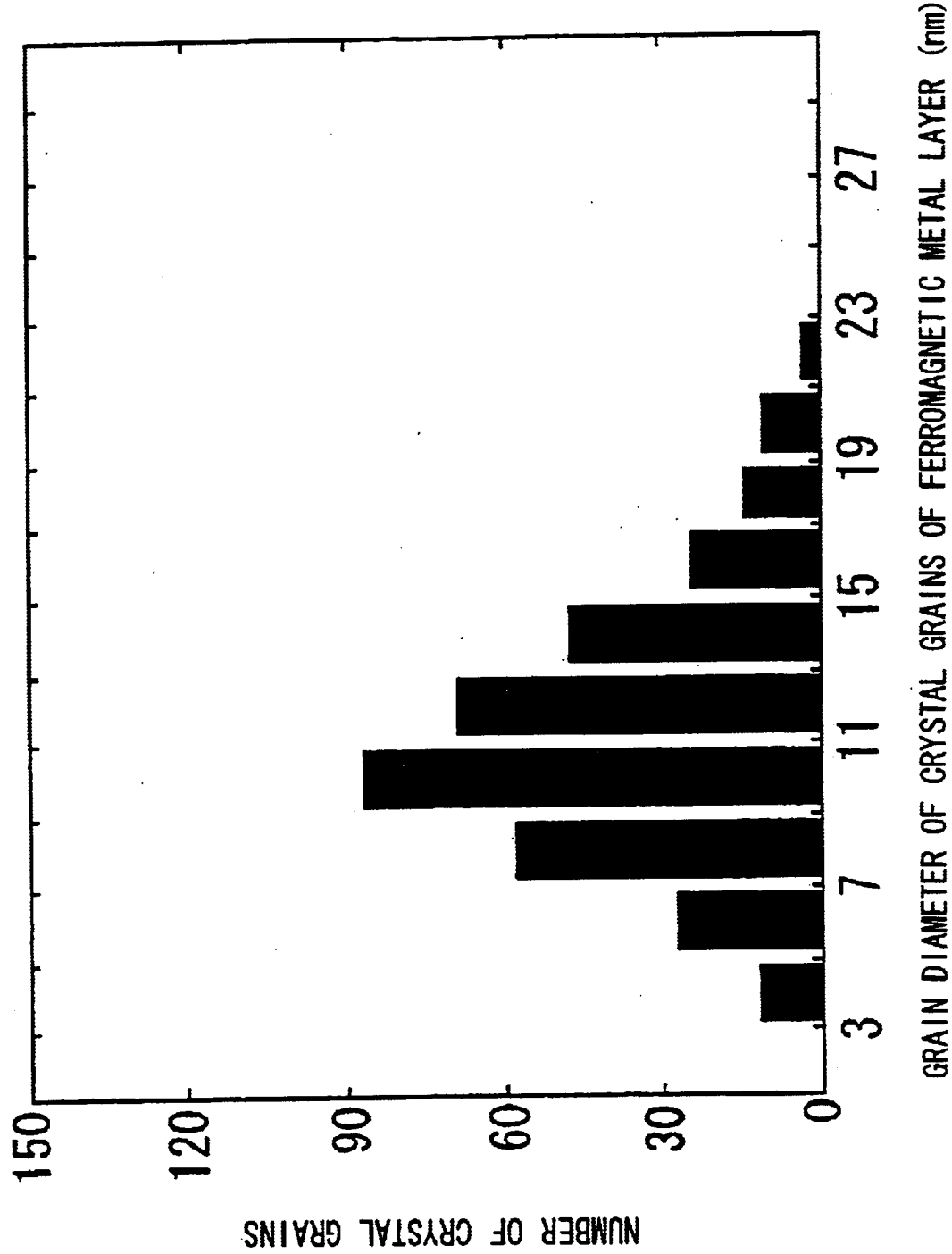
FIG. 5 is a graph showing a frequency distribution for the grain diameter of magnetic crystal grains in a ferromagnetic metal layer of a conventional medium with no seed layer according to a comparative example 1.
Figure 6:
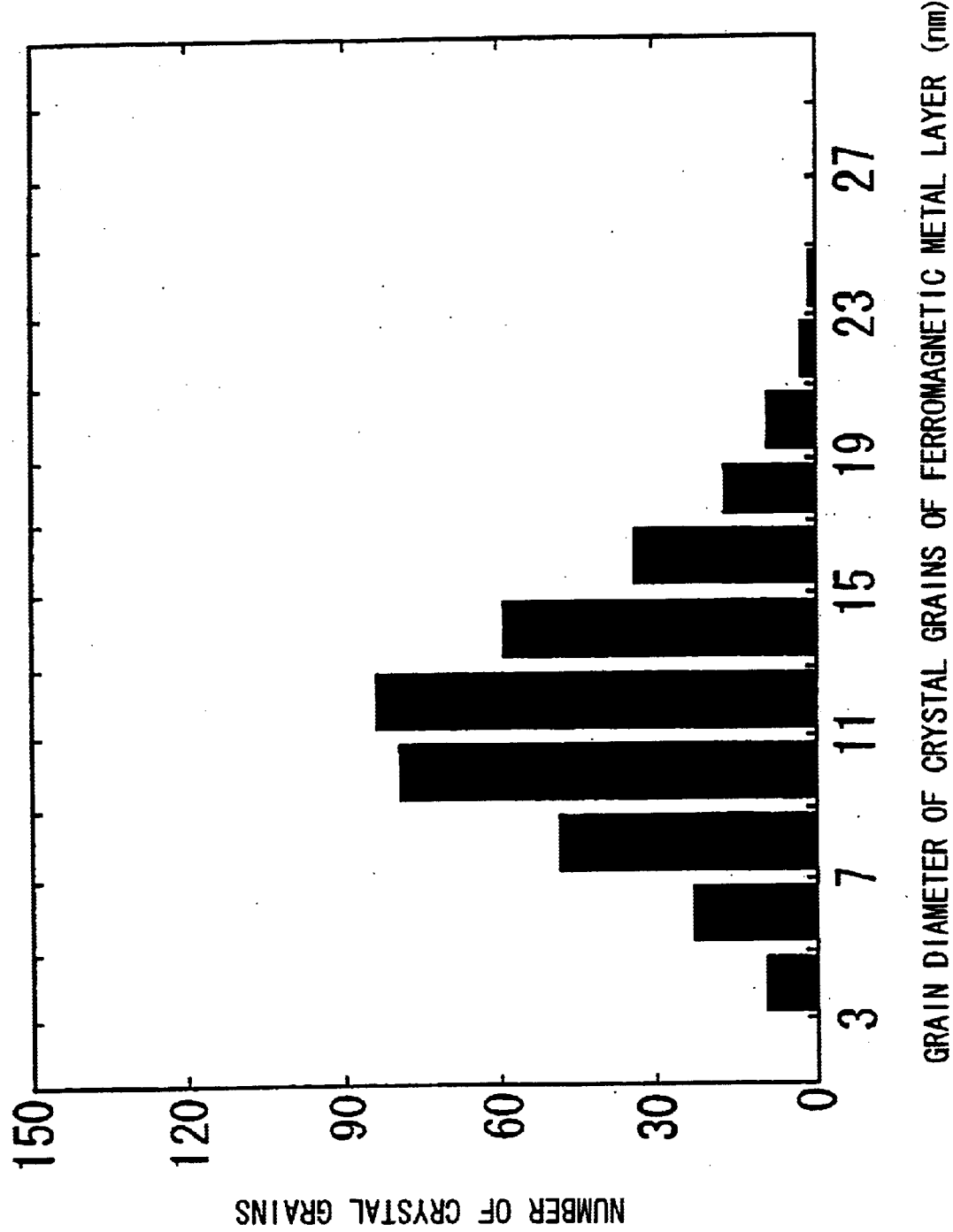
FIG. 6 is a graph showing a frequency distribution for the grain diameter of magnetic crystal grains in a ferromagnetic metal layer of a medium with a planar W seed layer according to a comparative example 2.
Figure 7:
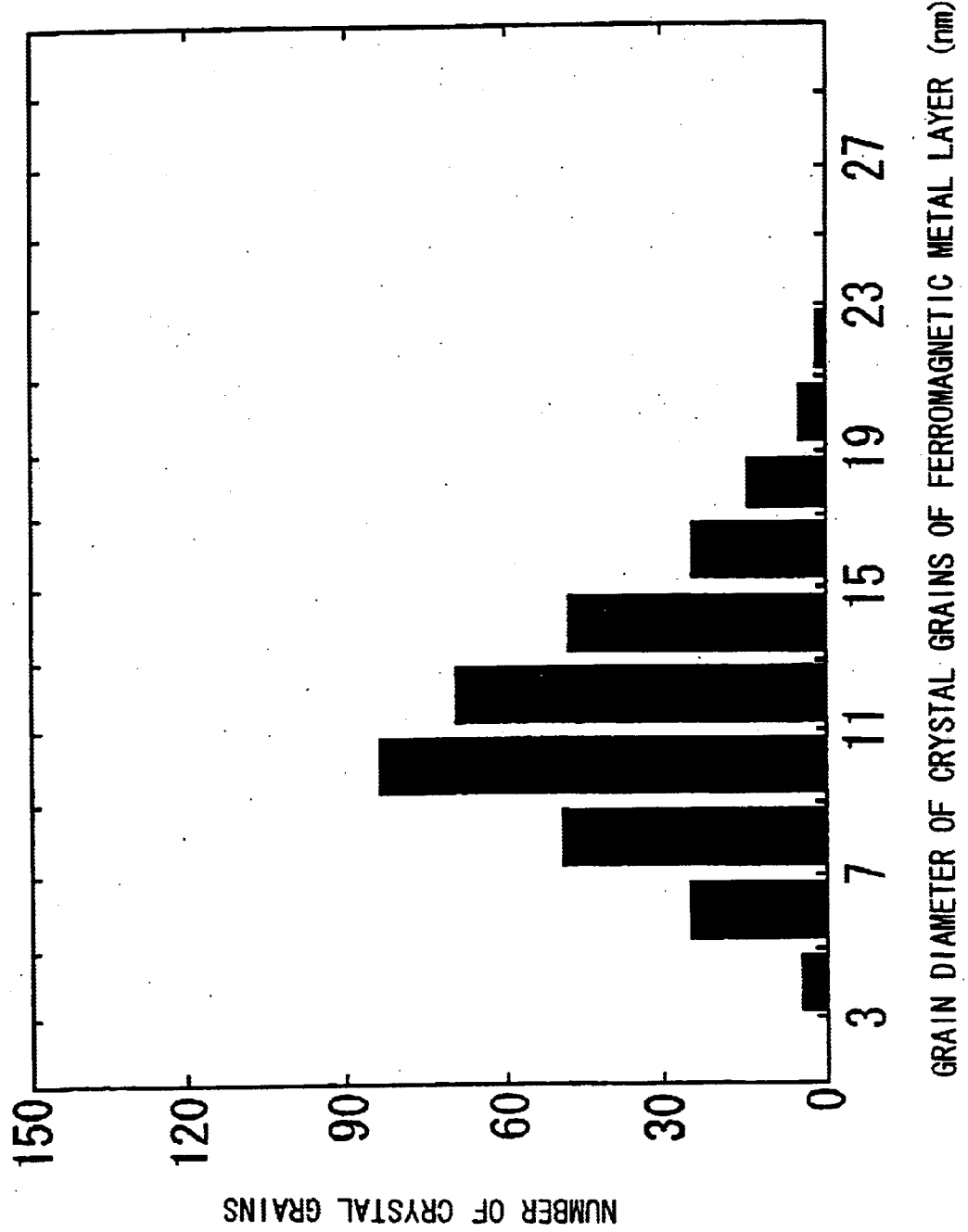
FIG. 7 is a graph showing a frequency distribution for the grain diameter of magnetic crystal grains in a ferromagnetic metal layer of a medium with an islands type Cr seed layer according to a comparative example 3.

From TEM images, observed (at a magnification of 850,000) with a transmission electron microscope (TEM), of the surface of the ferromagnetic metal layer 14 of each of the various media prepared in accordance with the first production method according to the present invention, grain diameter values were calculated for the crystal grains which make up each ferromagnetic metal layer 14, and the frequency distribution of these grain diameter values are summarized in the graphs of FIG. 3 to FIG. 7. FIG. 3 shows the results for the medium provided with an islands type W seed layer [sample α(W) from the example 1], FIG. 4 shows the results for the medium provided with an islands type WCr seed layer [sample α(WCr) from the example 2], FIG. 5 shows the results for the conventional medium without seed layer [sample α(NA) from the comparative example 1], FIG. 6 shows the results for the medium provided with a flat two dimensional W seed layer [sample α(Wf) from the comparative example 2], and FIG. 7 shows the results for the medium provided with an islands type Cr seed layer [sample α(Cr) from the comparative example 3].

From analyzing FIG. 3 to FIG. 7, the following points became clear.

(1) A medium in which an islands type W seed layer is provided between the base material and the metal underlayer (FIG. 3), in comparison with a conventional medium with no seed layer (FIG. 5), has a smaller frequency distribution for the grain diameter of the magnetic crystal grains which make up the ferromagnetic metal layer. The number of crystal grains with a large crystal grain diameter is particularly reduced.

(2) In the case where Cr is added to the islands type W seed layer (FIG. 4), the trend described in (1) above becomes even more apparent.

(3) In contrast, a medium provided with a W seed layer comprising a two dimensional flat film (FIG. 6), in comparison with a conventional medium with no seed layer (FIG. 5), displays an increase in the number of crystal grains with a grain diameter close to the average grain diameter, but also displays an increase in the number of crystal grains with large crystal grain diameters. Consequently, it was judged that the effect (1) described above did not exist in a medium provided with a W seed layer comprising a two dimensional flat film (FIG. 6).

(4) Furthermore, the trend observed in (1) above, was not seen for a medium provided with an islands type Cr seed layer (FIG. 7).

Table 2 combines the results for the average grain diameter d [nm] of the magnetic crystal grains of the ferromagnetic metal layer 14, the standard deviation σ [nm] of the magnetic crystal grains, and the value of the grain diameter distribution C.V. grain, calculated by dividing the standard deviation a of the magnetic crystal grains by the average grain diameter d, for each of the samples, as determined from the TEM microscope observations described above. Furthermore, the coercive force Hc of each medium as measured by VSM, and the degree of variation of the residual magnetization ΔM, which acts as an indicator of the change over time in magnetization recorded on the medium, are also presented in the Table 2.

TABLE 2

| Sample name | Average grain diameter d [nm] | Standard deviation σ [nm] | Grain diameter distribution C.V. grain | Coercive force Hc [kOe] | Variation over time ΔM [%/year] |
|---|---|---|---|---|---|
| α(W) | 9.8 | 3.23 | 0.33 | 1.50 | 8.7 |
| α(WCr) | 9.5 | 3.10 | 0.33 | 1.48 | 8.5 |
| α(NA) | 10.8 | 3.68 | 0.34 | 1.53 | 10.7 |
| α(Wf) | 11.5 | 3.67 | 0.32 | 1.50 | 10.6 |
| α(Cr) | 10.6 | 3.51 | 0.33 | 1.55 | 10.6 |

From analyzing Table 2, the following points became clear.

(5) A medium in which an islands type seed layer W is provided between the base material and the metal underlayer [α(W)], in comparison with a conventional medium with no seed layer [α(NA)], has both a smaller average grain diameter d of the magnetic crystal grains which make up the ferromagnetic metal layer, and a smaller standard deviation a of that grain diameter, and moreover the variation over time of the residual magnetization ΔM is also approximately 20% smaller. However, at the same time, there is almost no variation in the coercive force of the medium. No variation is seen in the grain diameter distribution C.V. grain.

(6) In the case where Cr is added to the W seed layer [α(WCr)], the trend described in (5) above becomes even stronger.

(7) In contrast, in a medium provided with a flat two dimensional W seed layer [α(Wf)], the average grain diameter d increases to a value greater than a conventional medium with no seed layer [α(NA)], although the standard deviation a and the grain diameter distribution C.V. grain do not change, and no improvement is seen in the variation in the residual magnetization ΔM.

(8) However, the trend observed in (5) above, was almost non-existent for a medium provided with an islands type Cr seed layer [α(Cr)].

Consequently, it became quite clear that by using the first magnetic recording medium production method according to the present invention, namely by using a method wherein following the deposition of an islands type seed layer 12 comprising at least tungsten onto a base material 11 which has undergone dry etching processing, a metal underlayer 13 and a ferromagnetic metal layer 14 are deposited sequentially onto the seed layer 12, the seed layer 12 comprising at least W which has been provided as islands on top of the base material 11 functions as a nucleus for the initial growth of the crystal grains of the metal underlayer 13 formed on the seed layer, and also causes a reduction in the size of the crystal grains of the metal underlayer 13, without inhibiting the crystal orientation of the Cr based metal underlayer 13 used for controlling the crystal orientation of the Co based ferromagnetic metal layer 14, and in addition also reduces the average grain diameter and the standard deviation of the magnetic crystal grains which make up the ferromagnetic metal layer 14 formed on the metal underlayer 13. As a result, it was realized that a medium with a small variation in residual magnetization over time ΔM could be obtained.

Then, because these effects can be achieved by controlling only the preparation conditions for the seed layer 12, without altering the film thickness of the metal underlayer 13 or the film thickness of the ferromagnetic metal layer 14 which functions as the recording layer, this method offers the advantage that in order to form a medium with a set of desired magnetic characteristics, the film thickness of the metal underlayer 13 and the film thickness of the ferromagnetic metal layer 14 can be designed and altered with total freedom.

Consequently, according to the first magnetic recording medium production method of the present invention, media of various magnetic characteristics can be easily produced while maintaining a small grain diameter for the magnetic crystal grains which make up the ferromagnetic metal layer 14, and so a production line which offers a high degree of freedom in terms of the medium design can be constructed.

Example 3

SD Medium

In this example, a description is given of a method in which an islands type seed layer comprising at least tungsten is deposited onto a base material surface which retains residual adsorbed gas, and following subsequent dry etching processing of the surface of the seed layer surface, a metal underlayer and a ferromagnetic metal layer are deposited sequentially on top of the seed layer, in other words, a method in which the intermediate processing step according to the present invention consists of a process D (a process for performing dry etching processing on the base material) and a process S (a process for depositing an islands type seed layer comprising at least tungsten onto the base material), with these processes carried out in a sequence in which the process S is followed by the process D (which corresponds with claim 7: hereafter this method is referred to as the second magnetic recording medium production method). In this method, in order to confirm the effect of providing an islands type seed layer comprising at least tungsten (W) on top of the base material, in the description below a medium was prepared with a seed layer made up of only W.

The sputtering apparatus used in the production of the medium in this example was the same magnetron sputtering apparatus manufactured by Anelva Ltd. described in the example 1. Table 3 shows the film formation conditions during preparation of the magnetic recording medium of this example.

TABLE 3

| Item | Settings |
| --- | --- |
| Material for the base material | Al—Mg alloy [with (Ni—P) plating of film thickness 10 μm attached] |
| Diameter and shape of base material | 89 nm, disc shaped |
| Surface form of base material | untextured, Ra: 7 Å or less |
| [Conditions for common processes] | |
| Ultimate vacuum | $10^{-7}$ [Torr] level or lower (all chambers the same) |
| Process gas | Ar (Impurity concentration: no more than 5 ppm) |
| [Seed layer formation conditions] | |
| Target material | W (purity: 3N) |
| Ar gas pressure | 5 [mTorr] |
| Film formation speed | 2.0 [Å/second] |
| Film thickness | 0.5 nm (calculated from the film formation speed) |

TABLE 3-continued

| Item | Settings |
| --- | --- |
| [Dry etching conditions] | |
| Etching time | 10 [seconds] |
| Ar gas pressure | 5 [mTorr] |
| RF power applied to base material | 50 [W] |
| Maintained temperature of base material surface | 200 [° C.] |
| [Metal underlayer formation conditions] | |
| Target material | Cr (purity: 3N) |
| Ar gas pressure | 5 [mTorr] |
| Film formation speed | 12.5 [Å/second] |
| Film thickness | 10 nm (calculated from the film formation speed) |
| [Ferromagnetic metal layer formation conditions] | |
| Target material | $Co_{78}Cr_{17}Ta_5$ [atomic %] (purity: 3N) |
| Ar gas pressure | 5 [mTorr] |
| Film formation speed | 15.0 [Å/second] |
| Film thickness | 10 nm (calculated from the film formation speed) |

As follows is a description of the production method for the magnetic recording medium of this example, in the order of the production procedure. The numbers in parentheses below represent that procedure.

FIGS. 16A–E are diagrams showing each of the steps in the preparation of a magnetic recording medium using the second production method according to this example, together with a schematic cross-sectional view of the sample at each of those steps.

(B1) A disc shaped aluminum alloy base plate 11a of thickness 0.80 mm and with internal/external diameters of 25 mm/89 mm was used for the base material 11, and plating techniques were used to provide a (Ni—P) film 11b of thickness 10 μm on top of the aluminum alloy base plate. The surface of this (Ni—P) film had undergone ultra smooth polishing by mechanical methods, and concentric circular shaped fine scratches (texture) such as those provided on the base material 51 of a conventional medium were not formed. The surface roughness of the (Ni—P) film 11b used in this example had a center line average height Ra of 7 Å or less.

(B2) Before forming the film described below, the aforementioned base material 11 was cleaned using mechanical and chemical procedures, and was dried using hot air drying or the like.

(B3) Having been dried, the base material 11 was set on a base material holder made of aluminum positioned inside the loading chamber of the sputtering device. Using a suitable vacuum evacuation device, the inside of the loading chamber was evacuated down to an ultimate vacuum at the $10^{-7}$ Torr level. Subsequently, the base material underwent heating with an infrared lamp at 200° C. for a period of 5 minutes (the preliminary processing step).

(B4) The aforementioned base material holder was then moved from the loading chamber into the film formation chamber 1 for formation of the seed layer. Even following this movement, the base material 11 was still heated by an infrared lamp to maintain the temperature at 200° C. The film formation chamber 1 had previously been evacuated down to an ultimate vacuum at the $10^{-7}$ Torr level, and following completion of the movement of the base material holder, a door valve between the etching chamber and the film formation chamber 1 was closed. W (purity: 3N) was used as the target for the seed layer formation.

(B5) Following the introduction of Ar gas into the film formation chamber 1, and the raising of the gas pressure inside the film formation chamber 1 to 5 mTorr, a predetermined voltage from a direct current power source was applied to the W target, generating a plasma. As a result, the W target underwent sputtering, and a seed layer 12 of islands of W with a film thickness calculated from the film formation speed of 0.5 nm was formed on the surface of the base material 11, which was positioned parallel to, and facing the target (the process S of the intermediate processing step).

(B6) The aforementioned base material holder was then moved from the film formation chamber 1 into the loading chamber (which also functions as the etching chamber). Even following this movement, the base material 11 was still heated by an infrared lamp to maintain the temperature at 200° C. Ar gas with an impurity concentration of 5 ppm was introduced into the etching chamber, and once the gas pressure had reached 10 mTorr, a predetermined voltage from an RF power source was applied to the base material 11, and the base material surface was subjected to dry etching (the process D of the intermediate processing step). The conditions for the dry etching process included a gas pressure of 5 mTorr, an applied power of 50 W, and a processing time of 10 seconds.

(B7) The aforementioned base material holder was then moved from the etching chamber to the film formation chamber 2 for formation of the metal underlayer. Even following this movement, the base material 11 was still heated by an infrared lamp to maintain the temperature at 200° C. The film formation chamber 2 had previously been evacuated down to an ultimate vacuum at the $10^{-7}$ Torr level, and following completion of the movement of the base material holder, a door valve between the etching chamber and the film formation chamber 2 was closed. Cr (purity: 3N) was used as the target for the metal underlayer formation.

(B8) Following the introduction of Ar gas into the film formation chamber 2, and the raising of the gas pressure inside the film formation chamber 2 to 5 mTorr, a predetermined voltage from a direct current power source was applied to the Cr target, generating a plasma. As a result, the Cr target underwent sputtering, and a metal underlayer 13 comprising a Cr layer with a film thickness of 10 nm was formed on the surface of the base material, which was positioned parallel to, and facing the target (the metal underlayer formation from the post processing step).

(B9) Following formation of the Cr layer, the aforementioned base material holder was moved from the film formation chamber 2 to the film formation chamber 3 for formation of the ferromagnetic metal layer. Even following this movement, the base material 11 was still heated by an infrared lamp to maintain the temperature at 200° C. The film formation chamber 3 had previously been evacuated down to an ultimate vacuum at the $10^{-7}$ Torr level, and following completion of the movement of the base material holder, a door valve between the film formation chamber 2 and the film formation chamber 3 was closed. An alloy target comprising 78 at % Co, 17 at % Cr and 5 at % Ta (purity: 3N) was used as the target for the ferromagnetic metal layer formation.

(B10) Following the introduction of Ar gas into the film formation chamber 3, and the raising of the gas pressure inside the film formation chamber 3 to 5 mTorr, a predetermined voltage from a direct current power source was applied to the CoCrTa target, generating a plasma. As a result, the CoCrTa target underwent sputtering, and a ferromagnetic metal layer 14 comprising a CoCrTa layer with a film thickness of 10 nm was formed on the surface of the Cr layer provided on the base material, which was positioned parallel to, and facing the target (the ferromagnetic metal layer formation from the post processing step).

(B11) Following formation of the CoCrTa layer, the aforementioned base material holder was moved from the film formation chamber 3 into the removal chamber. Subsequently, $N_2$ gas was introduced into the removal chamber, and following the raising of the pressure to atmospheric pressure, the base material was removed.

The aforementioned processes (B1) to (B11) completed the preparation of a magnetic recording medium with a layer structure of Al/NiP/W/Cr/CoCrTa [hereafter referred to as sample β(W)]. In other words, the medium prepared in this example is a medium with a seed layer constructed solely of W.

Following the formation of a W seed layer on the base material under the medium production conditions described above, the form of the W seed layer was observed using a SEM microscope, and it was confirmed that the W seed layer according to the present example was of the same islands type form as the W seed layer prepared in the example 1 and shown in FIG. 2.

Example 4

In this example, with the exception of using a $W_{54}Cr_{46}$ alloy (purity: 3N) as the target for the seed layer formation, instead of the W target of the example 3, a medium was prepared in the same manner as the example 3, to produce a magnetic recording medium with a layer structure of Al/NiP/WCr/Cr/CoCrTa [hereafter referred to as sample β(WCr)]. In other words, the medium prepared in this example is a medium with a seed layer constructed of a WCr alloy. Here, the numbers recorded after each of the elements refers to the atomic percentage (at %) of that particular element.

Comparative Example 4

In this comparative example, with the exception of not providing the seed layer from the example 3, a medium was prepared in the same manner as the example 3, to produce a conventional magnetic recording medium with a layer structure of Al/NiP/Cr/CoCrTa [hereafter referred to as sample β(NA)].

Comparative Example 5

In this comparative example 5, with the exception of providing a flat two dimensional W seed layer instead of the islands type W seed layer of the example 3, a medium was prepared in the same manner as the example 3, to produce a magnetic recording medium with a layer structure of Al/NiP/W/Cr/CoCrTa [hereafter referred to as sample β(Wf)]. The film thickness of the W seed layer was 7.5 nm.

Comparative Example 6

In this comparative example, with the exception of using Cr (purity: 3N) as the target for the seed layer formation, instead of the W target of the example 3, a medium was prepared in the same manner as the example 3, to produce a magnetic recording medium with a layer structure of Al/NiP/Cr/Cr/CoCrTa [hereafter referred to as sample β(Cr)].

Figure 8:
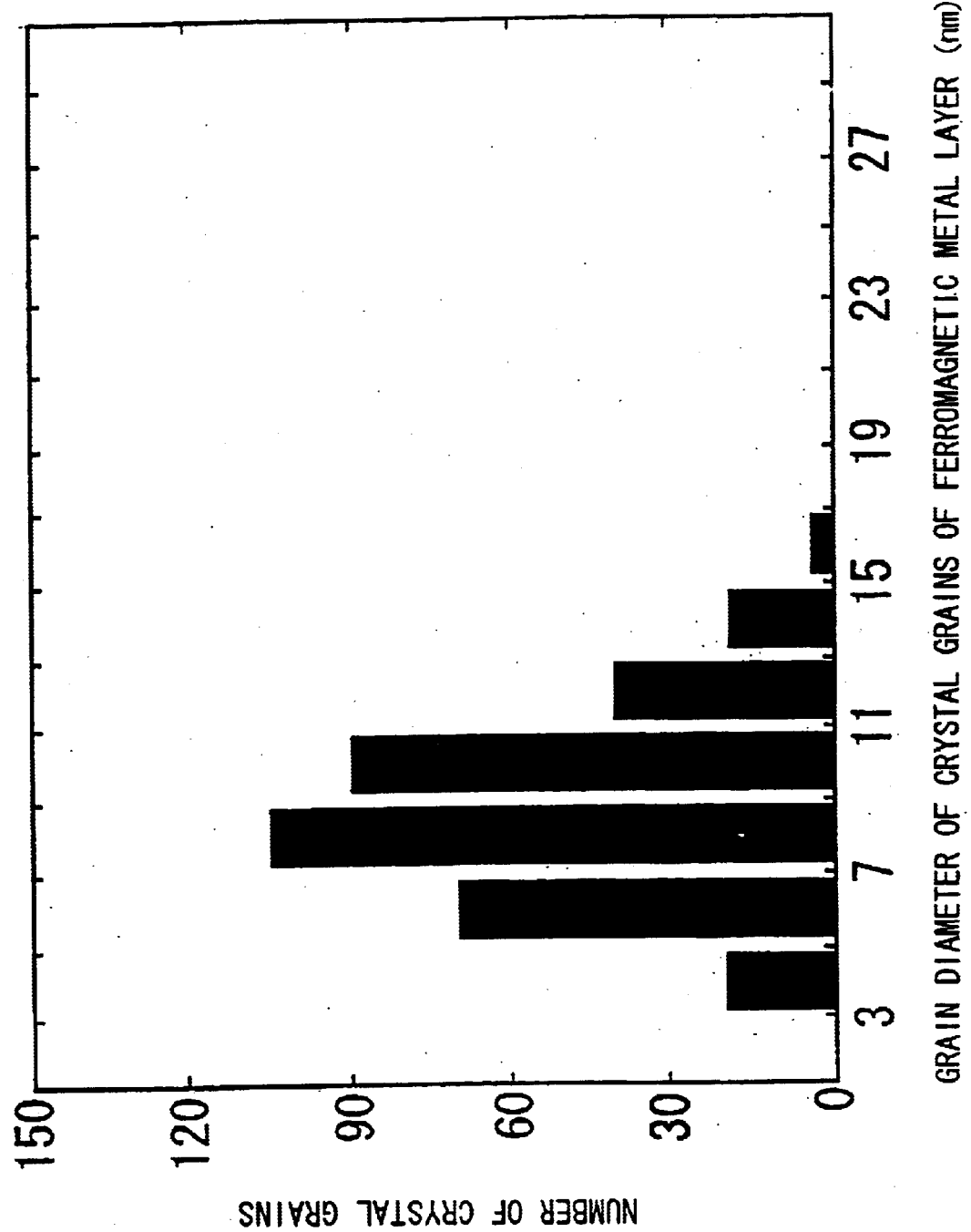
FIG. 8 is a graph showing a frequency distribution for the grain diameter of magnetic crystal grains in a ferromagnetic metal layer of a medium with an islands type W seed layer according to an example 3.
Figure 9:
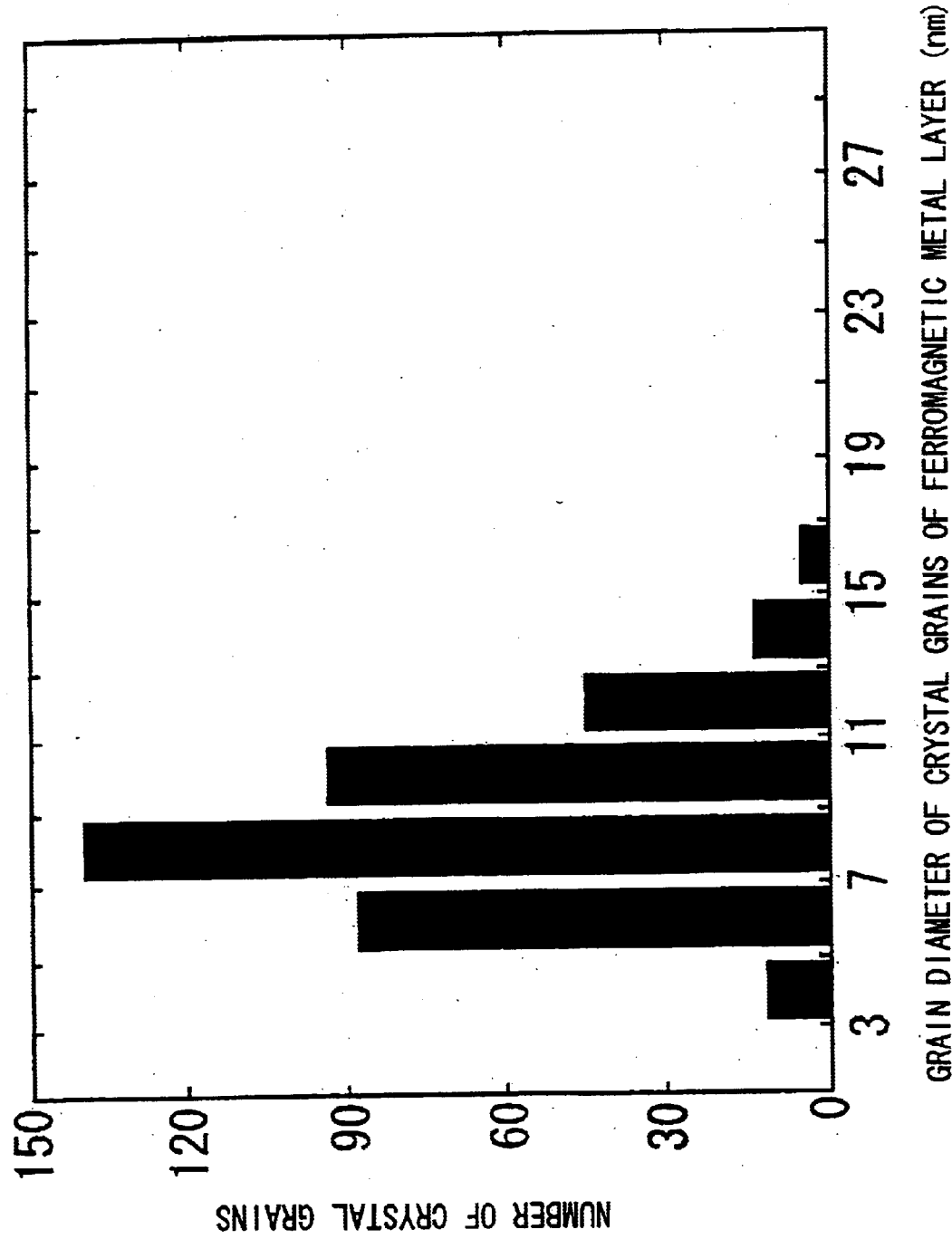
FIG. 9 is a graph showing a frequency distribution for the grain diameter of magnetic crystal grains in a ferromagnetic metal layer of a medium with an islands type WCr seed layer according to an example 4.
Figure 10:
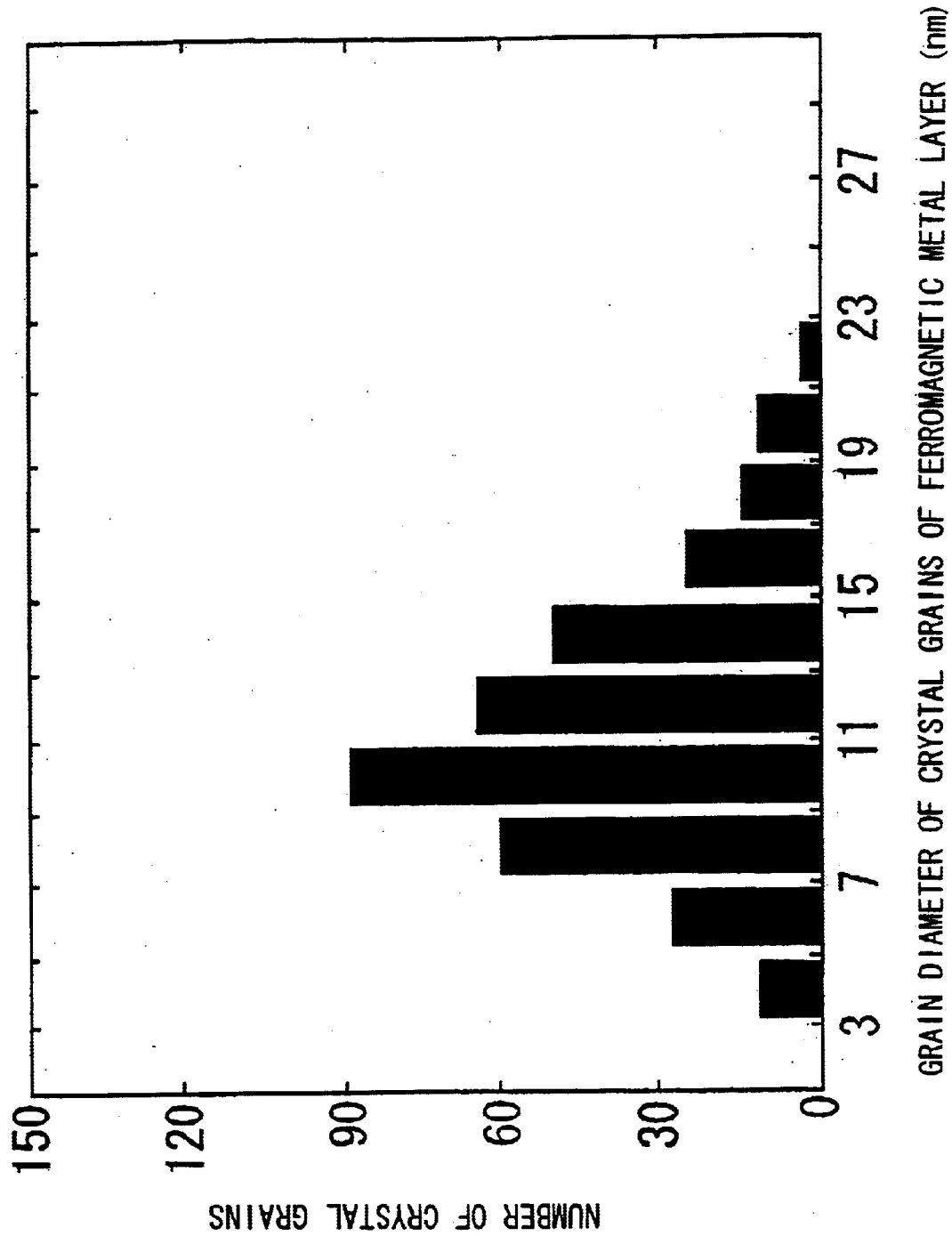
FIG. 10 is a graph showing a frequency distribution for the grain diameter of magnetic crystal grains in a ferromagnetic metal layer of a conventional medium with no seed layer according to a comparative example 4.
Figure 11:
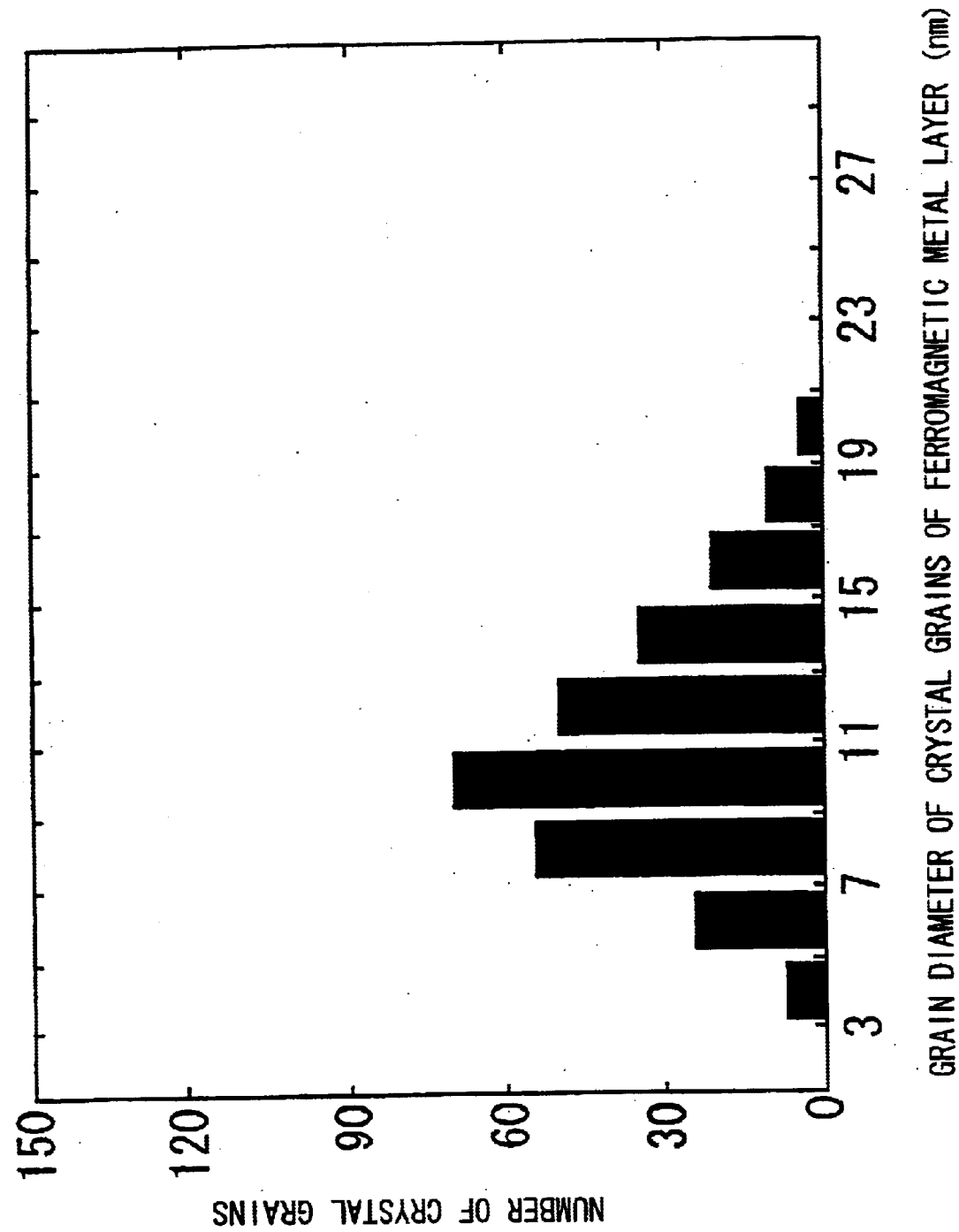
FIG. 11 is a graph showing a frequency distribution for the grain diameter of magnetic crystal grains in a ferromagnetic metal layer of a medium with a planar W seed layer according to a comparative example 5.
Figure 12:
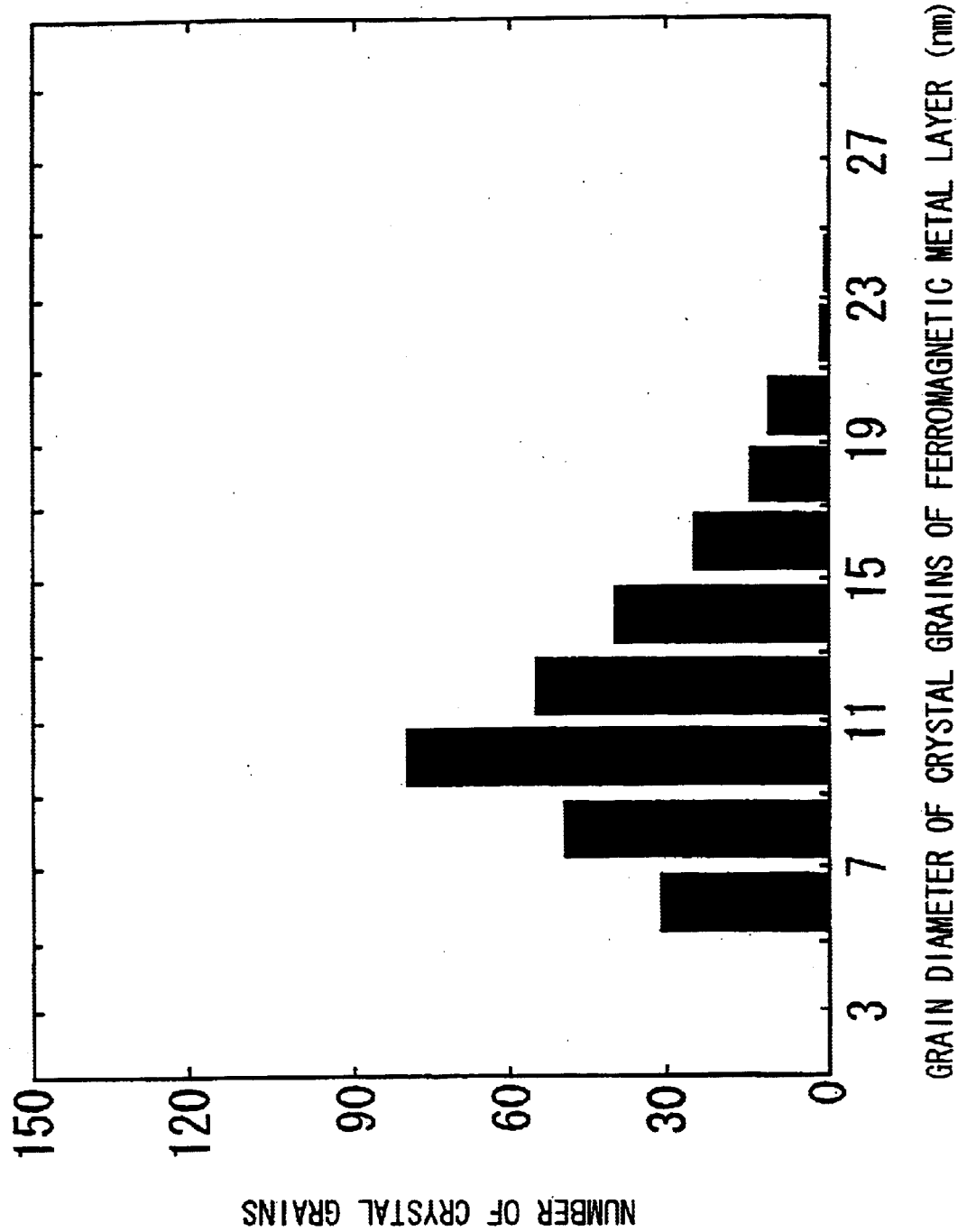
FIG. 12 is a graph showing a frequency distribution for the grain diameter of magnetic crystal grains in a ferromagnetic metal layer of a medium with an islands type Cr seed layer according to a comparative example 6.
Figure 13:
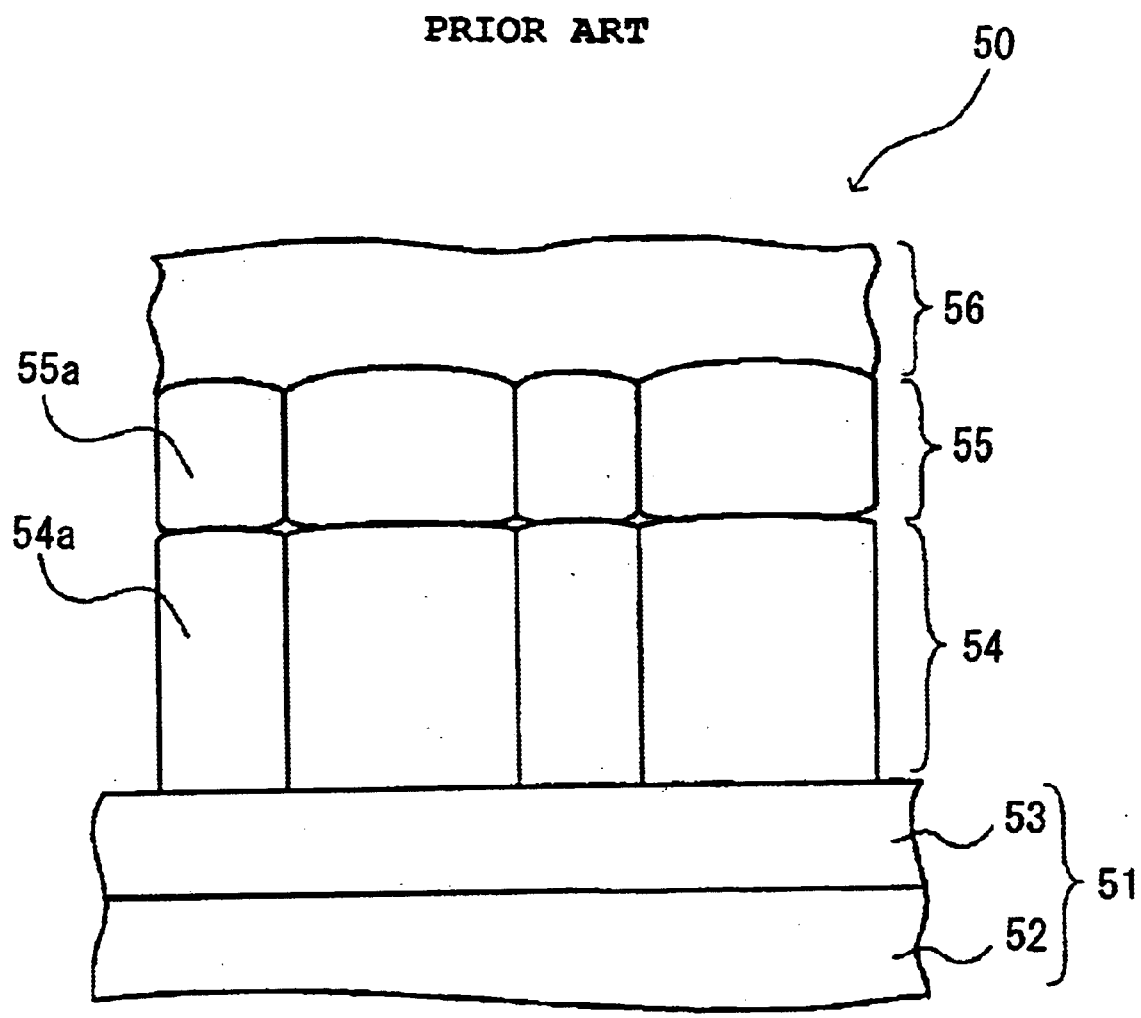
FIG. 13 is a schematic cross-sectional view of a magnetic recording medium used in a conventional magnetic recording device.

From TEM images, observed (at a magnification of 850,000) with a transmission electron microscope (TEM), of the surface of the ferromagnetic metal layer 14 of each of the various media prepared in accordance with the second production method according to the present invention, grain diameter values were calculated for the crystal grains which make up each ferromagnetic metal layer 14, and the frequency distribution of these grain diameter values are summarized in the graphs of FIG. 8 to FIG. 12. FIG. 8 shows the results for the medium provided with an islands type W seed layer [sample β(W) from the example 3], FIG. 9 shows the results for the medium provided with an islands type WCr seed layer [sample β(WCr) from the example 4], FIG. 10 shows the results for the conventional medium with no seed layer [sample β(NA) from the comparative example 4], FIG. 11 shows the results for the medium provided with a flat two dimensional W seed layer [sample β(Wf) from the comparative example 5], and FIG. 12 shows the results for the medium provided with an islands type Cr seed layer [sample β(Cr) from the comparative example 6].

From analyzing FIG. 8 to FIG. 12, the following points became clear.

(1) In comparison with a conventional medium with no seed layer (FIG. 10), in a medium in which an islands type W seed layer is provided between the base material and the metal underlayer (FIG. 8), the magnetic crystal grains which make up the ferromagnetic metal layer display a large increase in the number of crystal grains with a grain diameter close to the average grain diameter, and the frequency distribution for the grain diameter also narrows. The number of crystal grains with a large crystal grain diameter is particularly reduced.

(2) In the case where Cr is added to the W seed layer (FIG. 9), the trend described in (1) above becomes even stronger.

(3) In contrast, in comparison with a conventional medium with no seed layer (FIG. 10), in a medium provided with a W seed layer comprising a two dimensional flat film (FIG. 11), although there is a slight reduction in the number of crystal grains of large crystal grain diameter, the number of crystal grains with a grain diameter close to the average grain diameter decreases. Consequently, the effect (1) described above is not seen in a medium provided with a W seed layer comprising a two dimensional flat film (FIG. 11).

(4) In comparison with a conventional medium with no seed layer (FIG. 10), in a medium provided with a islands type Cr seed layer (FIG. 12), the magnetic crystal grains which make up the ferromagnetic metal layer display a slight decrease in the number of crystal grains with a small crystal grain diameter, although in contrast to (1) above, a trend towards a decrease in the number of crystal grains with a grain diameter close to the average grain diameter was also observed.

Table 4 combines the results for the average grain diameter d [nm] of the magnetic crystal grains of the ferromagnetic metal layer 14, the standard deviation σ [nm] of the magnetic crystal grains, and the value of the grain diameter distribution C.V. grain, calculated by dividing the standard deviation σ of the magnetic crystal grains by the average grain diameter d, for each of the samples, as determined from the TEM microscope observations described above. Furthermore, the coercive force Hc of each medium as measured by VSM is also presented in the Table 4.

TABLE 4

| Sample name | Average grain diameter d [nm] | Standard deviation σ [nm] | Grain diameter distribution C.V. grain | Coercive force Hc [kOe] |
|---|---|---|---|---|
| β(W) | 8.0 | 2.52 | 0.32 | 1.49 |
| β(WCr) | 7.7 | 2.34 | 0.30 | 1.50 |
| β(NA) | 10.8 | 3.68 | 0.34 | 1.53 |
| β(Wf) | 10.7 | 3.82 | 0.36 | 1.47 |
| β(Cr) | 11.0 | 3.82 | 0.35 | 1.47 |

From analyzing Table 4, the following points became clear.

(5) A medium in which an islands type seed layer W is provided between the base material and the metal underlayer [β(W)], in comparison with a conventional medium with no seed layer [β(NA)], has both a much smaller average grain diameter d of the magnetic crystal grains which make up the ferromagnetic metal layer, and a much smaller standard deviation Cr of that grain diameter, and moreover the grain diameter distribution C.V. grain also decreases. These trends appear even more strongly than in the case where the aforementioned first magnetic recording medium production method according to the present invention was used (example 1).

(6) In the case where Cr is added to the W seed layer [β(WCr)], the trend described in (5) above becomes even stronger, and a ferromagnetic metal layer of magnetic crystal grains with an average grain diameter approximately 30% smaller than a conventional medium with no seed layer [β(NA)] can be obtained.

(7) In contrast, in a medium provided with a flat two dimensional W seed layer [β(Wf)], although the average grain diameter was similar to that of a conventional medium with no seed layer [β(NA)], the standard deviation a and the grain diameter distribution C.V. grain both increased, and the coercive force Hc also decreased slightly, and so it was apparent that the trends were opposite to those observed in (5) above.

(8) Furthermore, in a medium provided with an islands type Cr seed layer [β(C)], the opposite trends to the aforementioned (5) were observed, namely a tendency for the average grain diameter d, the standard deviation σ, and the grain diameter distribution C.V. grain to all increase.

Consequently, by using the second magnetic recording medium production method according to the present invention, namely by using a method wherein an islands type seed layer 12 comprising at least tungsten is deposited onto the surface of a base material 11 which retains adsorbed gas, and following dry etching processing of the surface of the seed layer 12, a metal underlayer 13 and a ferromagnetic metal layer 14 are deposited sequentially onto the seed layer 12, then because an islands type seed layer 12 which is finer than that formed in the aforementioned first magnetic recording medium production method can be formed on the base material 11, the crystal grains of the metal underlayer. 13 and the ferromagnetic metal layer 14 deposited sequentially on top of the seed layer 12 are also reduced in size even further.

In particular, according to this second magnetic recording medium production method, the average grain diameter d, the standard deviation σ, and the grain diameter distribution C.V. grain of the magnetic crystal grains which make up the ferromagnetic metal layer 14 are all able to be reduced simultaneously, and these effects can be achieved by controlling only the preparation conditions for the seed layer 12, without altering the film thickness of the metal underlayer 13 or the film thickness of the ferromagnetic metal layer 14 which functions as the magnetic recording layer. In other words, by using the second magnetic recording medium production method and freely altering the film thickness of the metal underlayer 13 and the film thickness of the ferromagnetic metal layer 14, without even considering the form of the magnetic crystal grains of the ferromagnetic metal layer 14, a medium with predetermined magnetic characteristics suited for the magnetic heads can be produced with ease.

Example 5

DSO Medium

In this example, a description is given of a method in which a process O for exposing the base material to a predetermined oxygen atmosphere is performed following the intermediate processing step of the example 1, in other words, a method in which the intermediate processing step according to the present invention is carried out in a sequence comprising the process D, the process S, and then the process O (which corresponds with claim 9: hereafter this method is referred to as the third magnetic recording medium production method).

FIGS. 17A–F are diagrams showing each of the steps in the preparation of a magnetic recording medium using the third production method according to this example, together with a schematic cross-sectional view of the sample at each of those steps.

In this example, the aforementioned process O utilized "processing conditions in which following a reduction in the pressure of the inside of the processing chamber to $3\times10^{-9}$ Torr, oxygen gas was introduced, and the substrate surface was then exposed to oxygen under a reduced pressure environment of $1\times10^{-7}$ Torr for a period of 35 seconds". Hereafter, these processing conditions are described as an oxygen exposure amount of 3.5 L (Langmuir).

Here, "L: Langmuir" is an indicator of the amount of oxygen exposure, where 0 L corresponds with no oxygen exposure, 1 L corresponds with a 10 second exposure at $1\times10^{-7}$ Torr, 1.5 L corresponds with a 15 second exposure at $1\times10^{-7}$ Torr, and 3.5 L corresponds with a 35 second exposure at $1\times10^{-7}$ Torr. In the case of 1 L, a 1 second exposure at $1\times10^{-6}$ Torr and a 10 second exposure at $1\times10^{-7}$ Torr are equivalent conditions, although it is considered that at 1 second, the exposure time is too short, and there is a danger of oxygen adsorption not occurring completely, and consequently in this example, the exposure conditions were set at 3.5 L by using an exposure time of 35 seconds at $1\times10^{-7}$ Torr.

Specifically, the following processes (C5-1) to (C5-3) were added between the process (A6) and the process (A7).

(C5-1) The aforementioned base material holder was moved from the film formation chamber 1 into a processing chamber for performing oxygen exposure. Even following this movement, the base material 11 was still heated by an infrared lamp to maintain the temperature at 200° C. The processing chamber had previously been evacuated down to an ultimate vacuum at the $10^{-9}$ Torr level, and following completion of the movement of the base material holder, a door valve between the film formation chamber 1 and the processing chamber was closed.

Figure 17:
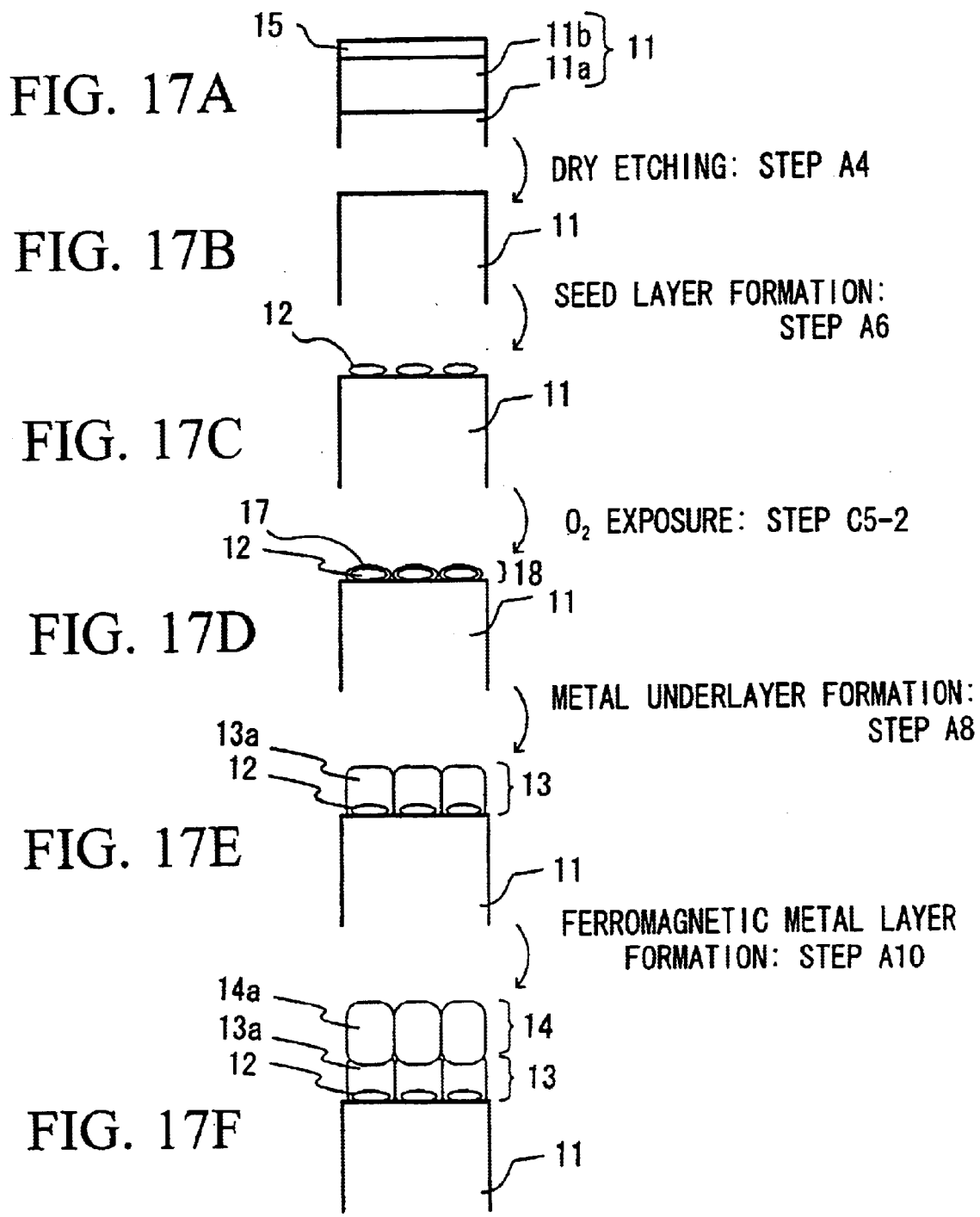
FIGS. 17A–F are diagrams showing each of the steps in the preparation of a magnetic recording medium using a third production method used in an example 5 (DSO) according to the present invention, together with a schematic cross-sectional view of the sample at each of those steps.

(C5-2) A predetermined quantity of oxygen gas was introduced into the processing chamber, and the surface of the base material 11 was exposed to oxygen under a reduced pressure environment of $1\times10^{-7}$ Torr for a period of 35 seconds [FIG. 17C to 17D].

(C5-3) The introduction of oxygen gas was halted, and following evacuation of the processing chamber down to an ultimate vacuum at the $10^{-9}$ level, the aforementioned base material holder was moved from the processing chamber into the film formation chamber 2 for forming the metal underlayer.

In the aforementioned production method, a WCr film was used as the seed layer. In other words, in the same manner as the example 2, $W_{28}Cr_{72}$ alloy (purity: 3N) was used as the target for the seed layer formation, instead of the W target of the example 1.

The remaining processes were identical with the example 1, and resulted in the production of a magnetic recording medium with a layer structure of Al/NiP/WCr/Cr/CoCrTa [hereafter referred to as sample γ(DSO)].

Example 6

SDO Medium

In this example, a description is given of a method in which a process O for exposing the base material to a predetermined oxygen atmosphere is performed following the intermediate processing step of the example 3, in other words, a method in which the intermediate processing step according to the present invention is carried out in a sequence comprising the process S, the process D, and then the process O (which corresponds with claim 10: hereafter this method is referred to as the fourth magnetic recording medium production method).

FIGS. 18A–F are diagrams showing each of the steps in the preparation of a magnetic recording medium using the fourth production method according to this example, together with a schematic cross-sectional view of the sample at each of those steps.

In this example, the aforementioned process O utilized the same processing conditions as the example 5, namely "processing conditions in which following a reduction in the pressure of the inside of the processing chamber to $3\times10^{-9}$ Torr, oxygen gas was introduced, and the substrate surface was then exposed to oxygen under a reduced pressure environment of $1\times10^{-7}$ Torr for a period of 35 seconds (processing conditions with an oxygen exposure amount of 3.5 L)".

Specifically, the following processes (C6-1) to (C6-3) were added between the process (B6) and the process (B7).

(C6-1) The aforementioned base material holder was moved from the etching chamber into a processing chamber for performing oxygen exposure. Even following this movement, the base material 11 was still heated by an infrared lamp to maintain the temperature at 200° C. The processing chamber had previously been evacuated down to an ultimate vacuum at the $10^{-9}$ Torr level, and following completion of the movement of the base material holder, a door valve between the etching chamber and the processing chamber was closed.

Figure 18:
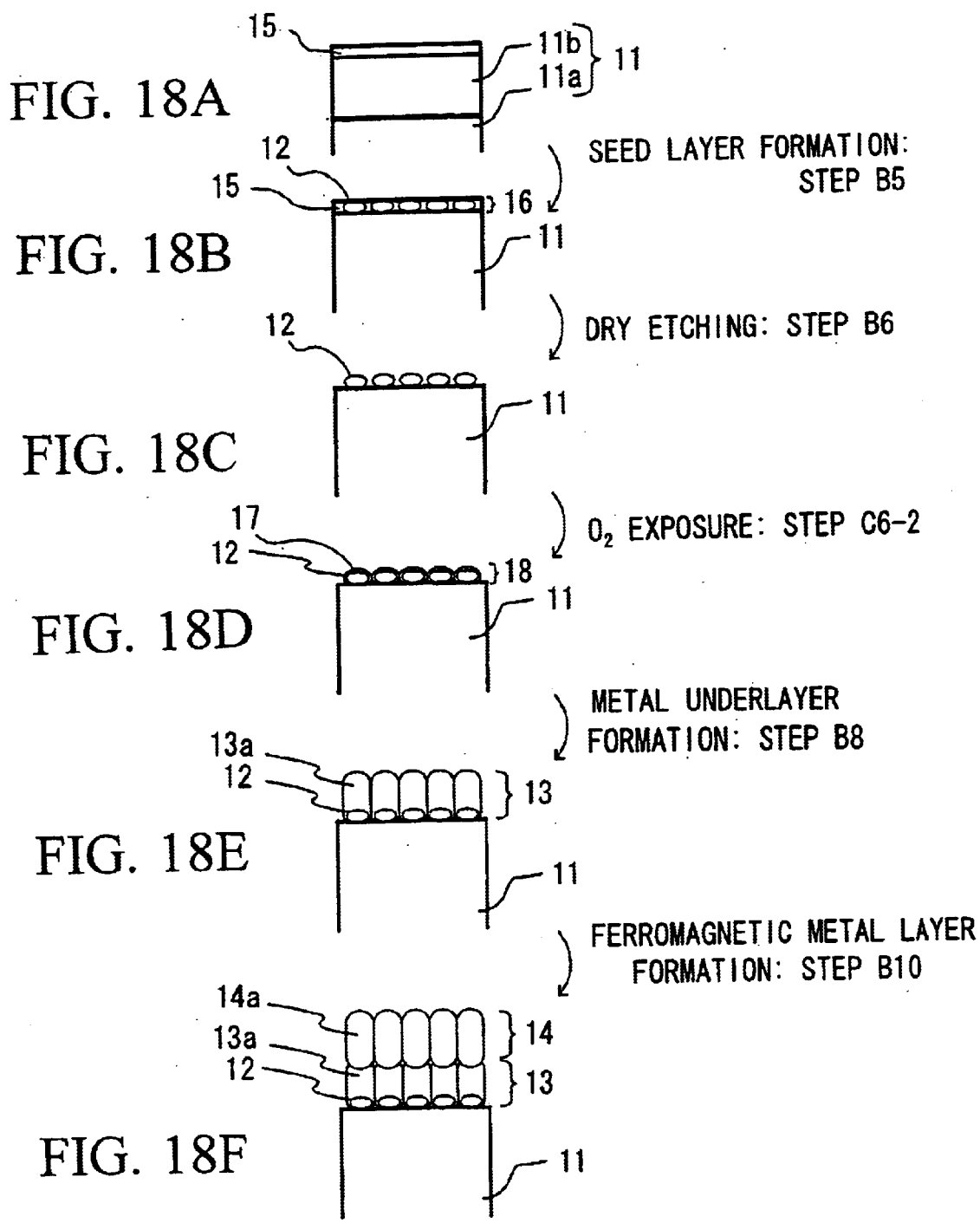
FIGS. 18A–F are diagrams showing each of the steps in the preparation of a magnetic recording medium using a fourth production method used in an example 6 (SDO) according to the present invention, together with a schematic cross-sectional view of the sample at each of those steps.

(C6-2) A predetermined quantity of oxygen gas was introduced into the processing chamber, and the surface of the base material 11 was exposed to oxygen under a reduced pressure environment of $1\times10^{-7}$ Torr for a period of 35 seconds [FIG. 18(c) to (d)].

(C6-3) The introduction of oxygen gas was halted, and following evacuation of the processing chamber down to an ultimate vacuum at the $10^{-9}$ Torr level, the aforementioned base material holder was moved from the processing chamber into the film formation chamber 2 for forming the metal underlayer.

In the aforementioned production method, a WCr film was used as the seed layer. In other words, in the same manner as the example 4, $W_{28}Cr_{72}$ alloy (purity: 3N) was used as the target for the seed layer formation, instead of the W target of the example 3.

The remaining processes were identical with the example 3, and resulted in the production of a magnetic recording medium with a layer structure of Al/NiP/WCr/Cr/CoCrTa [hereafter referred to as sample γ(SDO)].

Example 7

DOS Medium

In this example, a description is given of a method in which a process O for exposing the base material to a predetermined oxygen atmosphere is performed between the process D and the process S of the intermediate processing step of the example 1, in other words, a method in which the intermediate processing step according to the present invention is carried out in a sequence comprising the process D, the process O, and then the process S (which corresponds with claim 11: hereafter this method is referred to as the fifth magnetic recording medium production method).

FIGS. 19A–F are diagrams showing each of the steps in of the preparation of a magnetic recording medium using the fifth production method according to this example, together with a schematic cross-sectional view of the sample at each of those steps.

In this example, the aforementioned process O utilized the same processing conditions as the example 5, namely "processing conditions in which following a reduction in the pressure of the inside of the processing chamber to $3\times10^{-9}$ Torr, oxygen gas was introduced, and the substrate surface was then exposed to oxygen under a reduced pressure environment of $1\times10^{-7}$ Torr for a period of 35 seconds (processing conditions with an oxygen exposure amount of 3.5 L)".

Specifically, the following processes (C7-1) to (C7-3) were added between the process (A4) and the process (A5).

(C7-1) The aforementioned base material holder was moved from the etching chamber into a processing chamber for performing oxygen exposure. Even following this movement, the base material 11 was still heated by an infrared lamp to maintain the temperature at 200° C. The processing chamber had previously been evacuated down to an ultimate vacuum at the $10^{-9}$ Torr level, and following completion of the movement of the base material holder, a door valve between the etching chamber and the processing chamber was closed.

Figure 19:
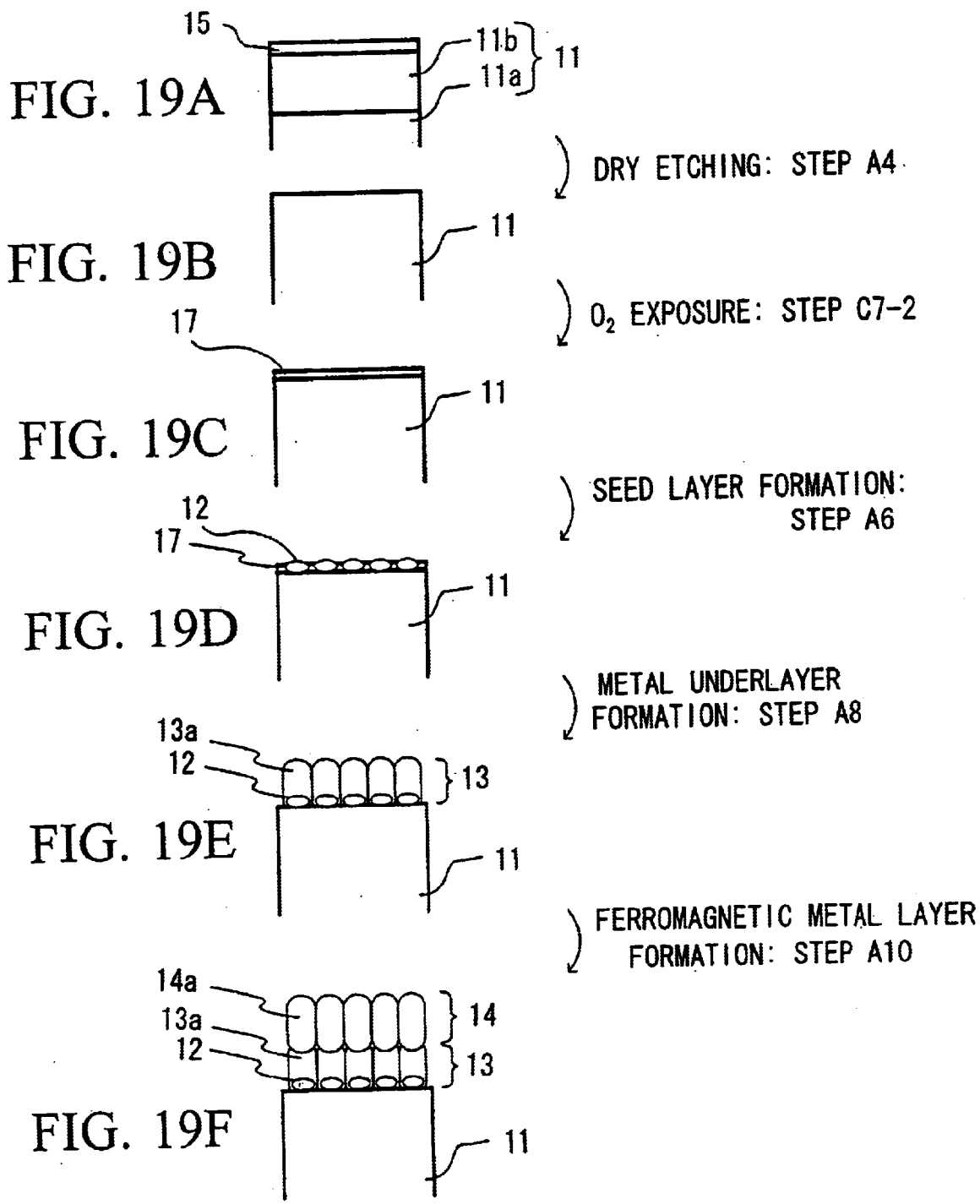
FIGS. 19A–F are diagrams showing each of the steps in the preparation of a magnetic recording medium using a fifth production method used in an example 7 (DOS) according to the present invention, together with a schematic cross-sectional view of the sample at each of those steps.

(C7-2) A predetermined quantity of oxygen gas was introduced into the processing chamber, and the surface of the base material 11 was exposed to oxygen under a reduced pressure environment of $1\times10^{-7}$ Torr for a period of 35 seconds [FIG. 19B to 19C].

(C7-3) The introduction of oxygen gas was halted, and following evacuation of the processing chamber down to an ultimate vacuum at the $10^{-9}$ Torr level, the aforementioned base material holder was moved from the processing chamber into the film formation chamber 1 for forming the seed layer.

In the aforementioned production method, a WCr film was used as the seed layer. In other words, in the same manner as the example 2, $W_{28}Cr_{72}$ alloy (purity: 3N) was used as the target for the seed layer formation, instead of the W target of the example 1.

The remaining processes were identical with the example 1, and resulted in the production of a magnetic recording medium with a layer structure of Al/NiP/WCr/Cr/CoCrTa [hereafter referred to as sample γ(DOS)].

Example 8

DOSD Medium

In this example, a description is given of a method in which a process O for exposing the base material to a predetermined oxygen atmosphere is performed between the process D and the process S of the intermediate processing step of the example 1, and moreover a second process D is performed following the process S, in other words, a method in which the intermediate processing step according to the present invention is carried out in a sequence comprising the process D, the process O, the process S, and then the process D (which corresponds with claim 12: hereafter this method is referred to as the sixth magnetic recording medium production method).

FIGS. 20A–G are diagrams showing each of the steps in the preparation of a magnetic recording medium using the sixth production method according to this example, together with a schematic cross-sectional view of the sample at each of those steps.

In this example, the aforementioned process O utilized the same processing conditions as the example 5, namely "processing conditions in which following a reduction in the pressure of the inside of the processing chamber to $3\times10^{-9}$ Torr, oxygen gas was introduced, and the substrate surface was then exposed to oxygen under a reduced pressure environment of $1\times10^{-7}$ Torr for a period of 35 seconds (processing conditions with an oxygen exposure amount of 3.5 L)".

Specifically, the following processes (C8-1) to (C8-3) were added between the process (A4) and the process (A5), and the following processes (C8-4) to (C8-6) were added between the process (A6) and the process (A7).

(C8-1) The aforementioned base material holder was moved from the etching chamber into a processing chamber for performing oxygen exposure. Even following this movement, the base material 11 was still heated by an infrared lamp to maintain the temperature at 200° C. The processing chamber had previously been evacuated down to an ultimate vacuum at the $10^{-9}$ Torr level, and following completion of the movement of the base material holder, a door valve between the etching chamber and the processing chamber was closed.

Figure 20:
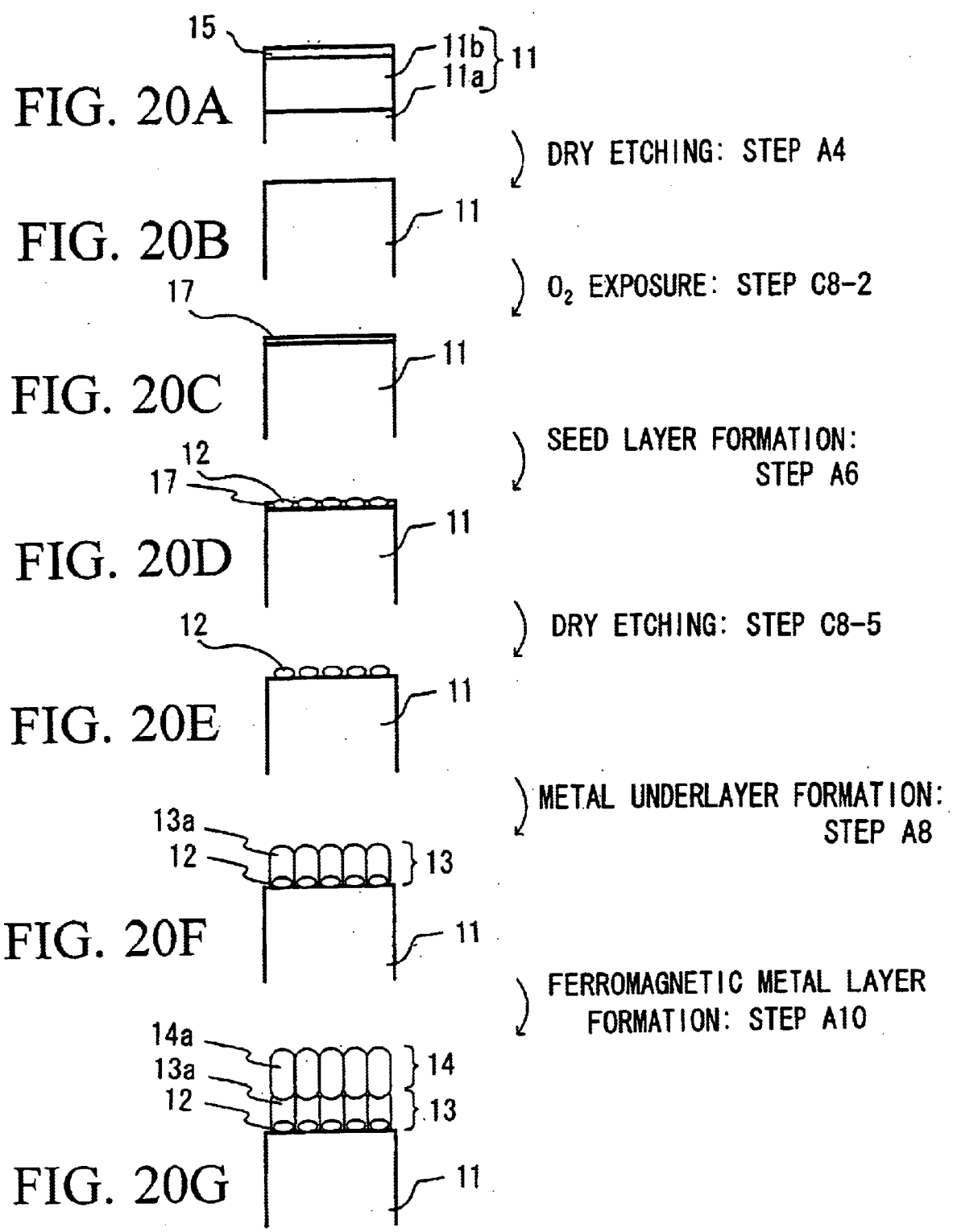
FIGS. 20A–G are diagrams showing each of the steps in the preparation of a magnetic recording medium using a sixth production method used in an example 8 (DOSD) according to the present invention, together with a schematic cross-sectional view of the sample at each of those steps.

(C8-2) A predetermined quantity of oxygen gas was introduced into the processing chamber, and the surface of the base material 11 was exposed to oxygen under a reduced pressure environment of $1\times10^{-7}$ Torr for a period of 35 seconds [FIG. 20B to 20C].

(C8-3) The introduction of oxygen gas was halted, and following evacuation of the processing chamber down to an ultimate vacuum at the $10^{-9}$ level, the aforementioned base material holder was moved from the processing chamber into the film formation chamber 1 for forming the seed layer.

(C8-4) The aforementioned base material holder was moved from the film formation chamber 1 where the seed layer 12 was formed into the etching chamber.

(C8-5) Ar gas with an impurity concentration of no more than 5 ppm was introduced into the etching chamber, and once the gas pressure had reached 10 mTorr, a predetermined voltage from an RF power source was applied to the base material 11, and the base material surface was subjected to dry etching [FIG. 20D to 20E]. The conditions for the dry etching process included a gas pressure of 2 mTorr, an applied power of 200 W, and a processing time of 5 seconds.

(C8-6) Following etching processing, the aforementioned base material holder was then moved from the etching chamber to the film formation chamber 2 for formation of the metal underlayer.

In the aforementioned production method, a WCr film was used as the seed layer. In other words, in the same manner as the example 2, $W_{28}Cr_{72}$ alloy (purity: 3N) was used as the target for the seed layer formation, instead of the W target of the example 1.

The remaining processes were identical with the example 1, and resulted in the production of a magnetic recording medium with a layer structure of Al/NiP/WCr/Cr/CoCrTa [hereafter referred to as sample γ(DOSD)].

Example 9

DOSDO Medium

In this example, a description is given of a method in which a process O for exposing the base material to a predetermined oxygen atmosphere is performed between the process D and the process S of the intermediate processing step of the example 1, and moreover a second process D and a process O are performed sequentially following the process S, in other words, a method in which the intermediate processing step according to the present invention is carried out in a sequence comprising the process D, the process O, the process S, the process D, and then the process O (which corresponds with claim 13: hereafter this method is referred to as the seventh magnetic recording medium production method).

FIGS. 21A–H are diagrams showing each of the steps in the preparation of a magnetic recording medium using the seventh production method according to this example, together with a schematic cross-sectional view of the sample at each of those steps.

In this example, the aforementioned process O utilized the same processing conditions as the example 5, namely "processing conditions in which following a reduction in the pressure of the inside of the processing chamber to $3 \times 10^{-9}$ Torr, oxygen gas was introduced, and the substrate surface was then exposed to oxygen under a reduced pressure environment of $1 \times 10^{-7}$ Torr for a period of 35 seconds (processing conditions with an oxygen exposure amount of 3.5 L)".

Specifically, the following processes (C9-1) to (C9-3) were added between the process (A4) and the process (A5), and the following processes (C9-4) to (C9-8) were added between the process (A6) and the process (A7).

(C9-1) The aforementioned base material holder was moved from the etching chamber into a processing chamber for performing oxygen exposure. Even following this movement, the base material 11 was still heated by an infrared lamp to maintain the temperature at 200° C. The processing chamber had previously been evacuated down to an ultimate vacuum at the $10^{-9}$ Torr level, and following completion of the movement of the base material holder, a door valve between the etching chamber and the processing chamber was closed.

Figure 21:
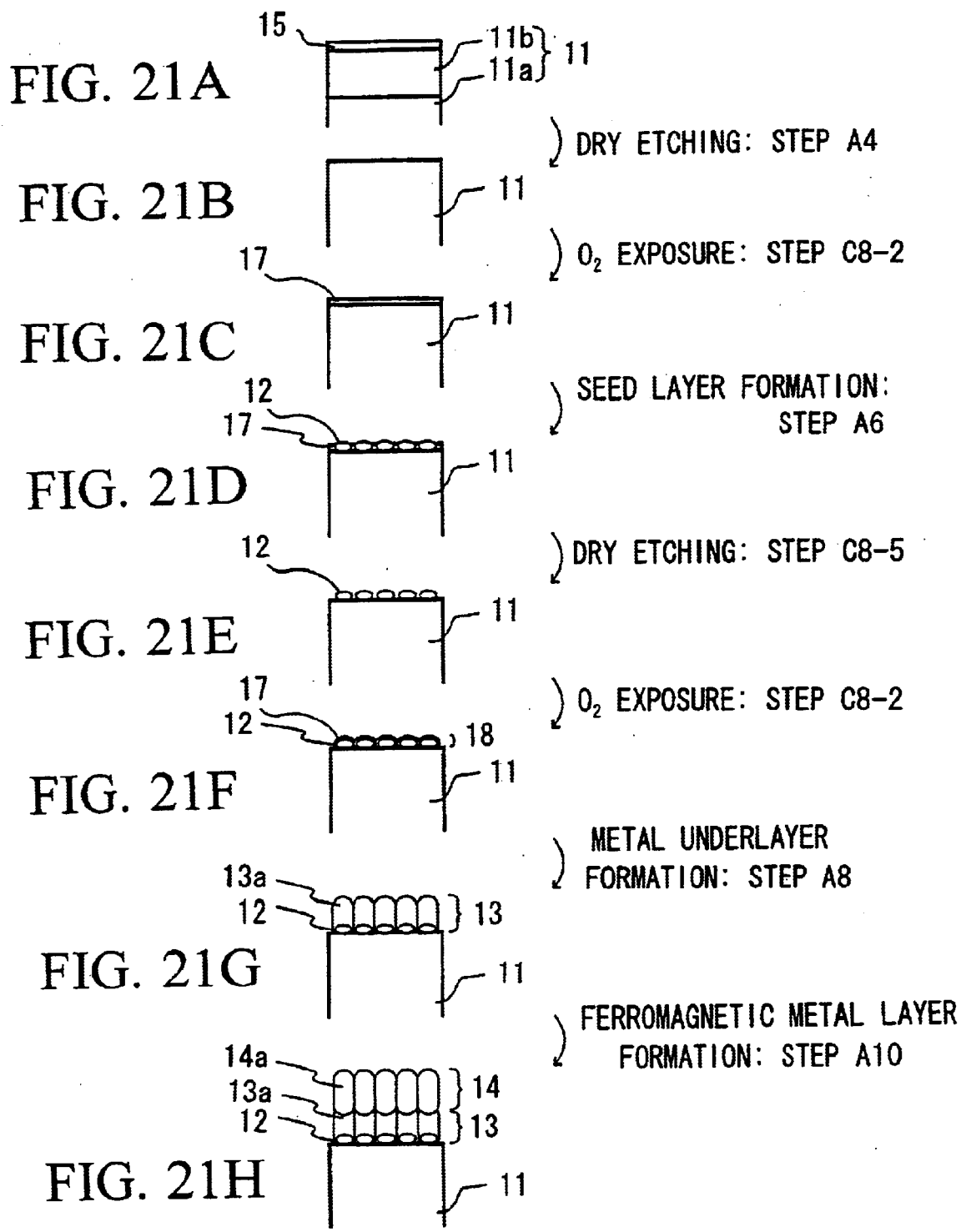
FIGS. 21A–H are diagrams showing each of the steps in the preparation of a magnetic recording medium using a seventh production method used in an example 9 (DOSDO) according to the present invention, together with a schematic cross-sectional view of the sample at each of those steps.
Figure 22:
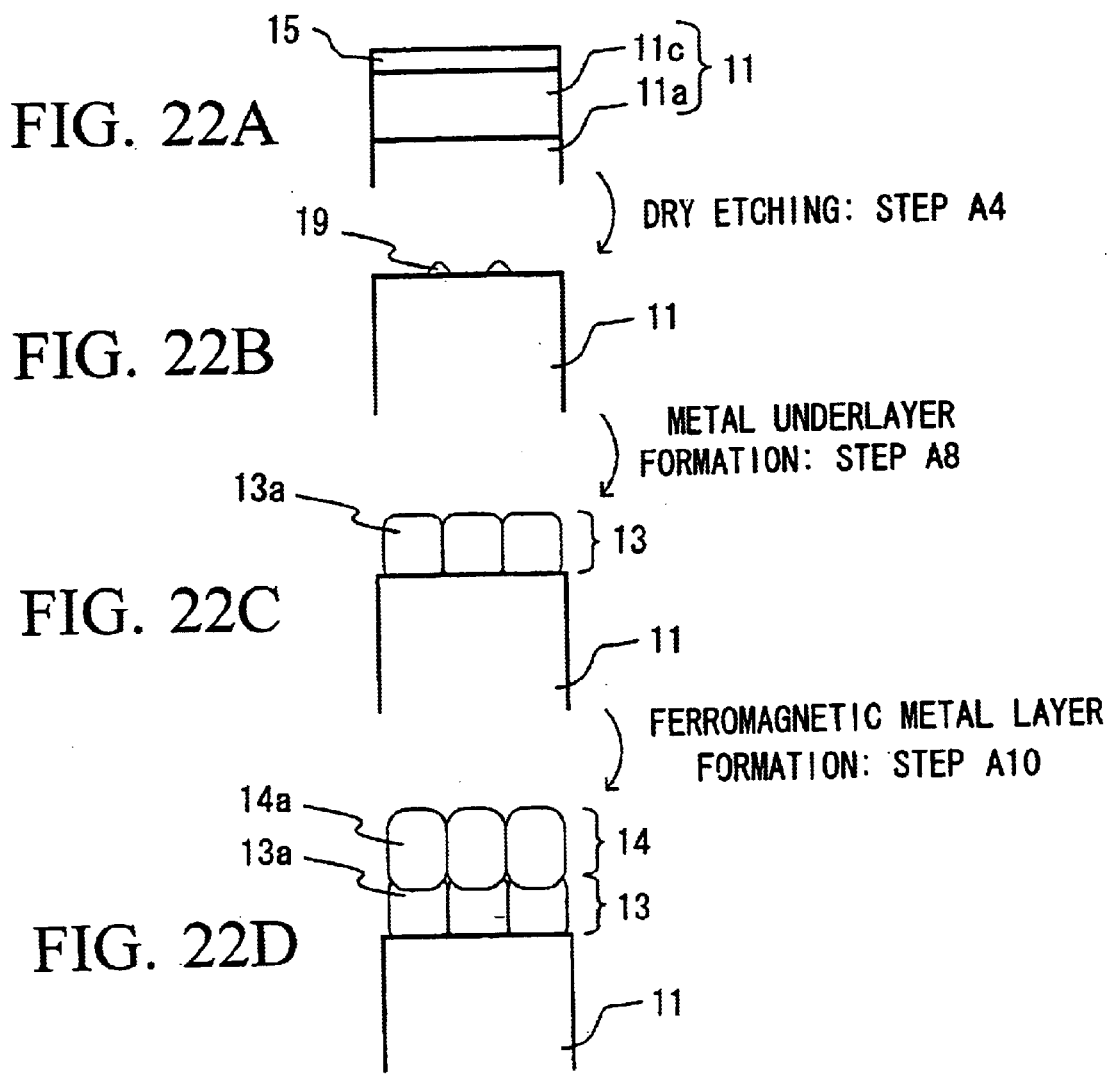
FIGS. 22A–D are diagrams showing each of the steps in the production of a magnetic recording medium in an example 10 (MD) according to the present invention, together with a schematic cross-sectional view of the sample at each of those steps.

(C9-2) A predetermined quantity of oxygen gas was introduced into the processing chamber, and the surface of the base material 11 was exposed to oxygen under a reduced pressure environment of $1 \times 10^{-7}$ Torr for a period of 35 seconds [FIG. 21B to 21C].

(C9-3) The introduction of oxygen gas was halted, and following evacuation of the processing chamber down to an ultimate vacuum at the $10^{-9}$ Torr level, the aforementioned base material holder was moved from the processing chamber into the film formation chamber 1 for forming the seed layer.

(C9-4) The aforementioned base material holder was moved from the film formation chamber 1 where the seed layer 12 was formed into the etching chamber.

(C9-5) Ar gas with an impurity concentration of no more than 5 ppm was introduced into the etching chamber, and once the gas pressure had reached 10 mTorr, a predetermined voltage from an RF power source was applied to the base material 11, and the base material surface was subjected to dry etching [FIG. 21D to 21E]. The conditions for the dry etching process included a gas pressure of 2 mTorr, an applied power of 200 W, and a processing time of 5 seconds.

(C9-6) Following etching processing, the aforementioned base material holder was then moved from the etching chamber to the processing chamber for performing oxygen exposure. Even following this movement, the base material 11 was still heated by an infrared lamp to maintain the temperature at 200° C. The processing chamber had previously been evacuated down to an ultimate vacuum at the $10^{-9}$ Torr level, and following completion of the movement of the base material holder, a door valve between the etching chamber and the processing chamber was closed.

(C9-7) A predetermined quantity of oxygen gas was introduced into the processing chamber, and the surface of the base material 11 was exposed to oxygen under a reduced pressure environment of $1 \times 10^{-7}$ Torr for a period of 35 seconds [FIG. 21E to 21F].

(C9-8) The introduction of oxygen gas was halted, and following evacuation of the processing chamber down to an ultimate vacuum at the $10^{-9}$ Torr level, the aforementioned base material holder was moved from the processing chamber into the film formation chamber 2 for forming the metal underlayer.

In the aforementioned production method, a WCr film was used as the seed layer. In other words, in the same manner as the example 2, $W_{28}Cr_{72}$ alloy (purity: 3N) was used as the target for the seed layer formation, instead of the W target of the example 1.

The remaining processes were identical with the example 1, and resulted in the production of a magnetic recording medium with a layer structure of Al/NiP/WCr/Cr/CoCrTa [hereafter referred to as sample γ(DOSDO)].

Table 5 represents the combined results for the average grain diameter d [nm] of the magnetic crystal grains of the ferromagnetic metal layer 14, the standard deviation σ [nm] of the magnetic crystal grains, and the value of the grain diameter distribution C.V. grain, calculated by dividing the standard deviation c of the magnetic crystal grains by the average grain diameter d, for each of the samples prepared in the example 5 to 9, as determined from TEM microscope observations similar to those of the example 1.

Furthermore, the coercive force Hc of each medium as measured by VSM, and the degree of variation of the residual magnetization ΔM, which acts as an indicator of the change over time in magnetization recorded on the medium, are also presented in the Table 5.

In addition, for comparative purposes, the results for the three aforementioned samples α(NA), α(WCr), and β(WCr)

are also shown in the Table 5. As follows is a repeated summary of the production conditions for these samples.

The sample α(NA) is a conventional magnetic recording medium with a layer structure of Al/NiP/Cr/CoCrTa, prepared in the same manner as the example 1, with the exception of not providing the seed layer from the example 1. In other words, the medium prepared in the comparative example 1.

The sample α(WCr) is a magnetic recording medium with a layer structure of Al/NiP/WCr/Cr/CoCrTa, prepared in the same manner as the example 1, with the exception that a $W_{28}Cr_{72}$ alloy (purity: 3N) is used as the target for the seed layer formation, instead of the W target of the example 1. In other words, because the intermediate processing step comprises the process D followed by the process S, and the seed layer comprises a WCr film, the name of this sample could be replaced with the sample γ(DS).

The sample β(WCr) is a magnetic recording medium with a layer structure of Al/NiP/WCr/Cr/CoCrTa, prepared in the same manner as the example 3, with the exception that a $W_{54}Cr_{46}$ alloy (purity: 3N) is used as the target for the seed layer formation, instead of the W target of the example 3. In other words, because the intermediate processing step comprises the process S followed by the process D, and the seed layer comprises a WCr film, the name of this sample could be replaced with the sample γ(SD).

In other words, each of the samples shown in Table 5 have a common element in that each uses an Al base covered with a NiP plating layer as the base material. Furthermore, with the exception of the sample α(NA), all the samples employ the same WCr film as a seed layer. In other words, α(NA) is the sample from the comparative example 1, α(WCr)=γ(DS) is the sample from the example 2, β(WCr)=γ(SD) is the sample from the example 4, γ(DSO) is the sample from the example 5, γ(SDO) is the sample from the example 6, γ(DOS) is the sample from the example 7, γ(DOSD) is the sample from the example 8, and γ(DOSDO) is the sample from the example 9.

TABLE 5

| Sample name | Average grain diameter d [nm] | Standard deviation σ [nm] | Grain diameter distribution C.V. grain | Coercive force Hc [kOe] | Variation over time ΔM [%/year] |
|---|---|---|---|---|---|
| α(NA) | 10.8 | 3.68 | 0.34 | 1.53 | 10.7 |
| α(WCr) = γ(DS) | 9.5 | 3.10 | 0.33 | 1.48 | 8.5 |
| β(WCr) = γ(SD) | 7.7 | 2.34 | 0.30 | 1.50 | — |
| γ(DSO) | 7.5 | 2.35 | 0.31 | 1.45 | 8.2 |
| γ(SDO) | 7.3 | 2.22 | 0.30 | 1.40 | 8.0 |
| γ(DOS) | 7.3 | 2.10 | 0.29 | 1.46 | 7.9 |
| γ(DOSD) | 7.5 | 2.04 | 0.27 | 1.60 | 7.3 |
| γ(DOSDO) | 7.2 | 1.85 | 0.26 | 1.47 | 7.0 |

From analyzing Table 5, the following points became clear.

[Comparison of α(WCr) and γ(DSO), Comparison of β(WCr) and γ(SDO)]

(I) Adding the process O (oxygen exposure) after the intermediate processing step comprising the process D (dry etching) and the process S (seed layer formation) improved almost all of the evaluations (d, σ, C.V. grain, ΔM) regardless of the order in which the process D and the process S were conducted. However, only Hc appeared to decrease slightly, although this decrease was within the normal production variation.

(II) Particularly in the case of the sample γ(DSO) [the case where the process O is added to α(WCr)], the average grain diameter fell from 9.5 to 7.5, and the standard deviation also fell from 3.10 to 2.35, representing a simultaneous improvement of more than 20% in two of the evaluation factors.

(III) However the case represented by the sequence process S→process D→process O [γ(SDO)] showed a trend towards a smaller average grain diameter and a smaller standard deviation than the case represented by the sequence process D→process S→process O [γ(DSO)], and this trend is the same as that observed prior to the introduction of the process O.

[Comparison of γ(DSO) and γ(SDO) with γ(DOS)]

(IV) Performing the process O (oxygen exposure) after the process D (dry etching) and then performing the process S (seed layer formation) [namely, the case of γ(DOS)] produces better results for all of the evaluations than performing the process O (oxygen exposure) after both the process D (dry etching) and the process S (seed layer formation) [namely, the cases of γ(DSO) or γ(SDO)]

[Comparison of γ(DOS) with γ(DOSD) and γ(DOSDO)]

(V) By adding to γ(DOS), either a second process D (dry etching) [as in the case of γ(DOSD)], or a second process D (dry etching) and a second process O (oxygen exposure) [as in the case of γ(DOSDO)], the standard deviation reduces even further, and the variation over time also improves another level.

Accordingly, from the finding (I) above it was realized that by providing the intermediate processing step with a process O for exposing the base material 11 to a predetermined oxygen atmosphere in addition to the process D and the process S, the average grain diameter and the associated standard deviation for the magnetic crystal grains of the ferromagnetic metal layer 14 would reduce, and as a result, a medium with a smaller variation over time ΔM of the residual magnetization could be obtained.

This observation is assumed to be due to the suitable quantity of oxygen adsorbed onto the surface of the base material 11 with the islands type seed layer 12 by the process O suppressing the formation of large crystal grains in the metal underlayer 13 comprising Cr as a major constituent which is formed on top of the base material 11, and thereby suppressing the formation of large crystal grains in the ferromagnetic metal layer 14 of a Co based alloy formed on top of the metal underlayer 13, leading to a miniaturization of the grain diameter.

In a layered medium used in the present invention, namely in a magnetic recording medium in which a ferromagnetic metal layer 14 comprising a Co based alloy is formed on top of a base material 11, with a metal underlayer 13 comprising Cr as a major constituent disposed there between, it is widely known that because the Cr film of the metal underlayer 13 is (200) oriented, and the ferromagnetic metal layer 14 is grown thereon by epitaxial growth with (110) orientation, the crystalline orientation of the metal underlayer 13 ensures a good crystalline orientation of the ferromagnetic metal layer 14.

Nevertheless, the fact that a large reduction in the coercive force is not observed on introduction of the process O, indicates that the suitable quantity of adsorbed oxygen does not act as a negative factor on the magnetic characteristics, and contributes only to the miniaturization of the crystal grains of the ferromagnetic metal layer 14. In other words, introduction of the process O according to the present invention is able to effect a miniaturization of the crystal grains which make up the ferromagnetic metal layer 14 without causing a deterioration in the crystalline orientation of the metal underlayer 13, and in turn the orientation of the ferromagnetic metal layer 14, and so a magnetic recording medium can be provided with a miniaturized crystalline system which is suitable for noise reduction.

Furthermore, the finding (IV) above shows the effect of an intermediate processing step in which the process O is performed after the process D, with the process S being carried out subsequently. In other words, even following the high vacuum evacuation, a certain quantity of deposits, specifically oxygen, nitrogen, water and other organic materials are still present on the surface of the base material 11, and it is thought that the quantity of these deposits is unstable. Consequently, a clean base material surface is first prepared by removing these deposits using the process D. Subsequently, while controlling the degree of adhesion, the process O is used to adsorb a suitable quantity of oxygen onto the surface of this cleaned base material 11. Finally, a seed layer 12 is formed under the influence of this adhered oxygen using the process S. As a result, it is thought that it is easier to obtain a seed layer 12 comprising an islands type film in which the islands are of a small size, there is little variation in the size of the islands, and the spacing between adjacent islands is consistent. It is thought that because the metal underlayer 13 and the ferromagnetic metal layer 14 were deposited sequentially on top of this type of base material 11 comprising an islands type seed layer 12 with good size uniformity, all of the evaluations (d, σ, C.V. grain, ΔM) improved even further.

In addition, the finding (V) above shows that by adding a second process D (dry etching) to an intermediate processing step carried out in a sequence comprising process D, process O and then process S, deposits generated during the formation of the seed layer 12 and still remaining on the surface can be removed. Subsequently, a metal underlayer 13 and a ferromagnetic metal layer 14 can be deposited sequentially onto the surface of the base material 11, which has been provided with a seed layer 12 and has also been carefully cleaned. As a result, thin film growth of the metal underlayer 13 and the ferromagnetic metal layer 14 formed thereon can be carried out almost unaffected by residual deposits on the surface of the seed layer 12, but strongly reflecting the effect of the islands type form of the seed layer 12. In other words, by using an intermediate processing step provided with a second process D, miniaturization of the magnetic grains which make up the ferromagnetic metal layer 14 progresses even further, and variation in the crystal grain diameter can also be reduced.

Then, in the case where a second process O (oxygen exposure) is added after the second process D (dry etching) described above, then while controlling the degree of adhesion, a suitable quantity of oxygen can be adsorbed onto the surface of this base material 11 which is equipped with an islands type seed layer 12 and which has been cleaned by the second process D. A metal underlayer 13 and a ferromagnetic metal layer 14 are subsequently deposited sequentially onto the base material 11 with this type of surface. As a result, the suitable quantity of oxygen adsorbed onto the surface of the base material 11 with the islands type seed layer 12, suppresses the formation of large crystal grains in the metal underlayer 13 deposited on top of the base material 11, and also further suppresses the formation of large crystal grains in the ferromagnetic metal layer 14 formed on top of the metal underlayer 13, and so the magnetic crystals can be miniaturized, and the variation in the crystals grain diameter can also be reduced. It is thought that this enabled a medium with an improved variation over time ΔM of the residual magnetization to be obtained.

All the effects described above can be achieved by controlling only the conditions for the intermediate processing step, without altering the film thickness of the metal underlayer 13 or the film thickness of the ferromagnetic metal layer 14 which functions as the magnetic recording layer, and so the present invention offers the advantage that in order to form a medium with a set of desired magnetic characteristics, the film thickness of the metal underlayer 13 and the film thickness of the ferromagnetic metal layer 14 can be designed and altered with total freedom.

Consequently, according to the third through to the sixth magnetic recording medium production methods according to the present invention, media of various magnetic characteristics can be easily produced while ensuring further miniaturization of the grain diameter for the magnetic crystal grains which make up the ferromagnetic metal layer 14, and so a production line which offers a much higher degree of freedom in terms of the medium design can be constructed.

Example 10

MD Medium

In this example, with the exception of using a base material comprising an Al base plate covered with a Co co-precipitated NiP plating layer (called an M base material) instead of the normal Al base plate covered with a NiP plating layer, a medium was prepared in the same manner as the comparative example 1, to produce a magnetic recording medium with a layer structure of Al/NiPCo/Cr/CoCrTa [hereafter referred to as sample δ(MD)].

In other words, the only difference between the sample δ(MD) according to the present example and the sample α(NA) according to the comparative example 1 is the type of base material, and the remaining production conditions were identical. Accordingly, by comparing these two samples, any dependency on the base material (in other words the effect of co-precipitating Co in NiP layer) can be investigated.

FIGS. 22A–D are diagrams showing each of the steps in the preparation of a magnetic recording medium using a Co co-precipitated NiP/Al base material according to the present example and applying the production method shown in the comparative example 1, together with a schematic cross-sectional view of the sample at each of those steps.

Example 11

MDS Medium

In this example, with the exception of using a base material comprising an Al base plate covered with a Co co-precipitated NiP plating layer (an M base material) instead of the normal Al base plate covered with a NiP plating layer, a medium was prepared in the same manner as the example 2, to produce a magnetic recording medium with a layer structure of Al/NiPCo/WCr/Cr/CoCrTa [hereafter referred to as sample δ(MDS)].

In other words, the only difference between the sample δ(MDS) according to the present example and the sample α(WCr) according to the example 2 is the type of base material, and the remaining production conditions were identical. Accordingly, by comparing these two samples, any dependency on the base material (in other words the effect of co-precipitating Co in NiP layer) can be investigated.

Example 12

MSD Medium

In this example, with the exception of using a base material comprising an Al base plate covered with a Co co-precipitated NiP plating layer (an M base material) instead of the normal Al base plate covered with a NiP plating layer, a medium was prepared in the same manner as the example 4, to produce a magnetic recording medium with a layer structure of Al/NiPCo/WCr/Cr/CoCrTa [hereafter referred to as sample δ(MSD)].

In other words, the only difference between the sample δ(MSD) according to the present example and the sample β(WCr) according to the example 4 is the type of base material, and the remaining production conditions were identical. Accordingly, by comparing these two samples, any dependency on the base material (in other words the effect of co-precipitating Co in NiP layer) can be investigated.

Example 13

MDSO Medium

In this example, with the exception of using a base material comprising an Al base plate covered with a Co co-precipitated NiP plating layer (an M base material) instead of the normal Al base plate covered with a NiP plating layer, a medium was prepared in the same manner as the example 5, to produce a magnetic recording medium with a layer structure of Al/NiPCo/WCr/Cr/CoCrTa [hereafter referred to as sample δ(MDSO)].

In other words, the only difference between the sample δ(MDSO) according to the present example and the sample γ(DSO) according to the example 5 is the type of base material, and the remaining production conditions were identical. Accordingly, by comparing these two samples, any dependency on the base material (in other words the effect of co-precipitating Co in NiP layer) can be investigated.

Example 14

MSDO Medium

In this example, with the exception of using a base material comprising an Al base plate covered with a Co co-precipitated NiP plating layer (an M base material) instead of the normal Al base plate covered with a NiP plating layer, a medium was prepared in the same manner as the example 6, to produce a magnetic recording medium with a layer structure of Al/NiPCo/WCr/Cr/CoCrTa [hereafter referred to as sample δ(MSDO)].

In other words, the only difference between the sample δ(MSDO) according to the present example and the sample γ(SDO) according to the example 6 is the type of base material, and the remaining production conditions were identical. Accordingly, by comparing these two samples, any dependency on the base material (in other words the effect of co-precipitating Co in NiP layer) can be investigated.

Example 15

MDOS Medium

In this example, with the exception of using a base material comprising an Al base plate covered with a Co co-precipitated NiP plating layer (an M base material) instead of the normal Al base plate covered with a NiP plating layer, a medium was prepared in the same manner as the example 7, to produce a magnetic recording medium with a layer structure of Al/NiPCo/WCr/Cr/CoCrTa [hereafter referred to as sample δ(MDOS)].

In other words, the only difference between the sample δ(MDOS) according to the present example and the sample γ(DOS) according to the example 7 is the type of base material, and the remaining production conditions were identical. Accordingly, by comparing these two samples, any dependency on the base material (in other words the effect of co-precipitating Co in NiP layer) can be investigated.

FIGS. 23A–F are diagrams showing each of the steps in the preparation of a magnetic recording medium using a Co co-precipitated NiP/Al base material according to the present example and applying the fifth production method shown in the example 7, together with a schematic cross-sectional view of the sample at each of those steps.

Example 16

MDOSD Medium

In this example, with the exception of using a base material comprising an Al base plate covered with a Co co-precipitated NiP plating layer (an M base material) instead of the normal Al base plate covered with a NiP plating layer, a medium was prepared in the same manner as the example 8, to produce a magnetic recording medium with a layer structure of Al/NiPCo/WCr/Cr/CoCrTa [hereafter referred to as sample δ(MDOSD)].

In other words, the only difference between the sample δ(MDOSD) according to the present example and the sample γ(DOSD) according to the example 8 is the type of base material, and the remaining production conditions were identical. Accordingly, by comparing these two samples, any dependency on the base material (in other words the effect of co-precipitating Co in NiP layer) can be investigated.

Example 17

MDOSDO Medium

In this example, with the exception of using a base material comprising an Al base plate covered with a Co co-precipitated NiP plating layer (an M base material) instead of the normal Al base plate covered with a NiP plating layer, a medium was prepared in the same manner as the example 9, to produce a magnetic recording medium with a layer structure of Al/NiPCo/WCr/Cr/CoCrTa [hereafter referred to as sample δ(MDOSDO)].

In other words, the only difference between the sample δ(MDOSDO) according to the present example and the sample γ(DOSDO) according to the example 9 is the type of base material, and the remaining production conditions were identical. Accordingly, by comparing these two samples, any dependency on the base material (in other words the effect of co-precipitating Co in NiP layer) can be investigated.

Table 6 represents the combined results for the average grain diameter d [nm] of the magnetic crystal grains of the ferromagnetic metal layer 14, the standard deviation σ [nm] of the magnetic crystal grains, and the value of the grain diameter distribution C.V. grain, calculated by dividing the standard deviation σ of the magnetic crystal grains by the average grain diameter d, for each of the samples prepared in the examples 10 to 17, as determined from TEM microscope observations similar to those of the example 1.

Furthermore, the coercive force Hc of each medium as measured by VSM, and the degree of variation of the residual magnetization ΔM, which acts as an indicator of the change over time in magnetization recorded on the medium, are also presented in the Table 6.

In addition, for comparative purposes, the results for the aforementioned sample α(NA) are also shown in the Table 6. As follows is a repeated summary of the production conditions for this sample.

The sample α(NA) is a conventional magnetic recording medium with a layer structure of Al/NiP/Cr/CoCrTa, prepared in the same manner as the example 1, with the exception of not providing the seed layer from the example 1. In other words, the medium prepared in the comparative example 1.

In other words, whereas each of the samples of the Table 5 represent a case where the base material is an Al base plate covered with a normal NiP plating layer, each of the examples in Table 6 represent a case where the base material is an Al base plate covered with a Co co-precipitated NiP plating layer. Consequently, by comparing those γ and δ samples with the same labels inside the parentheses, any dependency on the base material can be ascertained.

TABLE 6

| Sample name | Average grain diameter d [nm] | Standard deviation σ [nm] | Grain diameter distribution C.V. grain | Co-ercive force Hc [kOe] | Variation over time ΔM [%/year] |
|---|---|---|---|---|---|
| α(NA) | 10.8 | 3.68 | 0.34 | 1.53 | 10.7 |
| δ(MD) | 8.9 | 2.98 | 0.33 | 1.48 | 8.5 |
| δ(MDS) | 8.2 | 2.56 | 0.31 | 1.47 | 8.2 |
| δ(MSD) | 7.6 | 2.10 | 0.28 | 1.43 | 7.7 |
| δ(MDSO) | 7.2 | 1.98 | 0.28 | 1.45 | 7.6 |
| δ(MSDO) | 7.0 | 1.85 | 0.26 | 1.37 | 7.3 |
| δ(MDOS) | 6.8 | 1.70 | 0.25 | 1.39 | 7.3 |
| δ(MDOSD) | 7.0 | 1.62 | 0.23 | 1.50 | 7.0 |
| δ(MDOSDO) | 6.6 | 1.50 | 0.23 | 1.44 | 6.8 |

From analyzing Table 6, the following points became clear.

[Comparison of α(NA) and δ(MD)]

Figure 14:
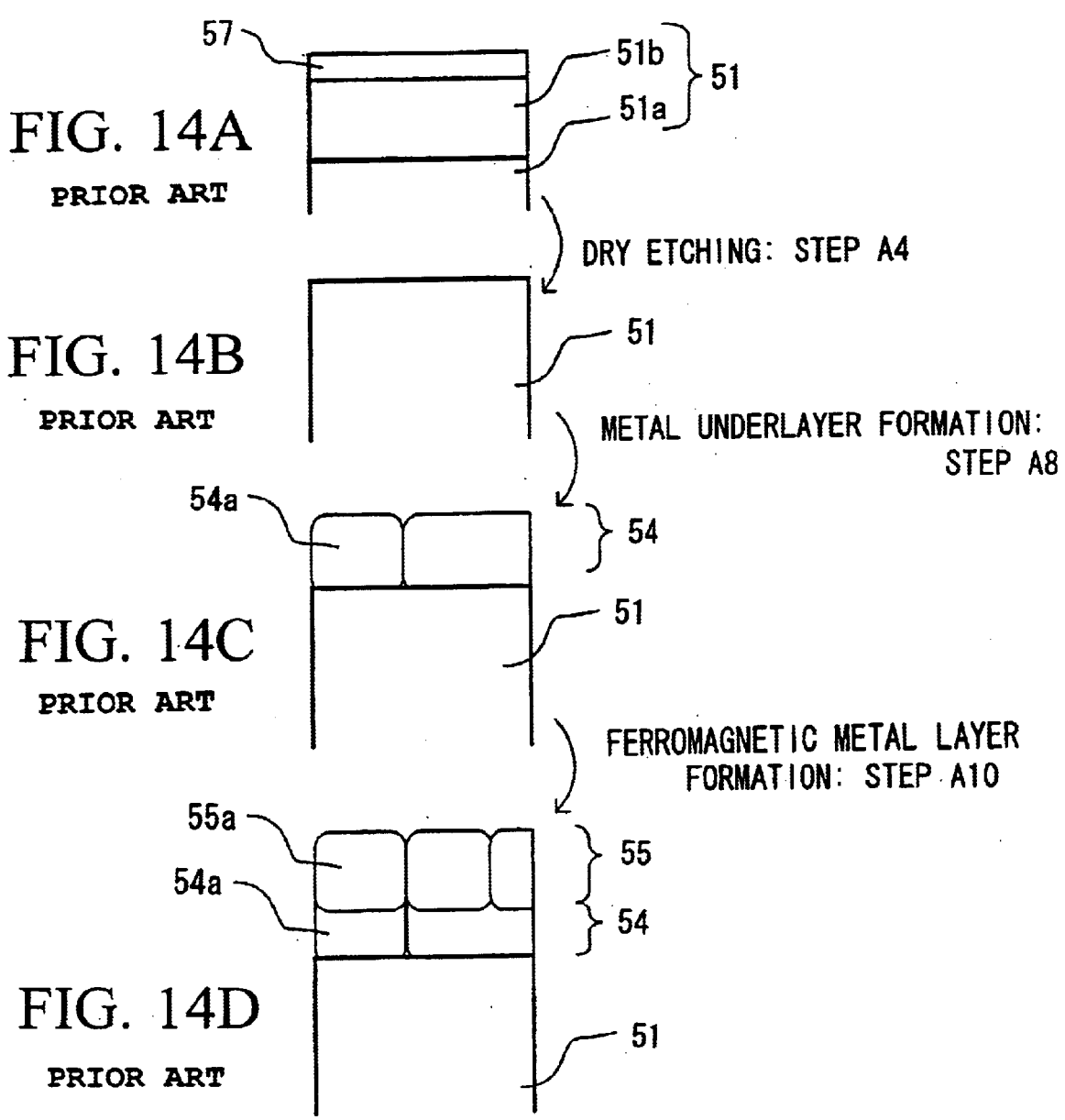
FIGS. 14A–D are diagrams showing each of the steps in the preparation of a magnetic recording medium using a conventional production method, together with a schematic cross-sectional view of the sample at each of those steps.
Figure 15:
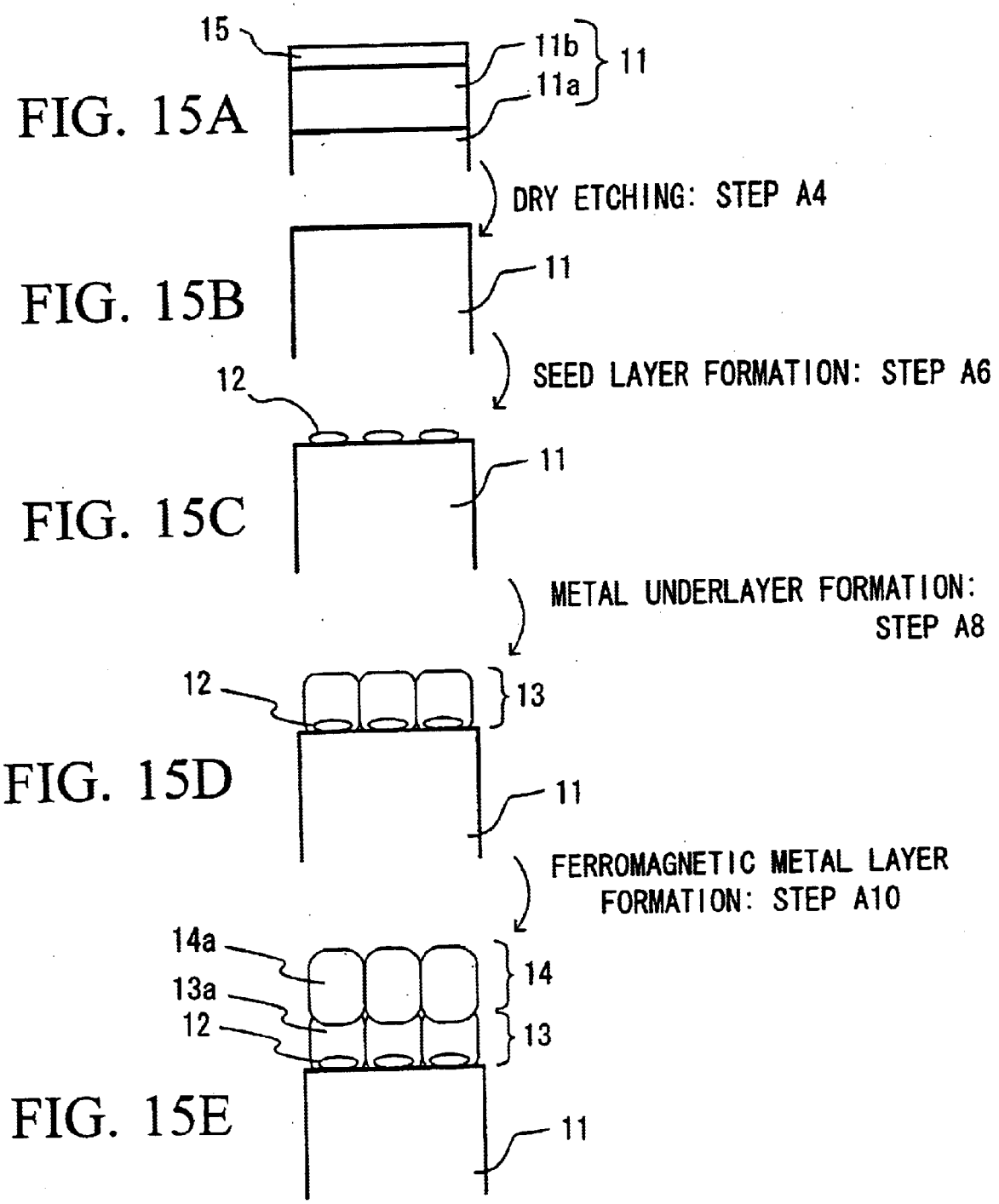
FIGS. 15A–E are diagrams showing each of the steps in the preparation of a magnetic recording medium using a first production method used in an example 1 (DS) according to the present invention, together with a schematic cross-sectional view of the sample at each of those steps.
Figure 16:
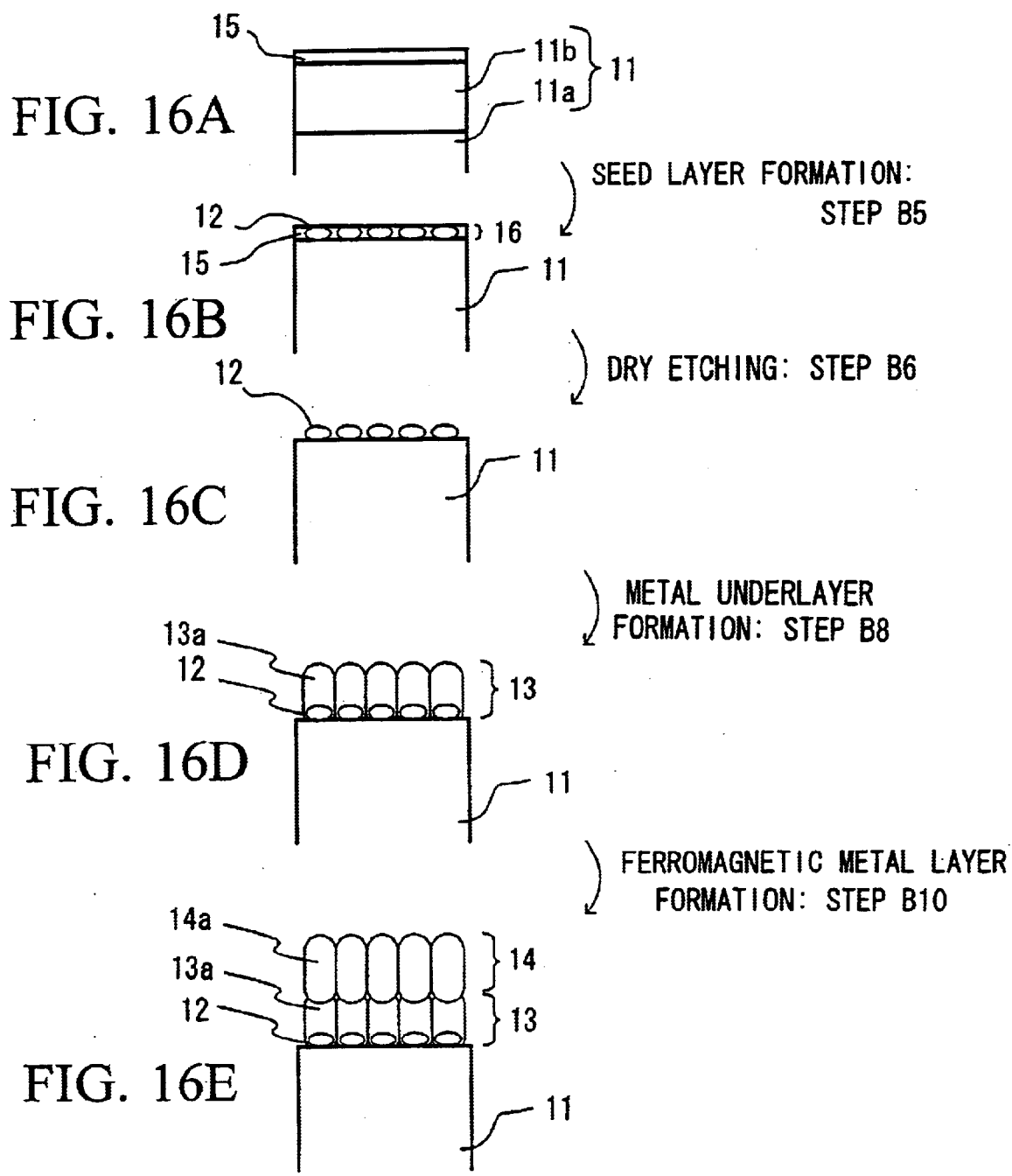
FIGS. 16A–E are diagrams showing each of the steps in the preparation of a magnetic recording medium using a second production method used in an example 3 (SD) according to the present invention, together with a schematic cross-sectional view of the sample at each of those steps.

(I) The case where the surface coating layer 11c of the base material is a Co co-precipitated NiP film [δ(MD): FIG. 22A], in comparison with a conventional base plate provided with a coating layer 11b comprising a NiP film [α(NA): FIG. 14], produces reductions in the average grain diameter d and the standard deviation σ of more than 15%, and the variation over time also improves markedly from 10.7 to 8.5.

(II) The values for the aforementioned δ(MD) of an average grain diameter d=8.9 and a standard deviation σ=2.98 are smaller than the values obtained for the sample γ(DS) (Table 5: d=9.5, σ=3.10) where the process S (seed layer formation) was introduced into a conventional base material.

[Comparison of δ(MD) with δ(MDS) and δ(MSD)]

(III) In the case of base materials with a Co co-precipitated NiP film, as observed above, by providing a seed layer 12 (process S) between the base material 11 and the metal underlayer 13, almost all of the evaluations (d, σ, C.V. grain, ΔM) improved even further.

(IV) However, in comparison with the sample δ(MDS) where the process S was performed after the process D, the sample δ(MSD) where the process D was performed after the process S showed a greater degree of improvement.

[Comparison of δ(MDS) and δ(MDSO), and Comparison of δ(MSD) and δ(MSDO)]

(V) In the case of base materials with a Co co-precipitated NiP film, as was observed above, by adding a process O (oxygen exposure) after the intermediate processing step comprising the process D (dry etching) and the process S (seed layer formation), almost all of the evaluations (d, σ, C.V. grain, ΔM) improved, regardless of the order in which the process D and the process S were conducted. However, only Hc appeared to decrease slightly, although this decrease was within the normal production variation.

(VI) However the case represented by the sequence process S→process D→process O [δ(MSDO)] shows a greater trend towards smaller values for almost all the evaluations (other than Hc) than the case represented by the sequence process D→process S→process O [δ(MDSO)], and this trend is the same as that observed prior to the introduction of the process O.

[Comparison of δ(MDSO) and δ(MSDO) with δ(MDOS)]

Figure 23:
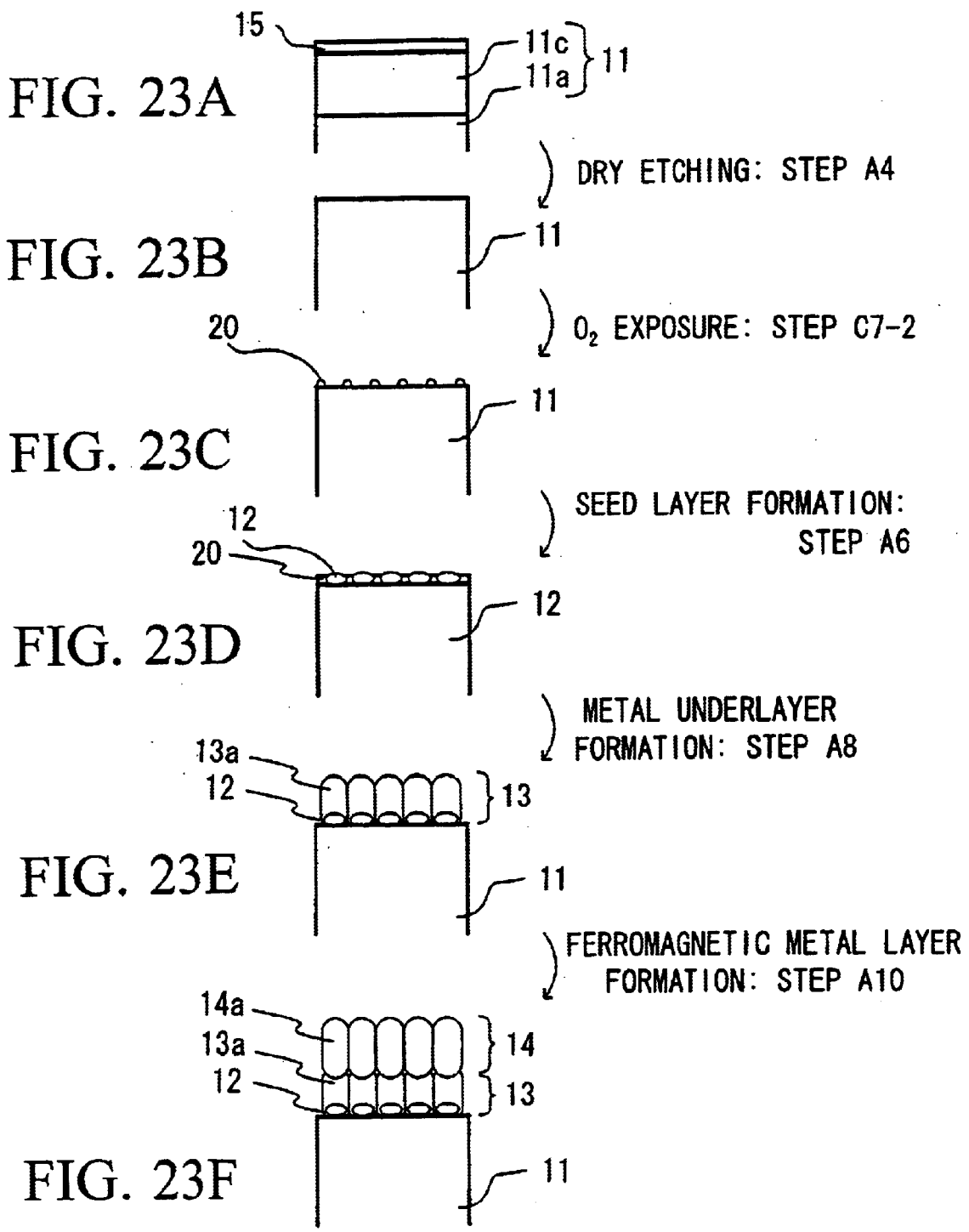
FIGS. 23A–F are diagrams showing each of the steps in the production of a magnetic recording medium in an example 15 (MDOS) according to the present invention, together with a schematic cross-sectional view of the sample at each of those steps.

(VII) In the case of base materials with a Co co-precipitated NiP film, as was observed above, performing the process O (oxygen exposure) after the process D (dry etching) and then performing the process S (seed layer formation) [the sample δ(MDOS), FIG. 23] produces even better results for all of the evaluations than performing the process O after both the process D and the process S [the samples δ(MDSO), δ(MSDO)]

[Comparison of δ(MDOS) with δ(MDOSD) and δ(MDOSDO)]

(VIII) In the case of base materials with a Co co-precipitated NiP film, as was observed above, by adding to δ(MDOS), either a second process D [as in the case of δ(MDOSD)], or a second process D and a second process O [as in the case of δ(MDOSDO)], the standard deviation reduces even further, and the variation over time also improves another level.

In addition, by comparing Table 5 (conventional base materials where the covering layer is a NiP film) and Table 6 (base materials where the covering film is a Co co-precipitated NiP film), the following point became evident.

(IX) Comparison of the intermediate processing step under the same conditions [for example, γ(DOS) and δ(MDOS)] reveals that all of the evaluations are better for the base material in which the covering layer comprises a Co co-precipitated NiP film than for the conventional base material in which the covering layer comprises an NiP film.

Consequently, from the finding (I) above, because a base material 11 in which a Co co-precipitated NiP film is used for the covering layer 11a enables the formation of a ferromagnetic metal layer with smaller magnetic crystal grains and with a more uniform grain diameter [FIG. 22D] than a conventional base material [FIG. 14D] in which a NiP film is used for the covering film, media for which the variation over time is also smaller can be produced with ease.

Furthermore, even in those cases where a base material 11 in which a Co co-precipitated NiP film is used for the covering layer 11a, it was evident that the various types of intermediate processing step according to the present invention still functioned effectively, and could be effectively applied to the production of low noise media with superior long term stability.

It is thought that this result is due to Co scattered across the surface of the NiP film and exposed, and that adsorbed gas 19 such as oxygen or the like remains adhered at locations corresponding with the Co exposed portions of the coating layer 11c [FIG. 22B]. In other words, Co within the surface functions as an adsorption site for the adsorbed gas, and the Cr grains 13a of the metal underlayer 13 deposited on top of the surface are prevented from growing along the surface (the horizontal direction) of the base material 11, while growth in a direction perpendicular (the vertical direction, namely the direction of the film thickness) to the base material 11 is promoted. As a result, in comparison with the Cr grains formed on a conventional base material [54a in FIG. 14C], Cr grains of a narrow grain diameter grow [13a in FIG. 22C]. It is thought that because the Co film 14 is deposited on top of this Cr film 13 of smaller grain diameter, the Co grains 14a reflect the grain diameter of the Cr grains 13a and are also miniaturized [FIG. 22D].

Particularly in the case where a base material 11 with a coating layer 11c comprising a Co co-precipitated NiP film is used, and the process O (oxygen exposure) is performed after the process D (dry etching) and before the process S (seed layer formation) [namely δ(MDOS): FIG. 23], then by carefully removing any adsorbed gas 15 remaining on the coating film 11c of the base material, using the first process D, before carrying out the process O under suitable conditions, the adsorbed gas 20 can be adhered onto the coating film 11c in a more localized and more uniform manner than the case of FIG. 22 [δ(MD)]. Next, because the seed layer 12 formed thereon is actively deposited onto those sections where the adsorbed gas 20 does not exist, there is a tendency for the number of islands generated within a unit area to increase, and for the generated islands to be more uniformly distributed within each unit area. The Cr film of the metal underlayer 13 subsequently formed on top of this islands type seed layer has an even smaller average grain diameter for the crystal grains 13a, and the variation in grain diameter is also smaller. Accordingly, the crystal grains 14a of the magnetic film of the ferromagnetic metal layer 14 formed thereon will reflect the crystalline form of the thus grown metal underlayer 13 and also display a further reduction in average grain diameter, and a smaller grain diameter distribution.

For these reasons, the inventor considers that a base material in which the coating layer 11c is a Co co-precipitated NiP film enables the preparation of a medium with a ferromagnetic metal layer in which the magnetic grains are smaller and the grain diameter is more uniform.

Accordingly, in all of the aforementioned production methods according to the present invention, it was evident that by replacing the conventional base material (a base material comprising an Al alloy base 11a and a NiP coating film 11b), and using a base material comprising a non-magnetic base 11a and a coating film 11c, where the coating film 11c is an alloy comprising mainly nickel and an element which is capable of co-precipitated with nickel and which has a strong affinity for oxygen, almost all of the evaluations (d, σ, C.V. grain, ΔM) improved even further.

In the examples described above, Co was used as an example of the element capable of co-precipitated with nickel and with a strong affinity for oxygen, although examples of elements other than cobalt with the same characteristics include phosphorus, tungsten, iron, vanadium, chromium, manganese, copper, zinc, molybdenum, palladium, tin, rhenium, aluminum, zirconium, boron, titanium, hafnium, niobium and tantalum.

Needless to say, in order to obtain the actions and effects described above, either one element may be selected and used from the above list of elements, or alternatively two or more elements may also be used.

INDUSTRIAL APPLICABILITY

As described above, according to the present invention, by providing an islands type seed layer 12 comprising at least W between a base material 11 and a metal underlayer 13, a magnetic recording medium can be obtained in which the magnetic crystal grains which make up a ferromagnetic metal layer 14 formed on top of the metal underlayer 13 are reduced in diameter, and moreover the variation in that grain diameter is suppressed. This tendency can be further strengthened by incorporating a suitable quantity of Cr within the W of the seed layer 12.

Consequently, by providing the aforementioned seed layer 12, localized variations in the interactions between grains of the ferromagnetic metal layer 14 which functions as the recording layer are minimal, and so even if the recording magnetization written onto the recording layer decreases with the shift to higher recording densities, a magnetic recording medium can be provided in which the recording magnetization is unlikely to be affected by thermal agitation.

Because the effects described above can be achieved by controlling only the preparation conditions for the seed layer 12, without altering the film thickness of the metal underlayer 13 or the film thickness of the ferromagnetic metal layer 14 which functions as the recording layer, the present invention offers the advantage that in order to realize a variety of different magnetic characteristics, the film thickness of the metal underlayer 13 and the film thickness of the ferromagnetic metal layer 14 can be designed and altered with total freedom.

Furthermore, because a medium according to the present invention can be formed without applying a bias to the base material 11, insulating glass with superior flatness can also be used for the base material 11.

In addition, in a medium in which the coating film 11b which forms the surface of the base material 11 is changed from a conventional NiP film to a Co co-precipitated NiP film, then for the crystal grains of the seed layer 12 formed thereon, growth in a direction along the surface is inhibited and growth in a perpendicular direction is promoted, and so the grain diameter for the seed layer 12 formed on top of the base material 11 is reduced. Reflecting this reduction, the grain diameter of the metal underlayer 13 formed on top of the seed layer 12 also reduces, and the crystal grains of the ferromagnetic metal layer 14 formed on top of the metal underlayer 13 are also miniaturized. Consequently, by using a base material 11 in which a Co co-precipitated NiP film is used for the covering layer 11b, a ferromagnetic metal layer can be formed in which the magnetic grains are smaller and the grain diameter are more uniform than a conventional base material in which an NiP film is used for the coating layer, and so a medium for which the variation over time is also smaller can be produced with ease.

According to a magnetic recording medium production method according to the present invention, by providing an intermediate processing step comprising a process D and a process S it was realized that both the average grain diameter and the standard deviation of the magnetic crystal grains making up the ferromagnetic metal layer 14 reduced, and that as a result a medium could be produced for which the variation over time of the residual magnetization ΔM is small. Furthermore, in a production method according to the present invention, even if the ultimate vacuum of the film formation chamber does not reach the $10^{-9}$ [Torr] level required for an ultra clean process, then at a film formation chamber ultimate vacuum at the $10^{-7}$ [Torr] level, as used in conventional mass production equipment, the magnetic crystal grains of the ferromagnetic metal layer 14 can still be miniaturized. Accordingly, by converting conventional mass production equipment, a mass production system capable of manufacturing low cost media which comply with the next generation high recording densities can be constructed with ease.

Furthermore, if a production method according to the present invention is used, a reduction in the grain diameter of the magnetic crystal grains of the ferromagnetic metal layer 14 can be achieved without applying a bias to the base material 11 during film formation. Accordingly, a production method according to the present invention is able to avoid those production problems arising from bias application to the base material 11, such as the problem of the medium surface becoming rough and inhibiting a lowering of the flying height for the head, or the problem of contamination generated within the film formation chamber being incorporated into the medium formation surface, and so contributes to greater stability in the mass production process.

In addition, in a production method according to the present invention, by adding a process O for exposing the base material 11 to a predetermined oxygen atmosphere, to the intermediate processing step comprising the process D and the process S, the average grain diameter and the standard deviation of the magnetic crystal grains of the ferromagnetic metal layer 14 can be reduced even further, and a medium can be produced for which the variation over time of the residual magnetization ΔM is even smaller. Consequently, according to a production method of the present invention, a low noise medium which also displays superior long term stability can be produced with good stability.

The effects of the production method described above also function effectively in cases where a base material is used in which the conventional NiP film covering layer has been replaced with a Co co-precipitated NiP film.

In a magnetic recording medium according to the present invention, as described above, the ferromagnetic metal layer 14 is made up of fine crystal grains and displays superior magnetic characteristics, and so this ferromagnetic metal layer 14 displays thermal stability which is superior to conventional products, and can suppress thermal agitation. Accordingly, even if the inside of the magnetic recording device is heated by the motor, and for example rises to a high temperature exceeding 100° C., but continues to be used, then there is still no deterioration in the magnetic characteristics of the ferromagnetic metal layer 14 of a medium according to the present invention. Consequently, by using a medium according to the present invention, a magnetic recording device with superior long term stability can be provided.

What is claimed is:

1. A magnetic recording medium comprising a ferromagnetic metal layer of a cobalt based alloy formed on a base material with a metal underlayer comprising one of chromium and a chromium based alloy as a constituent disposed therebetween, wherein a seed layer of scattered islands is provided between said base material and said metal underlayer, the islands consisting of one of pure tungsten and tungsten-chromium.

2. A magnetic recording medium according to claim 1, wherein said islands are pure tungsten.

3. A magnetic recording medium according to claim 1, wherein said base material comprises a non-magnetic base and a coating film, and said coating film is formed from a nickel alloy comprising an element which is capable of co-precipitating with nickel and which has an affinity for oxygen.

4. A magnetic recording medium according to claim 3, wherein said element which is capable of co-precipitating with nickel and which has an affinity for oxygen is either one, or two or more elements selected from the group consisting of phosphorus, cobalt, tungsten, iron, vanadium, chromium, manganese, copper, zinc, molybdenum, palladium, tin, rhenium, aluminum, zirconium, boron, titanium, hafnium, niobium and tantalum.

5. A production method for a magnetic recording medium comprising a seed layer comprising at least tungsten, a metal underlayer comprising one of chromium and chromium-based alloys, and a ferromagnetic metal layer of a cobalt based alloy formed sequentially on top of a base material, which comprises at least a preliminary processing step for positioning said base material inside a film formation chamber, evacuating an inside of said film formation chamber down to a predetermined degree of vacuum, and then heating said base material to a predetermined temperature, an intermediate processing step in which a process D for dry etching said base material and a process S for depositing a seed layer comprising at least tungsten in scattered islands onto said base material, are performed at least once under a pressure environment greater than said predetermined degree of vacuum, and a post processing step for sequentially depositing said metal underlayer and said ferromagnetic metal layer on top of said seed layer.

6. A production method for a magnetic recording medium according to claim 5, wherein said intermediate processing step is carried out in a sequence comprising said process D and then said process S.

7. A production method for a magnetic recording medium according to claim 5, wherein said intermediate processing step is carried out in a sequence comprising said process S and then said process D.

8. A production method for a magnetic recording medium according to claim 5, wherein said intermediate processing step, in addition to said process D and said process S, also comprises a process O, which is performed at least once, in which said base material is exposed to a predetermined oxygen atmosphere under a pressure environment greater than said predetermined degree of vacuum.

9. A production method for a magnetic recording medium according to claim 8, wherein said intermediate processing step is carried out in a sequence comprising said process D, then said process S, and then said process O.

10. A production method for a magnetic recording medium according to claim 8, wherein said intermediate processing step is carried out in a sequence comprising said process S, then said process D and then said process O.

11. A production method for a magnetic recording medium according to claim 8, wherein said intermediate processing step is carried out in a sequence comprising said process D, then said process O and then said process S.

12. A production method for a magnetic recording medium according to claim 8, wherein said intermediate processing step is carried out in a sequence comprising said process D, then said process O, then said process S and then said process D.

13. A production method for a magnetic recording medium according to claim 8, wherein said intermediate processing step is carried out in a sequence comprising said process D, then said process O, then said process S, then said process D and then said process O.

14. A production method for a magnetic recording medium according to claim 8, wherein said base material utilizes a base material comprising a non-magnetic base and a coating film, and said coating film is formed from a nickel alloy comprising an element which is capable of co-precipitating with nickel and which has an affinity for oxygen.

15. A production method for a magnetic recording medium according to claim 14, wherein said element which is capable of co-precipitating with nickel and which has an affinity for oxygen is either one, or two or more elements selected from the group consisting of phosphorus, cobalt, tungsten, iron, vanadium, chromium, manganese, copper, zinc, molybdenum, palladium, tin, rhenium, aluminum, zirconium, boron, titanium, hafnium, niobium and tantalum.

16. A magnetic recording device comprising a magnetic recording medium according to claim 1, a drive section for driving said magnetic recording medium, a magnetic head, and movement means for moving said magnetic head relative to said magnetic recording medium.

17. A magnetic recording medium according to claim 1, wherein said islands are tungsten-chromium.

18. A magnetic recording medium comprising a ferromagnetic metal layer of a cobalt based alloy formed on a base material with a metal underlayer comprising one of chromium and a chromium based alloy as a constituent disposed therebetween, wherein a seed layer functioning as a nucleus for the initial growth of said metal underlayer is provided between said base material and said metal underlayer, and said seed layer consists of one of pure tungsten and tungsten-chromium scattered islands over a surface of said base material.

19. A magnetic recording medium according to claim 18, wherein said seed layer is pure tungsten.

20. A magnetic recording medium according to claim 18, wherein said seed layer is tungsten-chromium.

* * * * *